US008879532B2

(12) United States Patent
Tsai et al.

(10) Patent No.: US 8,879,532 B2
(45) Date of Patent: Nov. 4, 2014

(54) TECHNIQUES FOR PILOT STREAM REMAPPING IN OFDM WIRELESS COMMUNICATION SYSTEM

(75) Inventors: Jiann-An Tsai, Plano, TX (US); Zhouyue Pi, Richardson, TX (US); Kaushik Josiam, Dallas, TX (US); Farooq Khan, Allen, TX (US); Sudhir Ramakrishna, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 12/722,425

(22) Filed: Mar. 11, 2010

(65) Prior Publication Data

US 2010/0246515 A1 Sep. 30, 2010

Related U.S. Application Data

(60) Provisional application No. 61/210,923, filed on Mar. 24, 2009, provisional application No. 61/212,026, filed on Apr. 6, 2009, provisional application No. 61/212,740, filed on Apr. 15, 2009, provisional application No. 61/170,066, filed on Apr. 16, 2009, provisional application No. 61/279,377, filed on Oct. 20, 2009, provisional application No. 61/280,541, filed on Nov. 4, 2009, provisional application No. 61/281,058, filed on Nov. 12, 2009.

(51) Int. Cl.
*H04L 1/00* (2006.01)
*H04L 25/02* (2006.01)
*H04L 5/00* (2006.01)

(52) U.S. Cl.
CPC ............ *H04L 5/0051* (2013.01); *H04L 25/0224* (2013.01); *H04L 5/0007* (2013.01); *H04L 5/005* (2013.01)
USPC ......................................... 370/343; 375/260

(58) Field of Classification Search
None
See application file for complete search history.

(56) References Cited

U.S. PATENT DOCUMENTS

| 2009/0067522 A1* | 3/2009 | Kwak et al. .................... 375/260 |
| 2010/0220651 A1* | 9/2010 | Chen et al. ...................... 370/328 |
| 2010/0227612 A1* | 9/2010 | Wang et al. .................... 455/434 |
| 2011/0149942 A1* | 6/2011 | Ko et al. ......................... 370/343 |
| 2012/0155425 A1* | 6/2012 | Budianu et al. ................ 370/330 |

FOREIGN PATENT DOCUMENTS

| EP | 1 898 542 A1 | 3/2008 |
| WO | 2008/072899 A2 | 6/2008 |
| WO | 2008/115588 A2 | 9/2008 |

* cited by examiner

*Primary Examiner* — Mohammad Adhami
(74) *Attorney, Agent, or Firm* — Jefferson IP Law, LLP

(57) ABSTRACT

A method and base station apparatus for transmitting pilot data in a wireless communication system, and a method and mobile station apparatus for receiving pilot data in a wireless communication system are provided. The method for transmitting pilot data in a wireless communication system includes determining a pilot pattern in at least one resource block for each of one or more pilot streams, and transmitting the one or more pilot streams based on the determined respective pilot pattern in the at least one resource block, wherein the at least one resource block comprises a plurality of subcarriers and a plurality of Orthogonal Frequency Division Multiplexing (OFDM) symbols.

16 Claims, 48 Drawing Sheets

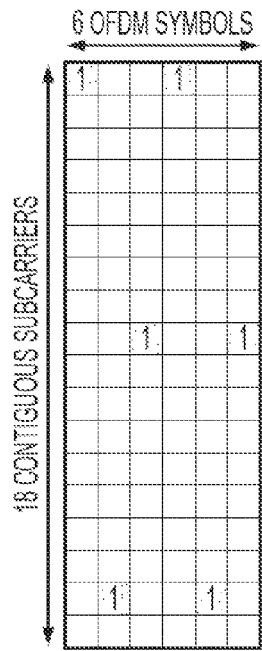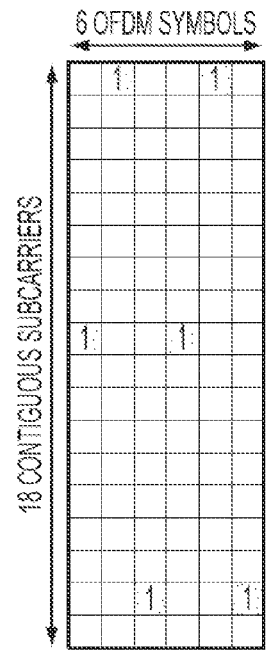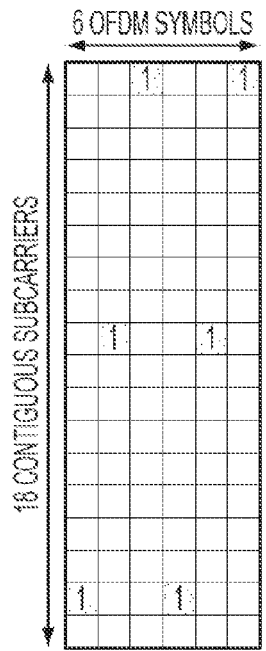
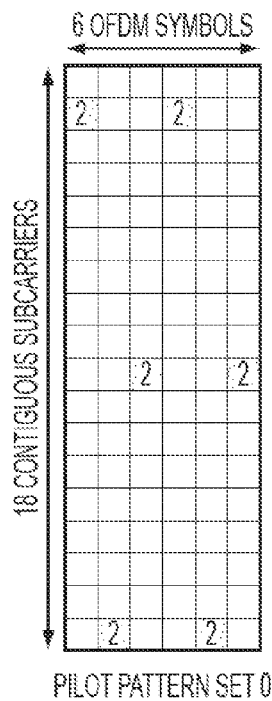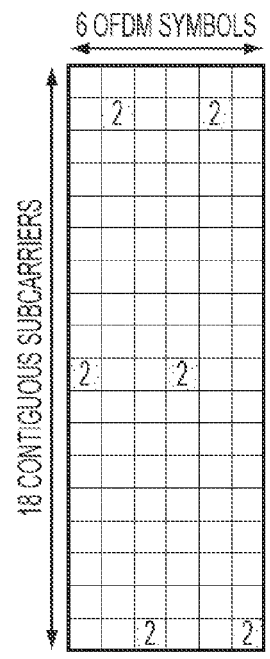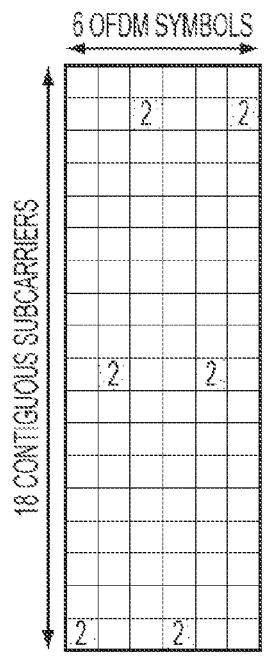
PILOT PATTERN SET 0          PILOT PATTERN SET 1          PILOT PATTERN SET 2
FIG. 32A                     FIG. 32B                     FIG. 32C

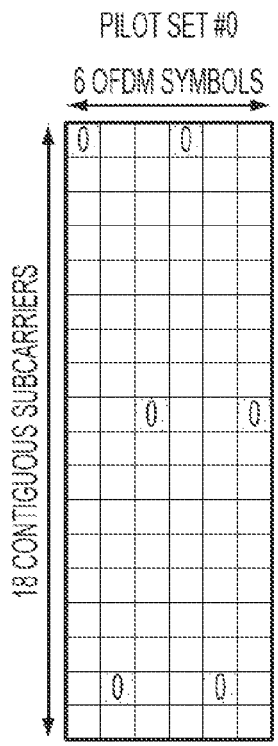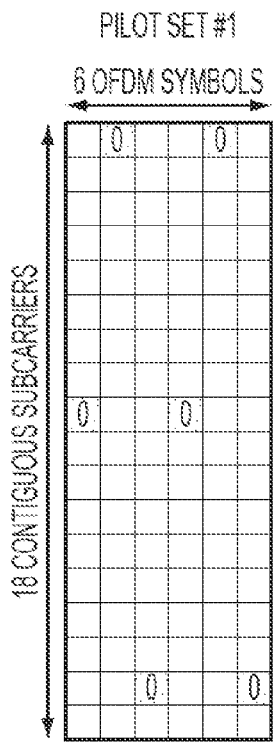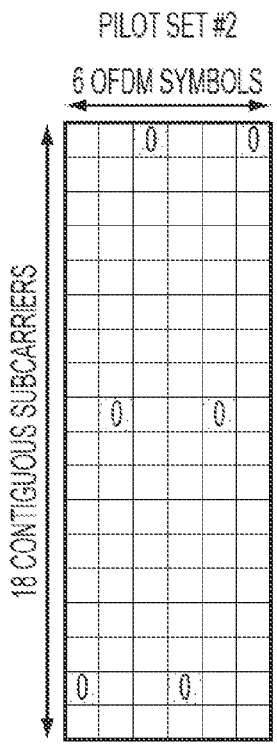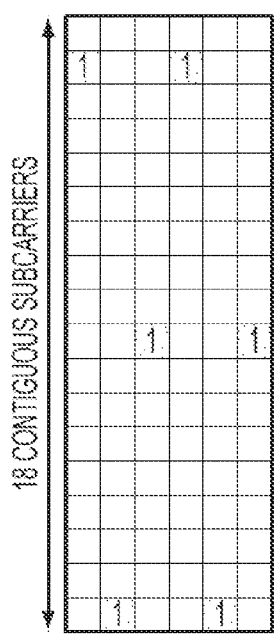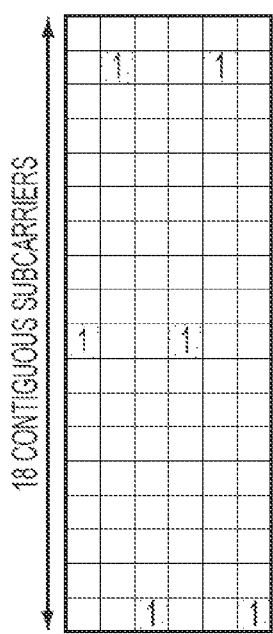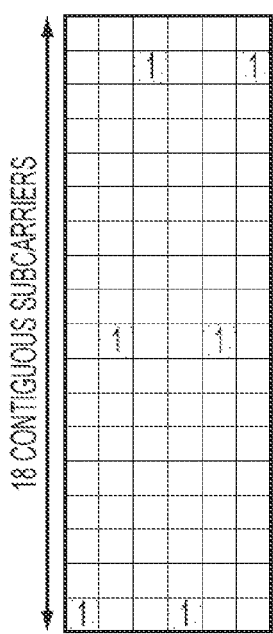
FIG. 33A    FIG. 33B    FIG. 33C

TECHNIQUES FOR PILOT STREAM REMAPPING IN OFDM WIRELESS COMMUNICATION SYSTEM

CROSS-REFERENCE TO RELATED APPLICATIONS

This application claims the benefit under 35 U.S.C. §119 (e) of a U.S. Provisional application filed on Mar. 24, 2009 in the U.S. Patent and Trademark Office and assigned Ser. No. 61/210,923, a U.S. Provisional application filed on Apr. 6, 2009 in the U.S. Patent and Trademark Office and assigned Ser. No. 61/212,026, a U.S. Provisional application filed on Apr. 15, 2009 in the U.S. Patent and Trademark Office and assigned Ser. No. 61/212,740, a U.S. Provisional application filed on Apr. 16, 2009 in the U.S. Patent and Trademark Office and assigned Ser. No. 61/170,066, a U.S. Provisional application filed on Oct. 20, 2009 in the U.S. Patent and Trademark Office and assigned Ser. No. 61/279,377, a U.S. Provisional application filed on Nov. 4, 2009 in the U.S. Patent and Trademark Office and assigned Ser. No. 61/280,541, and a U.S. Provisional application filed on Nov. 12, 2009 in the U.S. Patent and Trademark Office and assigned Ser. No. 61/281,058, the entire disclosures of each of which are hereby incorporated by reference.

BACKGROUND OF THE INVENTION

1. Field of the Invention

The present invention relates to techniques for use in an Orthogonal Frequency Division Multiplexing (OFDM) wireless communication system. More particularly, the present invention relates to techniques for pilot stream remapping in an OFDM wireless communication system.

2. Description of the Related Art

Orthogonal Frequency Division Multiplexing (OFDM) is a multi-carrier technique that is widely used as an access technique in a modern wireless communication system due to its robustness to multipath fading and simple implementation. The number of OFDM subcarriers in an OFDM wireless communication system is typically selected as power of two, which allows for the use of a Fast Fourier Transform (FFT) algorithm during reception and an Inverse FFT (IFFT) algorithm during transmission. An example of OFDM transmission according is described below with reference to FIG. 1.

FIG. 1 illustrates an OFDM transmitter according to the related art.

Referring to FIG. 1, the OFDM transmitter 100 includes an IFFT 102, a Parallel to Serial (P/S) converter 104, a Cyclic Prefix (CP) inserter 106, a Digital to Analog Convertor (DAC)/Radio Frequency (RF) up-converter 108, Power Amplifier (PA) 110, and at least one Transmit Antenna 112. Complex modulations symbols X(k) k=0, 1, ..., (N−1) and guard subcarriers are mapped to the input of IFFT 102. No information is transmitted on the guard subcarriers. After the IFFT operation, the resulting information is serialized by P/S converter 104. A cyclic prefix is added after the serialization by the CP inserter 106. The resulting sequence is digitized and up-converted into RF by the DAC/RF up-converter 108, amplified by PA 110 and transmitted using Transmit Antenna 112.

An example of OFDM reception is described below with reference to FIG. 2.

FIG. 2 illustrates an OFDM receiver according to the related art.

Referring to FIG. 2, the OFDM receiver 200 includes at least one Receive Antenna 202, a Low Noise Amplifier (LNA) 204, an Analog to Digital Convertor (ADC)/RF down-converter 206, a CP remover 208, a Serial to Parallel (S/P) converter 210, an FFT 212, and a Frequency-Domain Equalization (FDE) operation 214. A signal received via the Receive Antenna 202 is low noise amplified by LNA 204. The resulting signal is down-converted from RF and converted from digital into analog by ADC/RF down-converter 206. The CP samples are discarded by CP remover 208 and the resulting signal is converted into parallel by S/P converter 210. An FFT operation is performed on the received samples sequence by FFT 212. A FDE operation is performed by FDE 214 using channel estimates obtained from received pilots or reference signals. Thereby, the estimates of the transmitted complex modulation symbols are obtained.

A typical cellular wireless communication system includes a collection of fixed Base Stations (BSs) that define coverage areas or cells. Typically, a Non-Line-Of-Sight (NLOS) radio propagation path exists between a BS and a Mobile Station (MS) due to natural and man-made objects that are situated between the BS and the MS. As a consequence, the radio waves propagate via reflections, diffractions and scattering. The waves arriving at the MS in the DL direction (at the BS in the UpLink (UL) direction) experience constructive and destructive additions because of different phases of the individual waves. This is due the fact that, at the high carrier frequencies typically used in the cellular wireless communication system, small changes in the differential propagation delays introduces large changes in the phases of the individual waves. If the MS is moving or there are changes in the scattering environment, then the spatial variations in the amplitude and phase of the composite received signal will manifest themselves as time variations known as Rayleigh fading or fast fading. The time-varying nature of the wireless channel requires a very high Signal-to-Noise Ratio (SNR) in order to provide a desired bit error rate or packet error reliability.

Multiple Input Multiple Output (MIMO) schemes use multiple transmit antennas and multiple receive antennas to improve the capacity and reliability of a wireless communication channel. A wireless communication system implementing the MIMO scheme (hereafter referred to as a MIMO wireless communication system) theoretically enables a linear increase in capacity of K, where K is the minimum of number of transmit (M) and receive (N) antennas (i.e., K=min (m,n). A simplified example of a 4×4 MIMO wireless communication system is described below with reference to FIG. 3.

FIG. 3 illustrates an example of a 4×4 MIMO wireless communication system according to the related art.

Referring to FIG. 3, the 4×4 MIMO wireless communication system 300 includes a transmitter 310 and a receiver 320. The transmitter 310 includes a precoding unit 312 that receives four different data streams Layers 1-4 that are transmitted separately from the four transmit antennas TX1-TX4. The receiver 320 includes a spatial processor 322 that receives the signals transmitted by transmitter 310 via four receive antennas RX1-RX2. The spatial processor 322 performs spatial signal processing on the received signals, such as Minimum Mean Squared Error (MMSE) spatial filtering, MMSE-Soft Interference Cancellation (SIC) spatial filtering or Maximum Likelihood (ML) decoding, in order to recover the four data streams Layers 1-4.

The MIMO channel estimation includes estimating the channel gain and phase information for links from each of the transmit antennas to each of the receive antennas. Therefore, the channel for an M×N MIMO wireless communication system consists of an N×M matrix:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \quad \text{Equation (1)}$$

where $h_{ij}$ represents the channel gain from transmit antenna j to receive antenna i. In order to enable the estimations of the elements of the MIMO channel matrix, separate pilots are transmitted from each of the transmit antennas.

An example of a single-user MIMO wireless communication system is described below with reference to FIG. 4.

FIG. 4 illustrates a single-user MIMO wireless communication system according to the related art.

Referring to FIG. 4, a BS 402, an MS-1 404, and an MS-2 406 are shown. Here, it is assumed that BS 402 will only be transmitting to MS-2 406. In this case, all of the MIMO layers in the cell Layers 1 and 2 are transmitted to MS-2 406.

An example of a multi-user MIMO wireless communication system is described below with reference to FIG. 5.

FIG. 5 illustrates a multi-user MIMO wireless communication system according to the related art.

Referring to FIG. 5, a BS 502, an MS-1 504, and an MS-2 506 are shown. Here, it is assumed that BS 502 will be transmitting to MS-1 504 and MS-2 506. In this case, the MIMO layers Layers 1 and 2 in the cell of BS 502 are shared among MS-1 504 and MS-2 506.

An example of Frequency Division Duplex (FDD) is described below with reference to FIG. 6.

FIG. 6 illustrates an FDD frame according to the related art.

Referring to FIG. 6, FDD frame 600 includes DownLink (DL) 602 and UL 604 transmissions that occur simultaneously on deferent frequency bands. The FDD frame is divided into timeslots referred to as subframes.

An example of Time Division Duplex (TDD) is described below with reference to FIG. 7.

FIG. 7 illustrates TDD frames according to the related art.

Referring to FIG. 7, a TDD frame 700 is shown that use a single frequency band for DL 702 and UL 704 transmissions with a 4:4 (four subframes for DL and four subframes for UL) configuration. Also, a TDD frame 710 is shown that uses a single frequency band for DL 712 and UL 714 transmissions with a 6:2 (six subframes for DL and two subframes for UL) configuration. Similar to the FDD frame, a TDD frame is divided into timeslots referred to as subframes. While two specific examples of a TDD frame configuration are shown, the transmission time may be shared between DL and UL transmissions in other proportions. An advantage of the implementation of TDD in a wireless communication system is that UL and DL channels are symmetric, which allows for DL channel quality and MIMO channel estimation at a BS from UL transmissions. When FDD is implemented in a wireless communication system, an MS calculates channel quality and MIMO information from DL pilot transmissions, which is feed back to the BS on a feedback channel.

In an OFDM wireless communication system, a subframe is divided in the frequency domain into different Resource Blocks (RBs). A RB consists of multiple subcarriers and OFDM symbols. A RB is considered as minimum unit of resource allocation for a user. An example of an OFDM RB is described below with reference to FIG. 8.

FIG. 8 illustrates an OFDM RB according to the related art.

Referring to FIG. 8, 18 subcarriers and six OFDM symbols form one RB. Of course, RBs may be formed using differing numbers of subcarriers or OFDM symbols. Typically, training or pilot signals will be transmitted among payload data in the RB.

Training signal or pilot overhead is a significant concern in a MIMO wireless communications system because separate pilot signals are required for each of the transmit antennas. An example of pilot overhead in a MIMO wireless communications system is described below with reference to FIG. 9.

FIG. 9 illustrates Channel Quality Indication (CQI) and Precoding Matrix Indication (PMI) feedback according to the related art.

Referring to FIG. 9, pilot signals 902-1, 902-2, . . . , 902-M are transmitted from BS 910 to MS 920. The pilot signals 902-1, 902-2, . . . , 902-M for different antennas may be made orthogonal in time, frequency or code-domain. The pilot signals 902-1, 902-2, . . . , 902-M are used by the MS 920, among other things, for Channel Quality Indication CQI and PMI calculation 922. This information is then fed back to the BS 910 in a CGI/PMI feedback message 904. The BS 910 makes use of this information in scheduling decisions as well as MIMO, modulation and coding format selection for the MS 920.

The pilot signals 902-1, 902-2, . . . , 902-M used for CQI and PMI calculation are typically referred to as common pilot signals as they are used by all MSs in a cell. The common pilot signals are generally not precoded since MSs use these signals as a reference for PMI calculation. The common pilot signals can also be used for data demodulation. However, for data demodulation, precoded dedicated signals are generally considered more useful because the channel estimation performance may be improved due to precoding gain on the pilot signals. The dedicated pilot signals are targeted for a desired MS and cannot be used by other MSs in the cell as a reference because the dedicated pilot signals are precoded with an MS specific precoding vector or matrix. The dedicated pilot or reference signals also result in smaller overhead because the number of pilot signals required is equal to the number of MIMO layers transmitted, which may be smaller than the total number of transmit antennas in the system due to MIMO rank adaptation.

SUMMARY OF THE INVENTION

An aspect of the present invention is to address at least the above-mentioned problems and/or disadvantages and to provide at least the advantages described below. Accordingly, an aspect of the present invention is to provide techniques for pilot stream remapping in an Orthogonal Frequency Division Multiplexing (OFDM) wireless communication system.

In accordance with an aspect of the present invention, a method for transmitting pilot data in a wireless communication system is provided. The method includes determining a pilot pattern in at least one resource block for each of one or more pilot streams, and transmitting the one or more pilot streams based on the determined respective pilot pattern in the at least one resource block. The at least one resource block may comprise a plurality of subcarriers and a plurality of OFDM symbols.

In accordance with another aspect of the present invention, a method for receiving pilot data in a wireless communication system is provided. The method includes determining a pilot pattern in at least one resource block for a pilot stream, and receiving the pilot stream based on the determined pilot pattern in the at least one resource block. The at least one resource block may comprises a plurality of subcarriers and a plurality of OFDM symbols.

In accordance with yet another aspect of the present invention, a base station apparatus for transmitting pilot data in a wireless communication system is provided. The apparatus includes a pilot pattern determiner, a subcarrier mapper and an OFDM modulator, and a transmitter. The pilot pattern determiner determines a pilot pattern in at least one resource block for each of one or more pilot streams. The subcarrier mapper and the OFDM modulator include the one or more pilot streams in the at least one resource block based on the determined respective pilot pattern. The transmitter transmits the at least one resource block. The at least one resource block may comprise a plurality of subcarriers and a plurality of OFDM symbols.

In accordance with still another aspect of the present invention, a mobile station apparatus for receiving pilot data in a wireless communication system is provided. The apparatus includes a receiver, a pilot pattern determiner and an OFDM demodulator and a subcarrier demapper. The receiver receives a signal including pilot stream in at least one resource block. The pilot pattern determiner determines a pilot pattern in at least one resource block for the pilot stream. The OFDM demodulator and the subcarrier demapper extract the pilot stream from the at least one resource block based on the determined pilot pattern. The at least one resource block comprises a plurality of subcarriers and a plurality of OFDM symbols.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 32A-32C illustrate pilot locations within RBs for rank-1 or one data stream transmission based on pilot stream sets '1' and '2' for each of pilot pattern sets '0', '1', and '2' according to exemplary embodiments of the present invention;

FIGS. 33A-33C illustrate pilot locations within RBs for rank-1 or one data stream transmission based on pilot stream sets '0' and '1' for each of pilot pattern sets '0', '1', and '2' according to exemplary embodiments of the present invention;

Throughout the drawings, like reference numerals will be understood to refer to like parts, components, and structures.

DETAILED DESCRIPTION OF EXEMPLARY EMBODIMENTS

Figure 1:
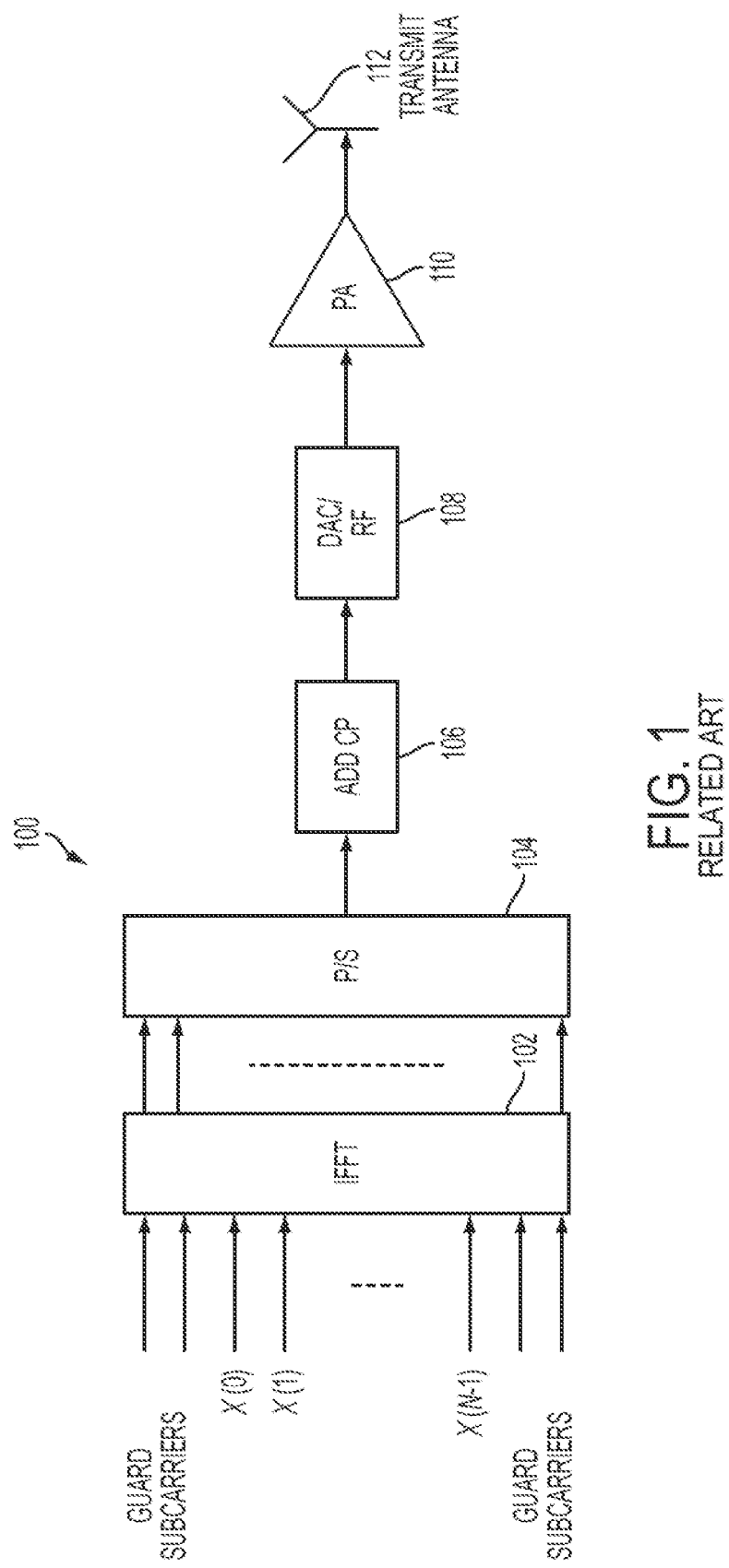
FIG. 1 illustrates an Orthogonal Frequency Division Multiplexing (OFDM) transmitter according to the related art.
Figure 2:
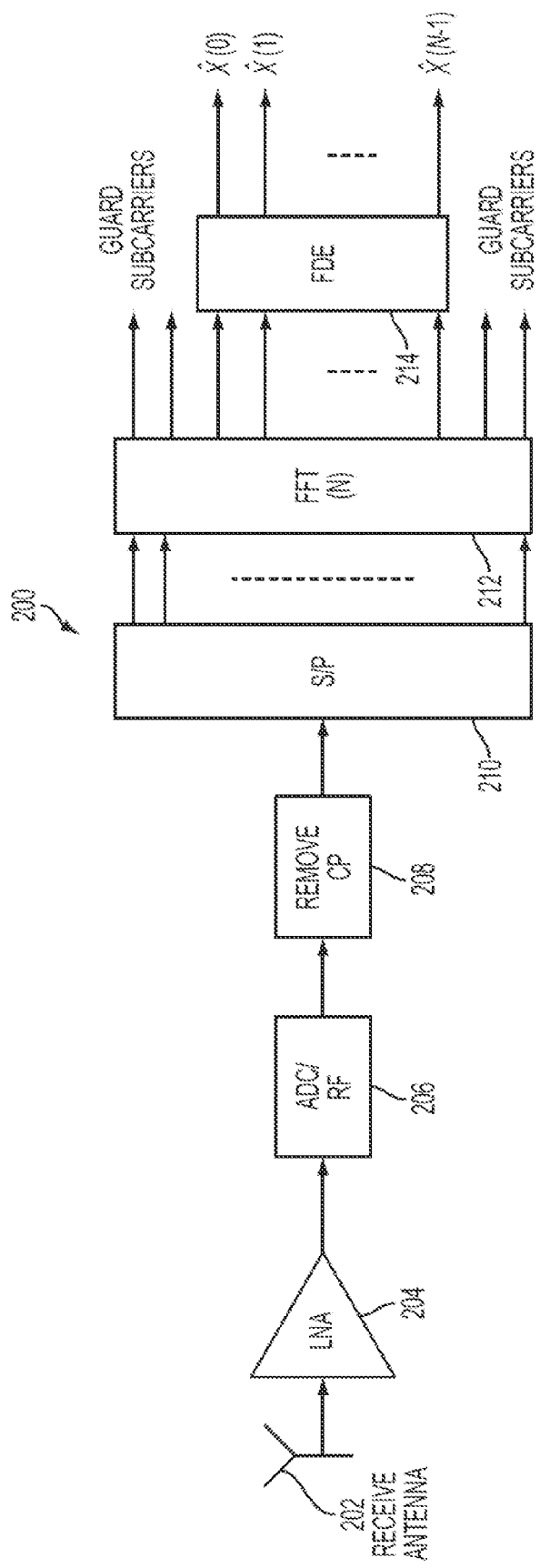
FIG. 2 illustrates an OFDM receiver according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be understood that the following description might refer to terms utilized in various standards merely for simplicity of explanation. For example, the following description may refer to terms utilized in at least one of a 3$^{rd}$ Generation Partnership Project (3GPP) Long Term Evolution (LTE) standard, a 3GPP2 Ultra Mobile Broadband (UMB) standard, and an Institute of Electrical and Electronics Engineers (IEEE) 802.16m standard, etc. However, this description should not be interpreted limiting the present invention to application with any particular standard. Independent of the mechanism used to implement any of the techniques described herein, it is advantageous for these techniques to conform to a standardized mechanism.

Exemplary embodiments of the present invention described below may refer to a Mobile Station (MS). However, the use of the term "MS" is merely for convenience in explanation. The MS may also be referred to as an Advanced MS (AMS), a User Equipment (UE), a user device, a terminal, a user terminal, a mobile terminal, a user station, a mobile station, etc. Similarly, exemplary embodiments of the present invention described below may refer to a Base Station (BS). However, the use of the term "BS" is merely for convenience in explanation. The BS may also be referred to as an Advanced BS (ABS), a Femtocell BS, a Relay, a Picocell, a Microcell, a Macrocell, a Ubicell, etc.

Exemplary embodiments of the present invention described below relate to techniques for use in Orthogonal Frequency Division Multiplexing (OFDM) or Orthogonal Frequency Division Multiple Access (OFDMA) wireless communication systems. More specifically, exemplary embodiments of the present invention described below relate to techniques for pilot pattern remapping in OFDM or OFDMA wireless communication systems when Multiple Input Multiple Output (MIMO) is employed. The terms OFDM and OFDMA may be interchangeably used herein. An aspect of these exemplary embodiments of the present invention is to provide an efficient pilot pattern that enables accurate channel estimation for the purpose of measurement and demodulation when a plurality of antennas are employed.

The resources of an OFDM or OFDMA wireless communication system may often be organized in a unit of a Resource Block (RB). An RB, which may be also referred to as a Physical Resource Block (PRB), denotes a set of time-frequency resources contiguous in time and frequency. For example, in a wireless communication system based on the 3GPP LTE standard, a RB is defined as 12 contiguous subcarriers across 14 OFDM symbols. In a wireless communication system based on the 3GPP2 UMB standard, a RB is defined as 16 contiguous subcarriers across 8 OFDM symbols. In a wireless communication system based on the IEEE 802.16m standard, a RB is defined as 18 contiguous subcarriers across 6 OFDM symbols. Note that in some systems, a Virtual Resource Blocks (VRB) may also be defined to have the same size as a PRB, but the resources within a VRB are not necessarily contiguous. The resources of an OFDM or OFDMA system are often allocated on one of a PRB or VRB basis. For simplicity, PRB and a Physical Resource Unit (PRU) may be interchangeably referred to herein. Similarly, VRB and a Virtual Resource Unit (VRU) may be interchangeably referred to herein.

In a MIMO OFDM wireless communication system, there are two major types of pilots, namely common pilots and dedicated pilots. A common pilot is often transmitted via one physical antenna, while a dedicated pilot is often transmitted via multiple antennas and goes through the same spatial domain processing as a stream of data. For ease in explanation, it is assumed that common pilots are transmitted via a single physical antenna. Note that, although not typical, a common pilot may be transmitted through multiple physical antennas as well. And the exemplary embodiments of the present invention are certainly applicable to such common pilots. One type of common pilot is referred to as a reference pilot or midamble, which may also be referred to as a Channel Quality Indication (CQI) pilot or measurement pilot. These pilot signals are used primarily for a receiver to measure channel quality information and MIMO related information such as rank, preferred precoder, etc. These pilots are not designed to support data channel demodulation, although such usage is certainly not prohibited. Dedicated pilots are often used in the demodulation of data and control transmitted on a RB. Compared with common pilots, dedicated pilots sometimes may bring lower pilot overhead, better channel estimation, and lower signaling overhead. Due to these benefits, dedicated pilots are often used in MIMO OFDM wireless communication systems for data channel transmission, while common pilots, or midambles, are used for control channel transmission or CQI channels.

In a MIMO wireless communication system, multiple streams of data may be transmitted on the same time-frequency resources due to the degree of freedom provided by the spatial/antenna dimension. Typically, one stream of data is referred to as one layer. In the case of the dedicated pilot, the dedicated pilot typically goes through the same spatial processing as a stream of data. In that case, the channel for that stream of data may be directly estimated from the dedicated pilots for that layer, which simplifies channel estimation, reduces pilot overhead, and improves channel estimation performance.

Pilots typically occupy a few resources in the time-frequency grid and are typically spread out in time and frequency so that time and frequency channel variation may be sufficiently obtained. The locations of the pilots are often referred to as a pilot pattern. For dedicated pilots, the pilot patterns are typically defined within an RB. For midambles, the midamble pilot patterns are typically defined for the whole system bandwidth or a large portion of the system bandwidth, although other use cases are certainly possible. For the dedicated pilots and the midambles, both the transmitting and receiving entities should be aware of the pilot patterns or poses information on how to derive them. The transmitting entity should be aware of the pilot patterns or poses information on how to derive them so as to generate the RBs with the appropriate pilot pattern. The receiving entity should be aware of the pilot patterns or poses information on how to derive them so as to process the RBs for the pilots included therein.

First Exemplary Embodiment

Examples of pilot patterns in RBs are described below with reference to FIGS. 10A-10D.

FIGS. 10A-10D illustrate pilot patterns in RBs according to exemplary embodiments of the present invention.

Referring to FIGS. 10A-10D, RBs of 18 subcarriers by 6 OFDM symbols are shown. Each of the RBs of FIGS. 10A-10D employ a different pilot pattern.

In a rich-scattering wireless radio environment, 8-layer transmission may be used when 8 transmit antennas are employed in a MIMO OFDM wireless communication system. In an outdoor radio environment, the channel variation in the time and frequency domain may be significant due to high mobility and large delay spread. In such a radio environment, each layer transmission may use 3 dedicated pilot subcarriers per RB, where an RB is defined as 18 subcarriers by 6 OFDM symbols, by 5 OFDM symbols, or by 7 OFDM symbols.

Exemplary embodiments of the present invention may be described herein in the context of an 8-transmit antenna wireless communication system with 8-layer transmission. However, the present invention is equally applicable to wireless communication systems with other numbers of transmit antennas, and to transmissions with other numbers of layers. Examples of 8 dedicated pilot patterns for 8-layer transmission is described below with reference to FIGS. 11A-11C.

Figure 11A:
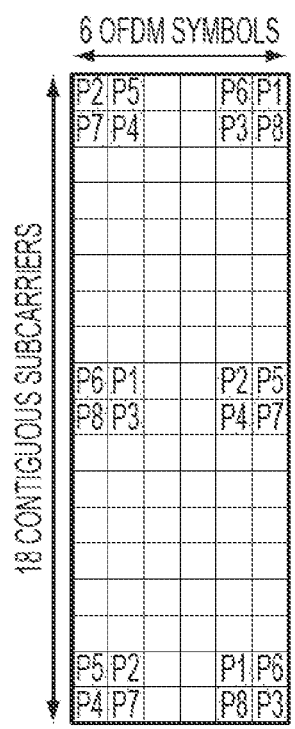
FIGS. 11A-11C illustrate pilot patterns in RBs with 8 dedicated pilot patterns for 8-layer transmission according to exemplary embodiments of the present invention.
Figure 11B:
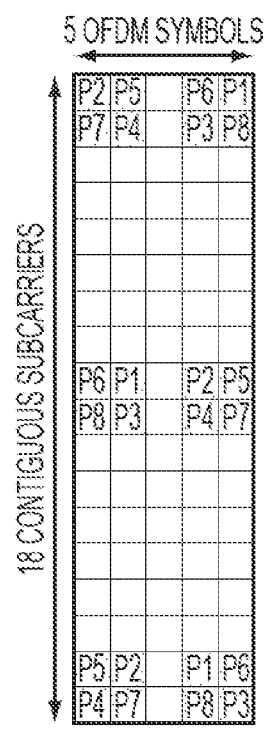
Figure 11C:
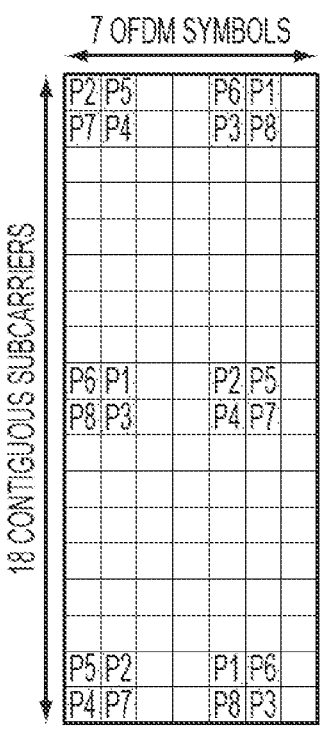

FIGS. 11A-11C illustrate pilot patterns in RBs with 8 dedicated pilot patterns for 8-layer transmission according to exemplary embodiments of the present invention.

Referring to FIGS. 11A-11C, RBs are shown with 8 dedicated pilot patterns for 8-layer transmission with each layer using 3 dedicated pilot subcarriers in RBs of 18 subcarriers by 6 OFDM symbols, RBs of 18 subcarriers by 5 OFDM symbols, and RBs of 18 subcarriers by 7 OFDM symbols, respectfully. P1, P2, . . . , and P8 are the dedicated pilot patterns for layer 1, layer 2, . . . and layer 8 transmission in FIGS. 11A-11C.

In the case of multiple-transmit antenna MIMO OFDM wireless communication systems, multiple RBs may be allocated for a single transmission. In another exemplary embodiment of the present invention, one pilot stream is remapped to a first pilot pattern in a first RB and the said one pilot stream is remapped to a second pilot pattern in a second RB. For the purpose of illustration, we assume the pilot patterns are those defined as in FIG. 11A. An example of pilot stream remapping is described below with reference to FIG. 12.

Figure 12:
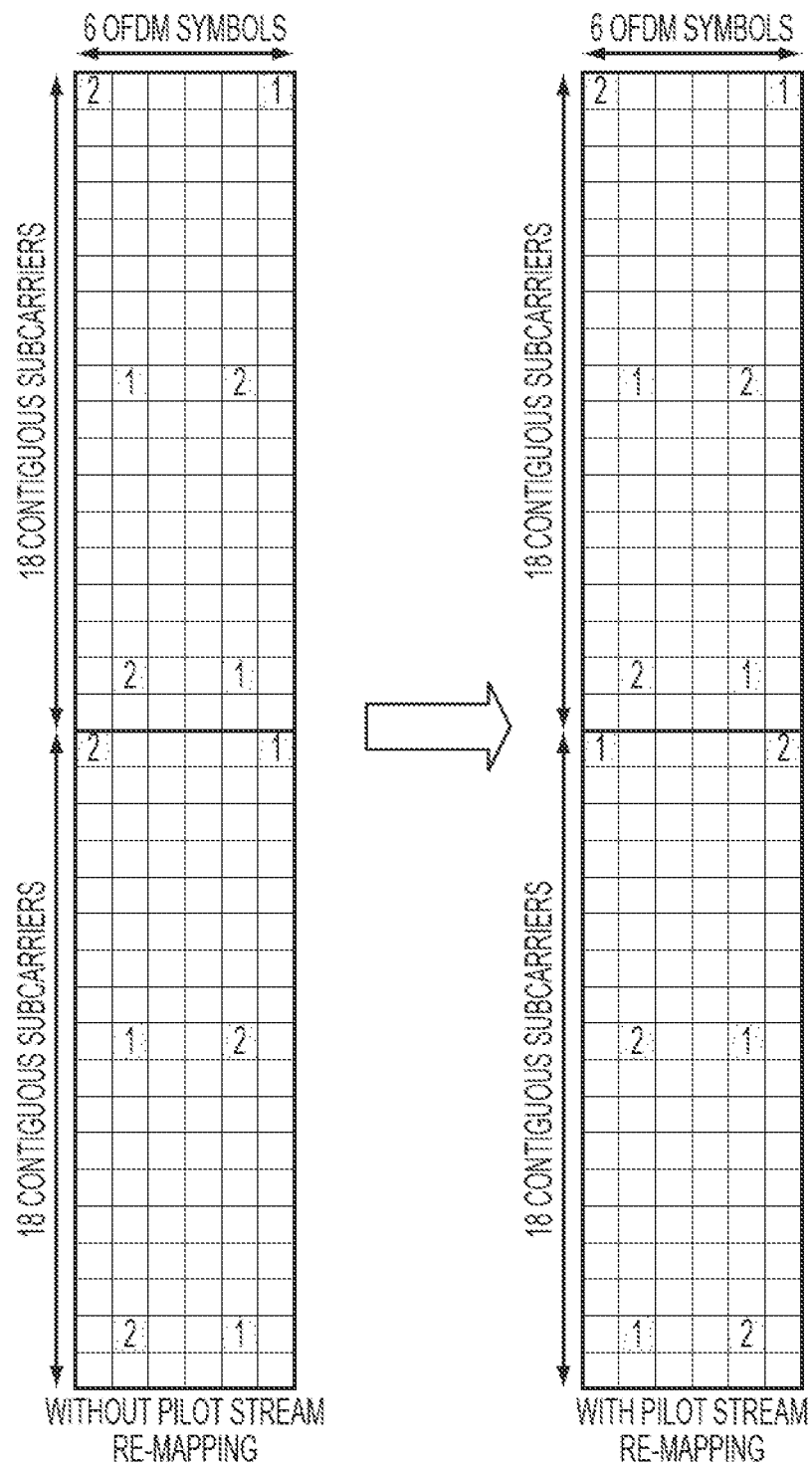
FIG. 12 illustrates pilot stream remapping according to an exemplary embodiment of the present invention.

FIG. 12 illustrates pilot stream remapping according to an exemplary embodiment of the present invention.

Referring to FIG. 12, two consecutive RBs are assigned to a single transmission. In each RB, two data streams and two pilot streams are transmitted. Note that, in this exemplary embodiment, there are three pilot subcarriers for pilot pattern 1 within an RB (shown as three shaded grids marked with number '1') with one pilot subcarrier located at the left-hand side of the subframe and two pilot subcarriers located at the right-hand size of the subframe. Without pilot stream remapping, the same pilot pattern 1 is used for pilot stream 1 in both RBs, resulting in two of the six pilot subcarriers for pilot stream 1 located at the left-hand side of the subframe and four of the six pilot subcarriers for pilot stream 1 located at the right-hand side of the subframe. This outcome is undesirable because the imbalance of pilot density in the time domain. With pilot stream remapping, pilot pattern 1 is used for pilot stream 1 in the first RB while pilot pattern 2 is used for pilot stream 1 in the second RB. As shown in the FIG. 12, the pilot subcarriers for pilot stream 1 are now more evenly distributed in the time domain, resulting in a better pilot pattern and improved channel estimation performance. Note that in this exemplary embodiment, pilot pattern 1 and pilot pattern 2 are symmetric in time.

The remapping from pilot streams to pilot patterns may alternatively be described as the association of data streams with pilot patterns. For instance, the exemplary embodiment shown in FIG. 12 may be alternatively described as associating data stream 1 with pilot pattern 1 in the first RB and associating data stream 1 with pilot pattern 2 in the second RB.

The disclosed pilot stream remapping method may be used to define pilot patterns across a plurality of consecutive RBs. An example of pilot stream remapping used to define pilot patterns across a plurality of consecutive RBs is described below with reference to FIGS. 13A-13C.

Figure 13A:
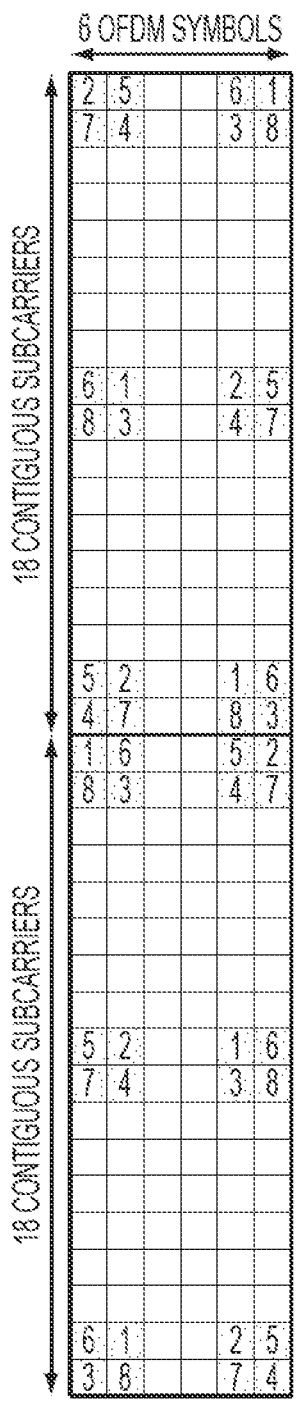
FIGS. 13A-13C illustrate pilot stream remapping used to define pilot patterns across a plurality of consecutive RBs according to exemplary embodiments of the present invention.
Figure 13B:
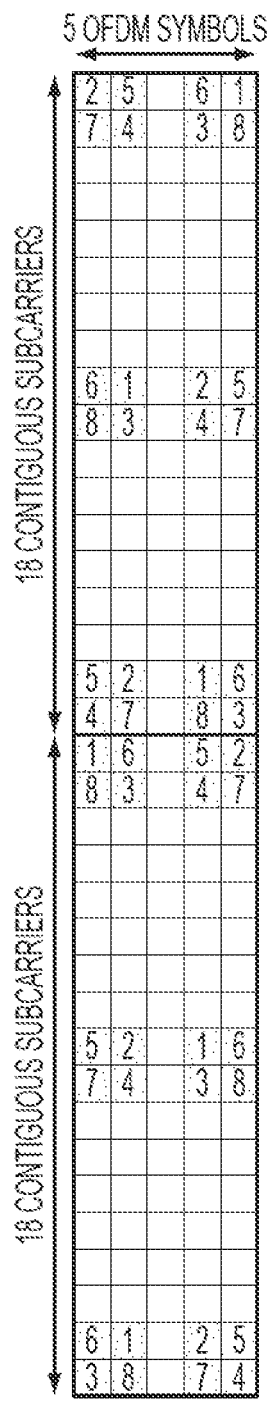
Figure 13C:
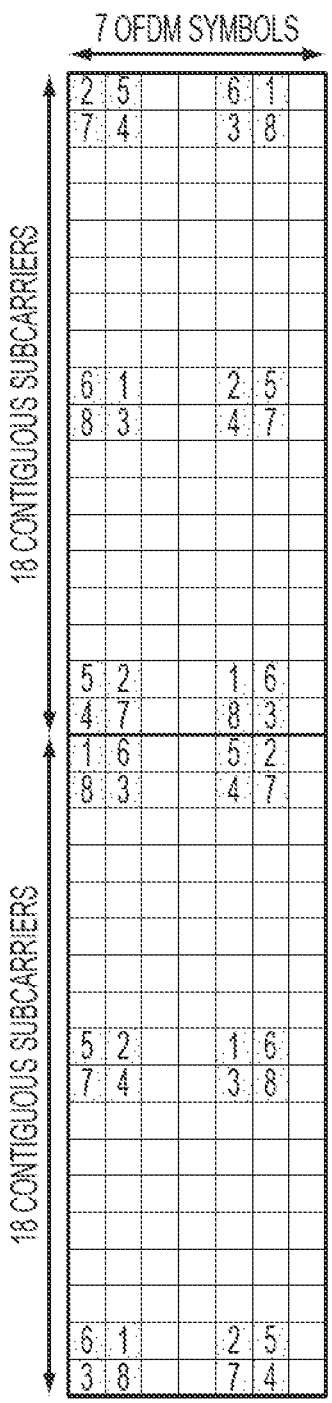

FIGS. 13A-13C illustrate pilot stream remapping used to define pilot patterns across a plurality of consecutive RBs according to exemplary embodiments of the present invention.

Referring to FIGS. 13A-13C, the pilot patterns for the first RB correspond to the pilot patterns described in FIGS. 11A-11C, respectively. In the second RB, the pilot pattern remapping maps pilot patterns in the second RB to the corresponding pilot patterns in the first RB. For example, as shown in Table 1, pilot pattern 1 in the second RB is the same as pilot pattern 2 in the first RB.

TABLE 1

| Pilot pattern in the second RB | Corresponding pilot pattern in the first RB |
| --- | --- |
| 1 | 2 |
| 2 | 1 |
| 3 | 4 |
| 4 | 3 |
| 5 | 6 |
| 6 | 5 |
| 7 | 8 |
| 8 | 7 |

This design helps distribute pilot subcarriers evenly across the time-frequency resources for all the pilot streams. Note that, additionally, great symmetry may be achieved among the pilot patterns, which significantly reduces the complexity of channel estimation. In another exemplary embodiment of the present invention, we use 4 pilot patterns, denoted by pilot pattern 1, 2, 3, and 4, such that pilot pattern 1 and 2 are symmetric in time either in one RB or in two RBs, and that pilot pattern 3 and 4 are symmetric in time either in one RB or in two RBs, and that pilot pattern 1 and 3 are symmetric in frequency in one RB, and that pilot pattern 2 and 4 are symmetric in frequency in one RB, and that pilot pattern 1 and 4 are symmetric in frequency in two RBs, and that pilot pattern 2 and 3 are symmetric in frequency in two RBs.

For example, as shown in FIGS. 13A-13C, the resulting pilot pattern 1 and pilot pattern 2 are symmetric in time in either one RB or in two RBs; pilot pattern 3 and pilot pattern 4 are symmetric in time in either one RB or in two RBs; pilot pattern 1 and pilot pattern 3 are symmetric in frequency in one RB; pilot pattern 2 and pilot pattern 4 are symmetric in frequency in one RB; pilot pattern 1 and pilot pattern 4 are symmetric in frequency in two RBs; pilot pattern 2 and pilot pattern 3 are symmetric in frequency in two RBs. In other words, for either one-resource-block channel estimator or two-resource-block channel estimator, only a single set of Minimum Mean-Square Error (MMSE) channel estimator coefficients will be needed for the pilot pattern set $\{1, 2, 3, 4\}$. This observation is also true for pilot pattern set $\{5, 6, 7, 8\}$.

In an indoor radio environment, the channel variation is less significant in the time and frequency domain due low mobility and low delay spread, as compared to an outdoor radio environment. In this case, less dedicated pilot subcarriers are required to achieve similar channel estimation performance.

In another exemplary embodiment of the present invention, each transmission layer uses 2 dedicated pilot subcarriers per RB. An example where each transmission layer uses 2 dedicated pilot subcarriers per RB is described below with reference to FIGS. 14A-14C.

Figure 14A:
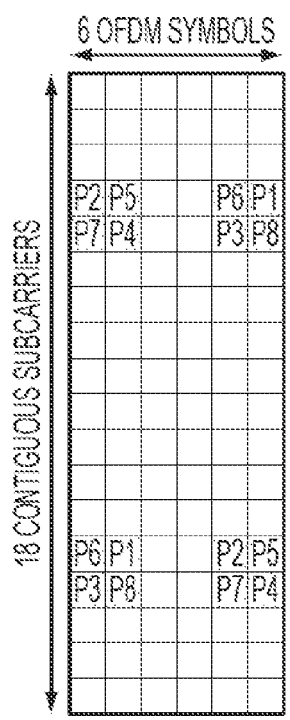
FIGS. 14A-14C illustrate pilot patterns in RBs according to exemplary embodiments of the present invention.
Figure 14B:
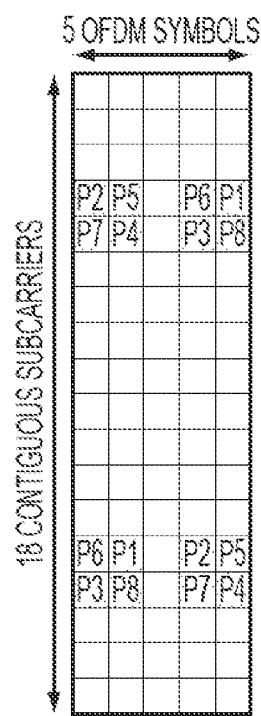
Figure 14C:
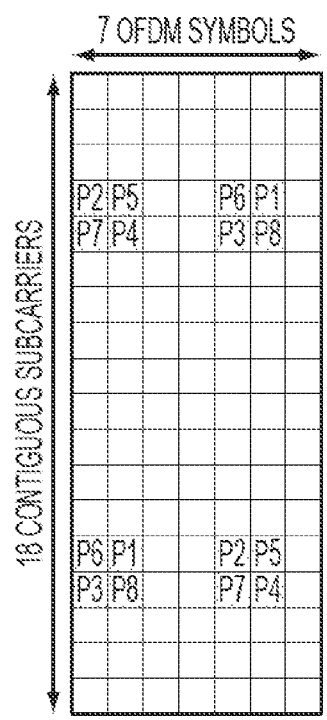

FIGS. 14A-14C illustrate pilot patterns in RBs according to exemplary embodiments of the present invention.

Referring to FIGS. 14A-14C, 8 dedicated pilot patterns for 8-layer transmission with each layer using 2 dedicated pilot subcarriers in RBs of 18 subcarriers by 6 OFDM symbols, by 5 OFDM symbols, and by 7 OFDM symbols, are respectively shown. P1, P2, . . . , and P8 are the dedicated pilot subcarriers for layer 1, layer 2, . . . and layer 8 transmissions in FIGS. 14A-14C.

Another example where each transmission layer uses 2 dedicated pilot subcarriers per RB is described below with reference to FIGS. 15A-15C.

Figure 15A:
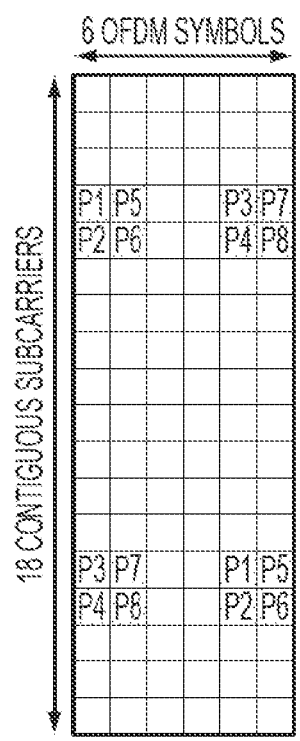
FIGS. 15A-15C illustrate pilot patterns in RBs according to exemplary embodiments of the present invention.
Figure 15B:
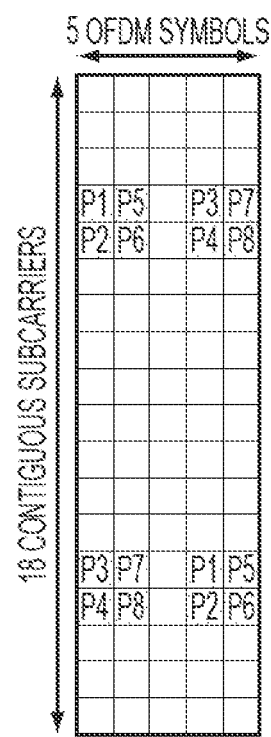
Figure 15C:
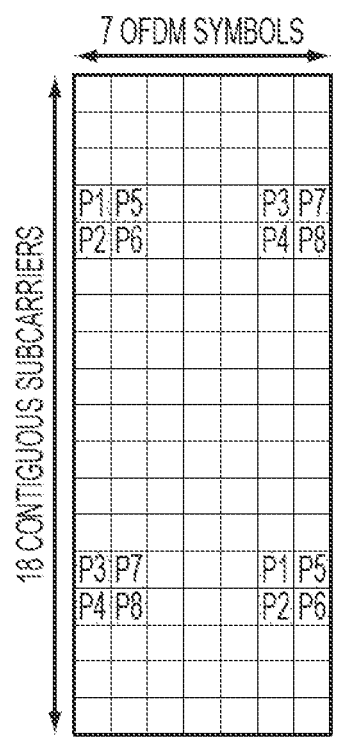

FIGS. 15A-15C illustrate pilot patterns in RBs according to exemplary embodiments of the present invention.

Referring to FIGS. 15A-15C, 8 dedicated pilot patterns for 8-layer transmission with each layer using 2 dedicated pilot subcarriers in RBs of 18 subcarriers by 6 OFDM symbols, by 5 OFDM symbols, and by 7 OFDM symbols, are respectively shown. P1, P2, . . . , and P8 are the dedicated pilot subcarriers for layer 1, layer 2, . . . and layer 8 transmissions in FIGS. 15A-15C.

To accommodate both indoor and outdoor radio environments, in another exemplary embodiment of the present invention, a BS configures 8 dedicated pilot patterns with either 3 or 2 dedicated pilot subcarriers per RB for each MS with 8-layer transmission, depending on the feedback CQI/Precoding Matrix Indication (PMI) information from each MS. Namely, a BS may decide to use 8 dedicated pilot patterns with 3 dedicated pilot subcarriers per RB per pilot stream when the MS is in an outdoor radio environment, and may decide to use 8 dedicated pilot patterns with 2 dedicated pilot subcarriers per RB per pilot stream when the MS is in indoor radio environment. A BS may decide whether an MS is in an indoor or outdoor environment based on its feedback CQI information. The CQI may be sub-band CQI, which provides the level of channel variation in both the time and frequency domain.

In the case of Hybrid Automatic Repeat Request (HARQ) operation, retransmission may occur frequently for 8-layer transmission in MIMO OFDM wireless communication systems when 8 transmit antennas are employed. In another exemplary embodiment of the present invention, each layer (or stream) may use 3 dedicated pilot subcarriers per RB for the first transmission while each layer (or stream) uses 2 dedicated pilot subcarriers per RB for the retransmission. This is because it typically requires a higher dedicated pilot density (e.g., 3 dedicated pilot subcarriers) to achieve better channel estimation for the first transmission while it requires a lower dedicated pilot density (e.g., 2 dedicated pilot subcarriers) in retransmissions. Examples of dedicated pilot patterns when HARQ is employed, is described below with reference to FIGS. 16A and 21B.

Examples of pilot patterns in RBs of 18 subcarriers by 6 OFDM symbols when HARQ operation is employed is described below with reference to FIGS. 16A and 16B.

Figures 16A, 16B:
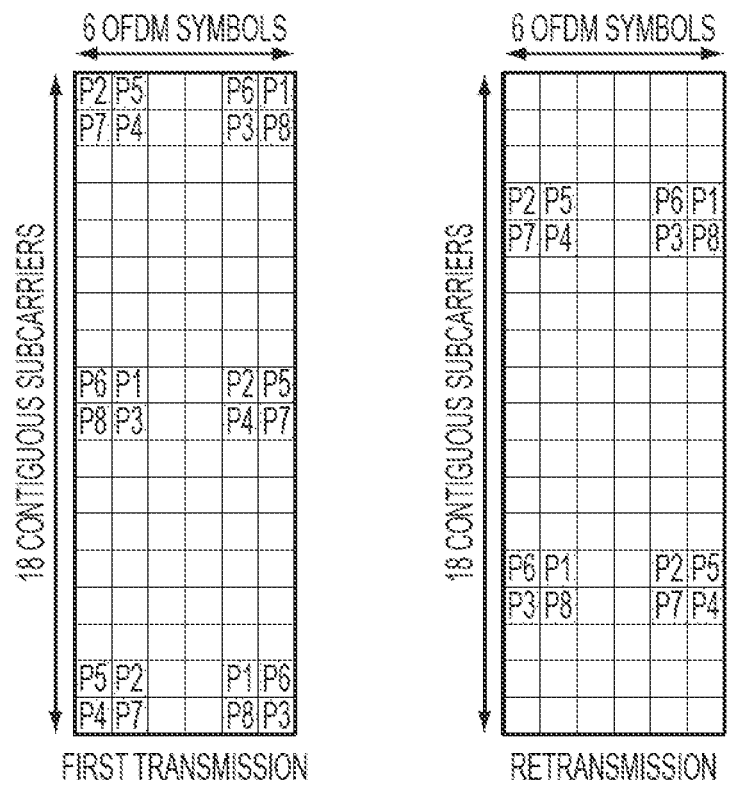
FIGS. 16A and 16B illustrate pilot patterns in RBs of 18 subcarriers by 6 OFDM symbols when Hybrid Automatic Repeat Request (HARQ) operation is employed according to exemplary embodiments of the present invention.

FIGS. 16A and 16B illustrate pilot patterns in RBs of 18 subcarriers by 6 OFDM symbols when HARQ operation is employed according to exemplary embodiments of the present invention.

Figure 8:
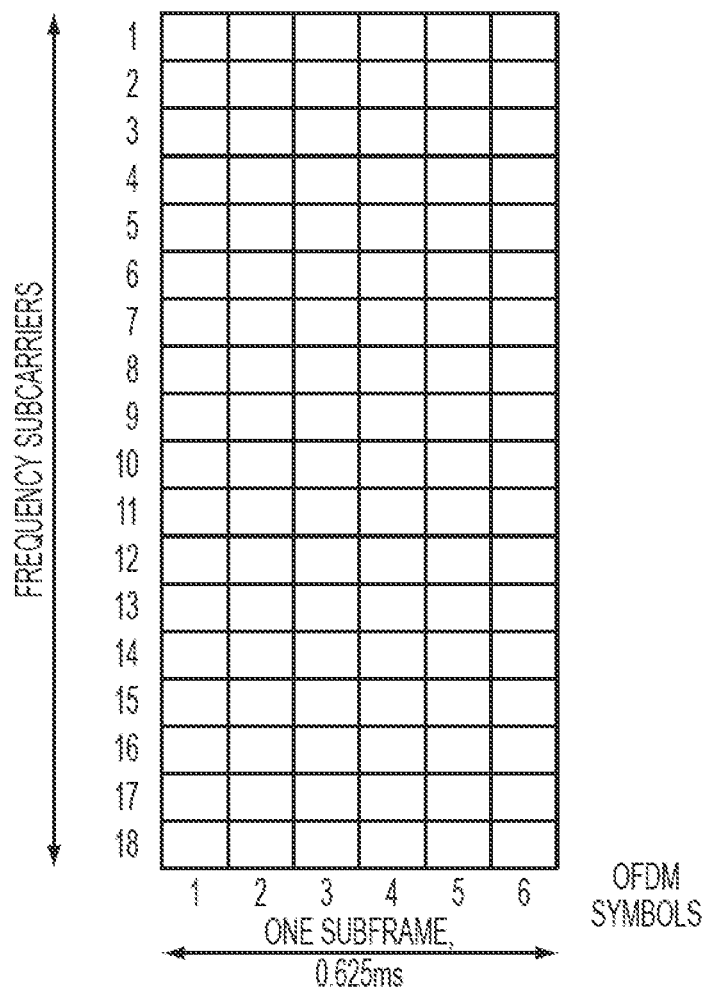
FIG. 8 illustrates an OFDM Resource Block (RB) according to the related art.
Figure 9:
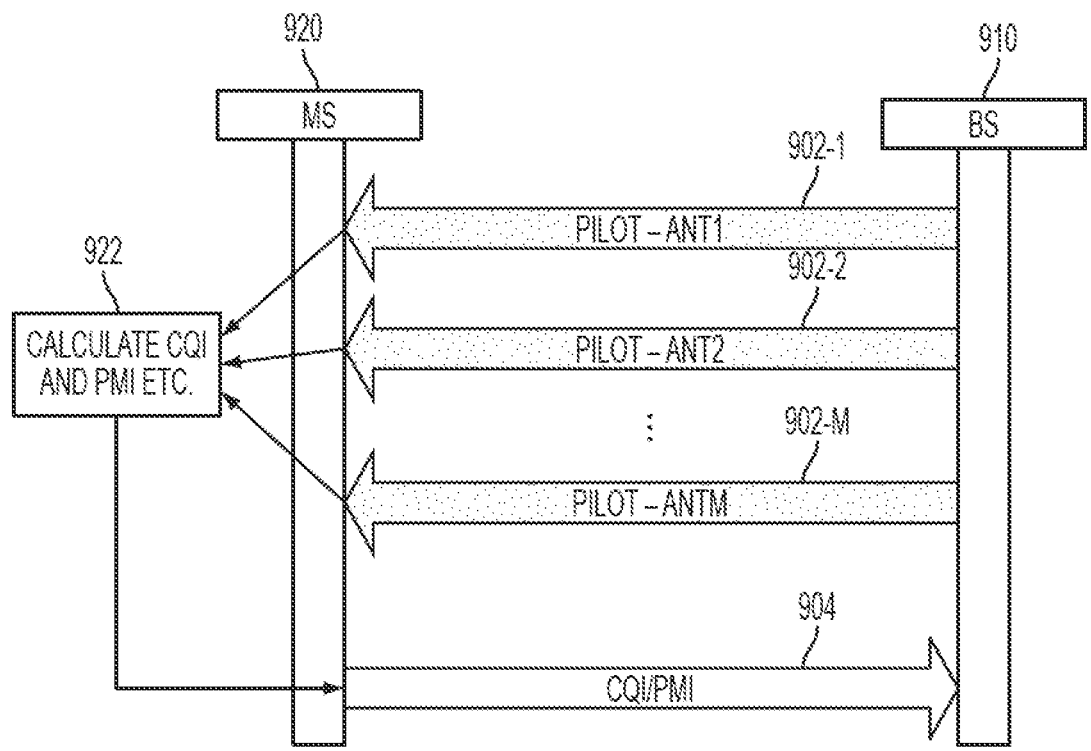
FIG. 9 illustrates Channel Quality Indication (CQI) and Precoding Matrix Indication (PMI) feedback according to the related art.
Figure 10A:
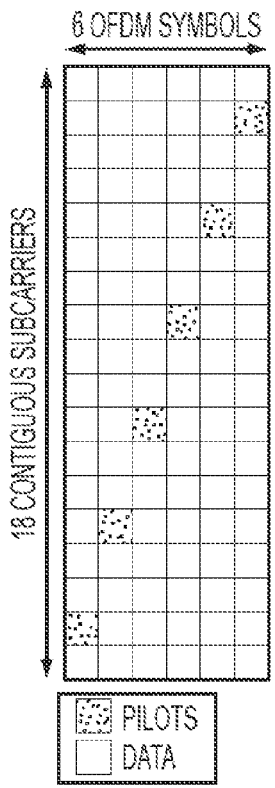
FIGS. 10A-10D illustrate pilot patterns in RBs according to exemplary embodiments of the present invention.
Figure 10B:
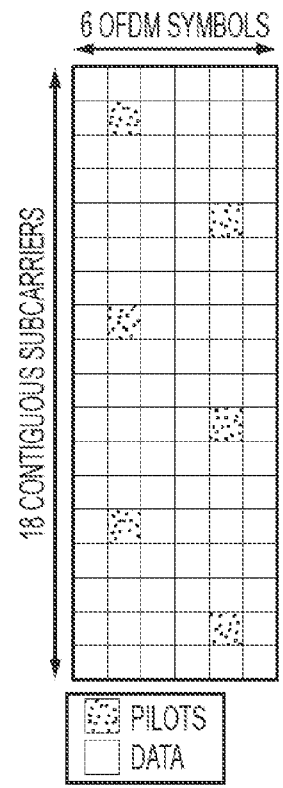
Figure 10C:
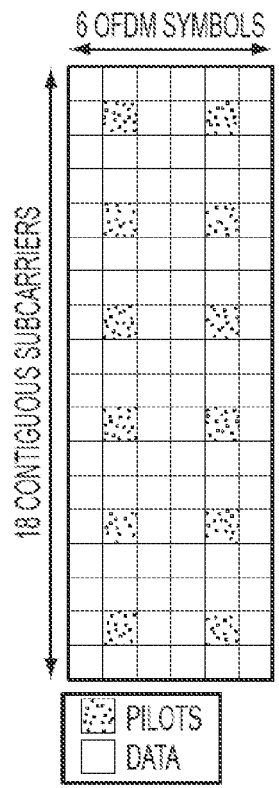
Figure 10D:
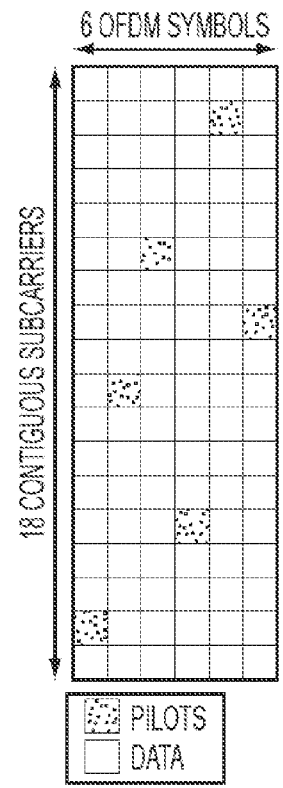

Referring to FIGS. 16A and 16B, 8 dedicated pilot patterns for 8-layer transmission, when HARQ operation is employed, in RBs of 18 subcarriers by 6 OFDM symbols, are shown for the first transmission and retransmission, respectively. P1, P2, . . . , and P8 are the dedicated pilot subcarriers for layer 1, layer 2, . . . and layer 8 transmissions in FIGS. 16A and 16B

Other examples of pilot patterns in RBs of 18 subcarriers by 6 OFDM symbols when HARQ operation is employed is described below with reference to FIGS. 17A and 17B.

Figures 17A, 17B:
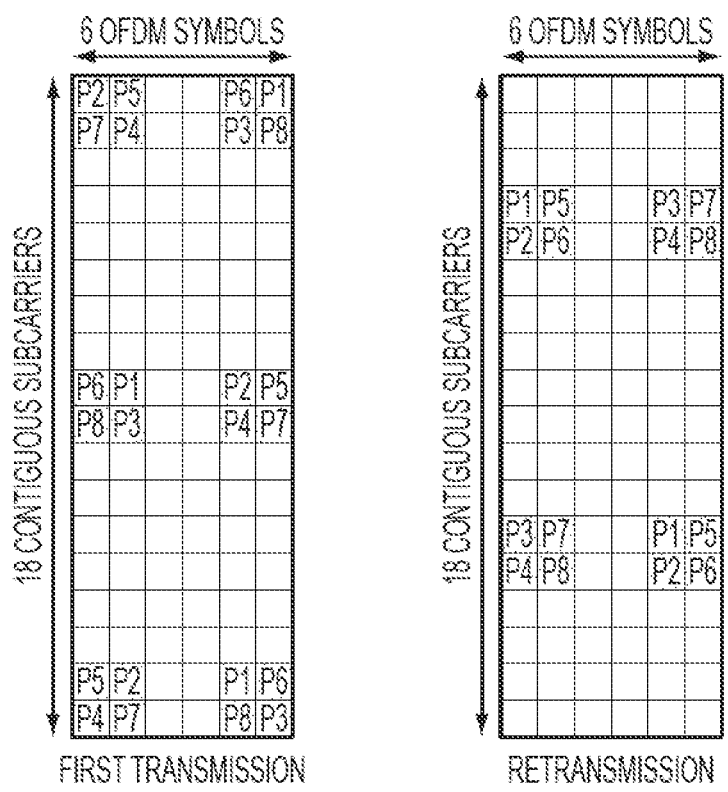
FIGS. 17A and 17B illustrate pilot patterns in RBs of 18 subcarriers by 6 OFDM symbols when HARQ operation is employed according to exemplary embodiments of the present invention.

FIGS. 17A and 17B illustrate pilot patterns in RBs of 18 subcarriers by 6 OFDM symbols when HARQ operation is employed according to exemplary embodiments of the present invention.

Referring to FIGS. 17A and 17B, 8 dedicated pilot patterns for 8-layer transmission, when HARQ operation is employed, in RBs of 18 subcarriers by 6 OFDM symbols is shown for the first transmission and retransmission, respectively. P1, P2, . . . , and P8 are the dedicated pilot subcarriers for layer 1, layer 2, . . . and layer 8 transmissions in FIGS. 17A and 17B.

Examples of pilot patterns in RBs of 18 subcarriers by 5 OFDM symbols when HARQ operation is employed is described below with reference to FIGS. 18A and 18B.

Figure 18A:
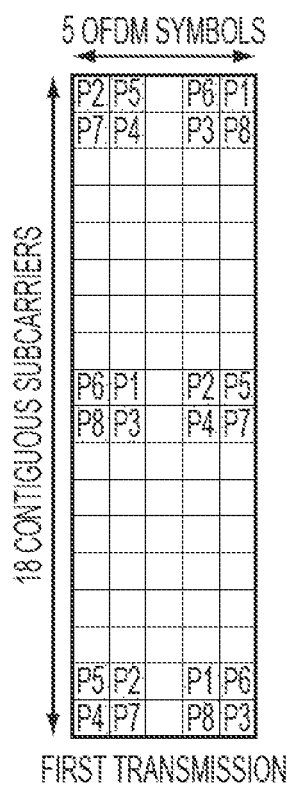
FIGS. 18A and 18B illustrate pilot patterns in RBs of 18 subcarriers by 5 OFDM symbols when HARQ operation is employed according to exemplary embodiments of the present invention.
Figure 18B:
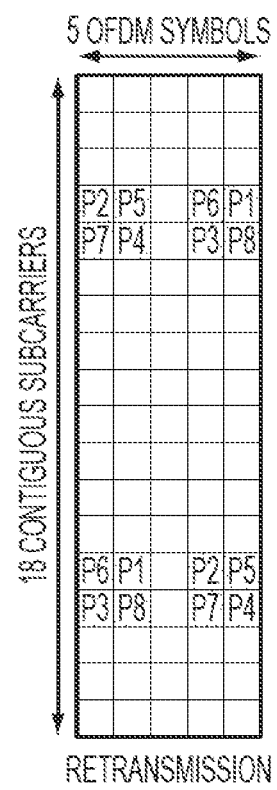

FIGS. 18A and 18B illustrate pilot patterns in RBs of 18 subcarriers by 5 OFDM symbols when HARQ operation is employed according to exemplary embodiments of the present invention.

Referring to FIGS. 18A and 18B, 8 dedicated pilot patterns for 8-layer transmission, when HARQ operation is employed, in RBs of 18 subcarriers by 5 OFDM symbols are shown for the first transmission and retransmission, respectively. P1, P2, . . . , and P8 are the dedicated pilot subcarriers for layer 1, layer 2, . . . and layer 8 transmissions in FIGS. 18A and 18B.

Other examples of pilot patterns in RBs of 18 subcarriers by 5 OFDM symbols when HARQ operation is employed is described below with reference to FIGS. 19A and 19B.

Figures 19A, 19B:
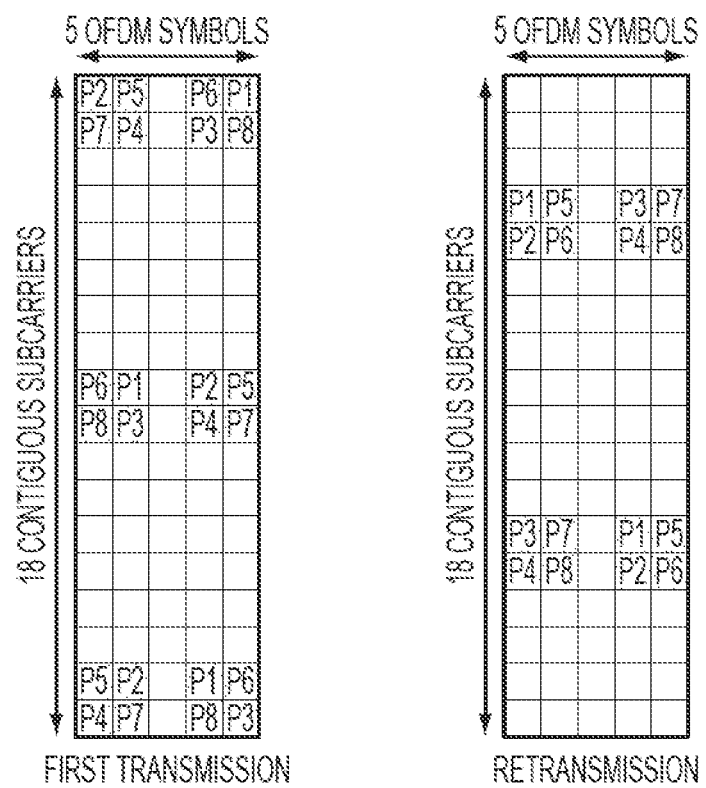
FIGS. 19A and 19B illustrate pilot patterns in RBs of 18 subcarriers by 5 OFDM symbols when HARQ operation is employed according to exemplary embodiments of the present invention.

FIGS. 19A and 19B illustrate pilot patterns in RBs of 18 subcarriers by 5 OFDM symbols when HARQ operation is employed according to exemplary embodiments of the present invention.

Referring to FIGS. 19A and 19B, 8 dedicated pilot patterns for 8-layer transmission, when HARQ operation is employed, in RBs of 18 subcarriers by 5 OFDM symbols is shown for the first transmission and retransmission, respectively. P1, P2, . . . , and P8 are the dedicated pilot subcarriers for layer 1, layer 2, . . . and layer 8 transmissions in FIGS. 19A and 19B.

Examples of pilot patterns in RBs of 18 subcarriers by 7 OFDM symbols when HARQ operation is employed is described below with reference to FIGS. 20A and 20B.

Figure 20A:
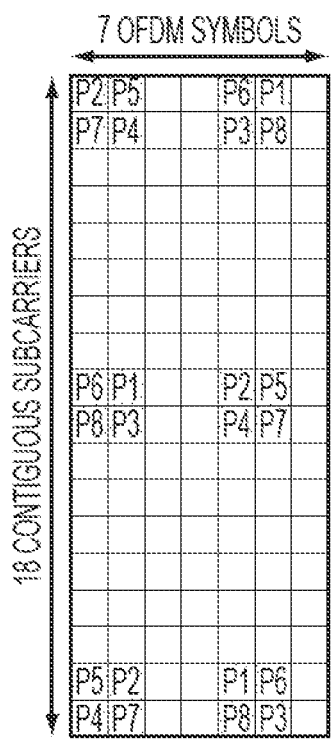
FIGS. 20A and 20B illustrate pilot patterns in RBs of 18 subcarriers by 7 OFDM symbols when HARQ operation is employed according to exemplary embodiments of the present invention.
Figure 20B:
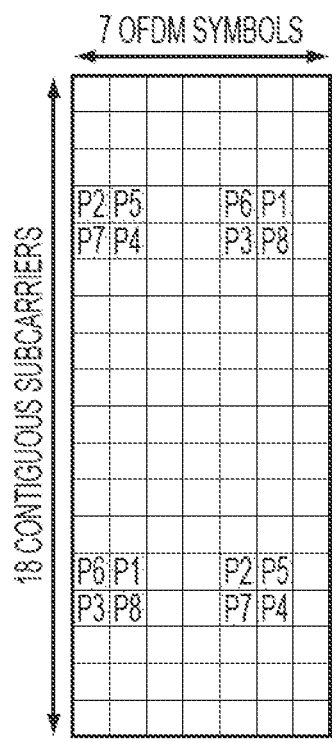

FIGS. 20A and 20B illustrate pilot patterns in RBs of 18 subcarriers by 7 OFDM symbols when HARQ operation is employed according to exemplary embodiments of the present invention.

Referring to FIGS. 20A and 20B, 8 dedicated pilot patterns for 8-layer transmission, when HARQ operation is employed, in RBs of 18 subcarriers by 7 OFDM symbols, is shown for the first transmission and retransmission, respectively. P1, P2, . . . , and P8 are the dedicated pilot subcarriers for layer 1, layer 2, . . . and layer 8 transmission in FIGS. 20A and 20B.

Other examples of pilot patterns in RBs of 18 subcarriers by 7 OFDM symbols when HARQ operation is employed is described below with reference to FIGS. 21A and 21B.

Figure 21A:
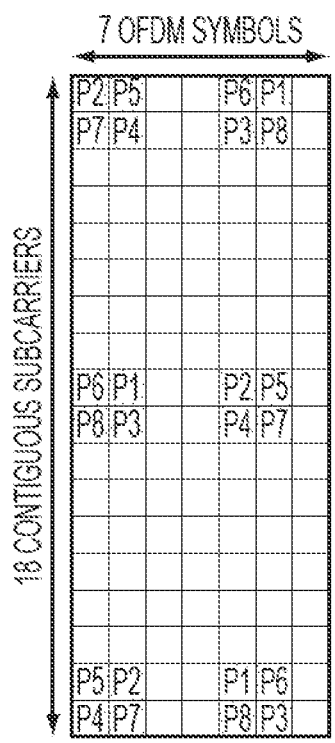
FIGS. 21A and 21B illustrate pilot patterns in RBs of 18 subcarriers by 7 OFDM symbols when HARQ operation is employed according to exemplary embodiments of the present invention.
Figure 21B:
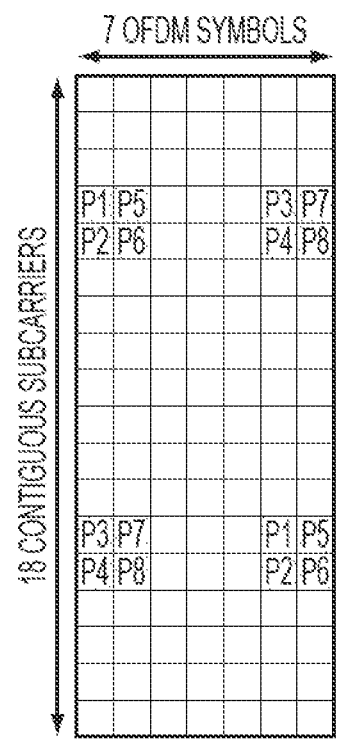

FIGS. 21A and 21B illustrate pilot patterns in RBs of 18 subcarriers by 7 OFDM symbols when HARQ operation is employed according to exemplary embodiments of the present invention.

Referring to FIGS. 21A and 21B, 8 dedicated pilot patterns for 8-layer transmission, when HARQ operation is employed, in RBs of 18 subcarriers by 7 OFDM symbols is shown for the first transmission and retransmission, respectively. P1, P2, . . . , and P8 are the dedicated pilot subcarriers for layer 1, layer 2, . . . and layer 8 transmission in FIGS. 21A and 21B.

In the case of 8-transmit antenna MIMO OFDM wireless communication systems, multiple consecutive RBs may be allocated for an MS with 8-layer transmission in order to achieve peak data throughput. In an exemplary embodiment of the present invention, 8 dedicated pilot patterns of 3 dedicated pilot subcarriers in one RB with a dedicated pilot pattern of 2 dedicated pilot subcarriers for the other RB are permuted. Examples of permutation of multiple consecutive RBs allocated for an MS are described below with reference to FIGS. 22A-22C.

Figure 22A:
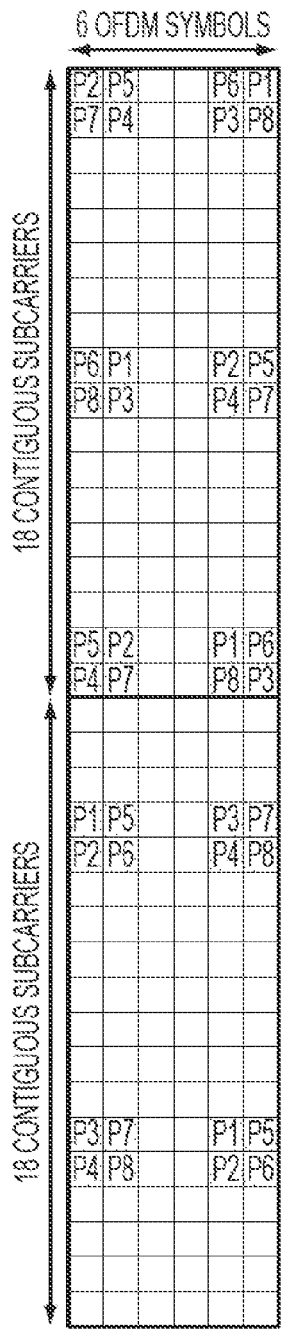
FIGS. 22A-22C illustrate pilot patterns in RBs of multiple consecutive RBs allocated for a Mobile Station (MS) according to exemplary embodiments of the present invention.
Figure 22B:
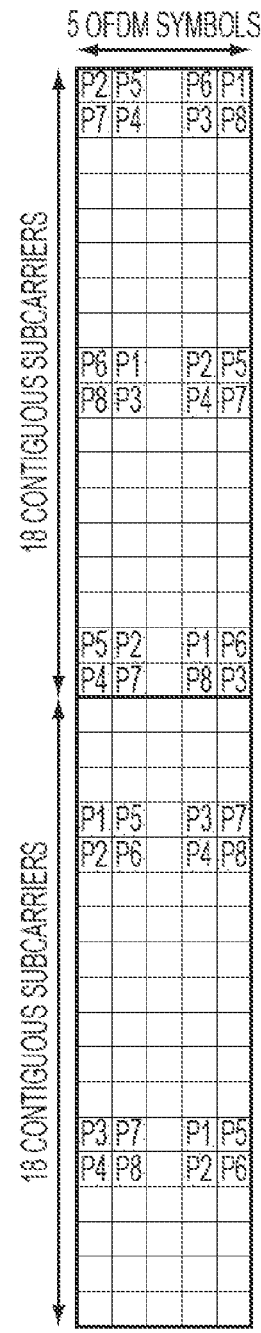
Figure 22C:
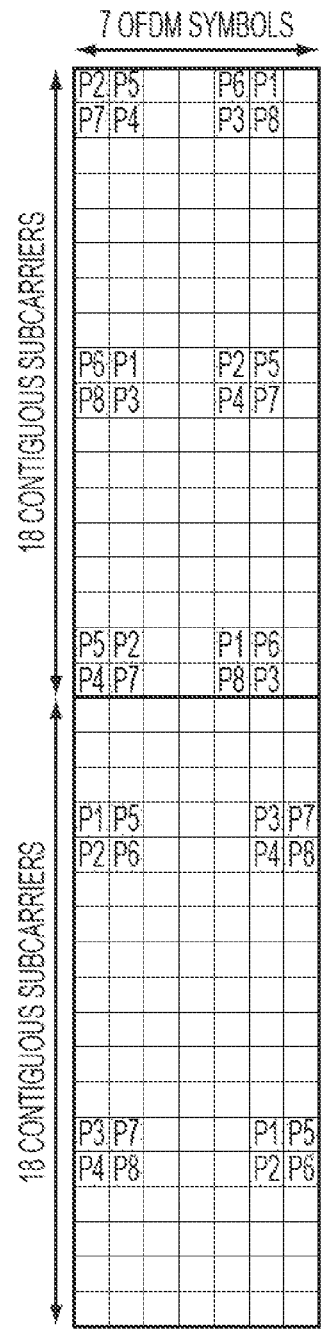

FIGS. 22A-22C illustrate pilot patterns in RBs of multiple consecutive RBs allocated for an MS according to exemplary embodiments of the present invention.

Referring to FIGS. 22A-22C, 8 dedicated pilot patterns for 8-layer transmission, when two consecutive RBs are scheduled for an MS for the cases of 6 OFDM symbols, 5 OFDM symbols, and 7 OFDM symbols, are shown respectively. Here, the overall dedicated pilot subcarrier overhead of the permutated 8-dedicated pilot pattern is reduced by about 16.67%, as compared to the case of the dedicated pilot pattern with 3 dedicated pilot subcarriers per RB.

Other examples of permutation of multiple consecutive RBs allocated for an MS are described below with reference to FIGS. 23A-23C.

Figure 23A:
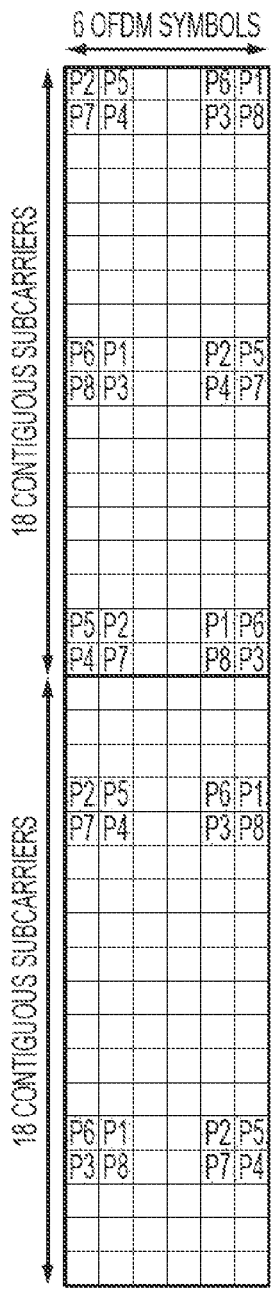
FIGS. 23A-23C illustrate pilot patterns in RBs of multiple consecutive RBs allocated for an MS according to exemplary embodiments of the present invention.
Figure 23B:
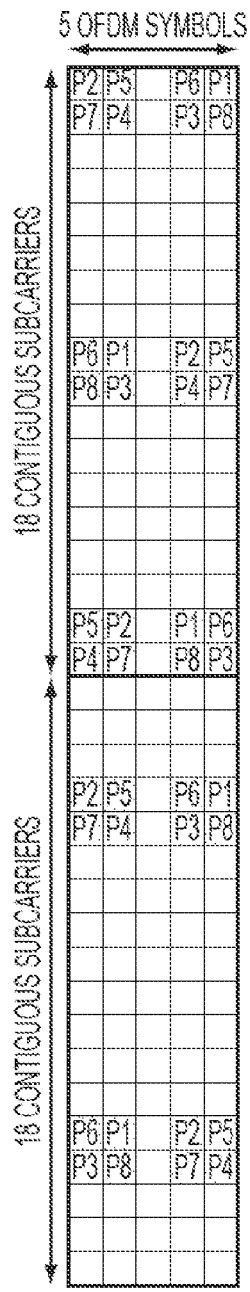
Figure 23C:
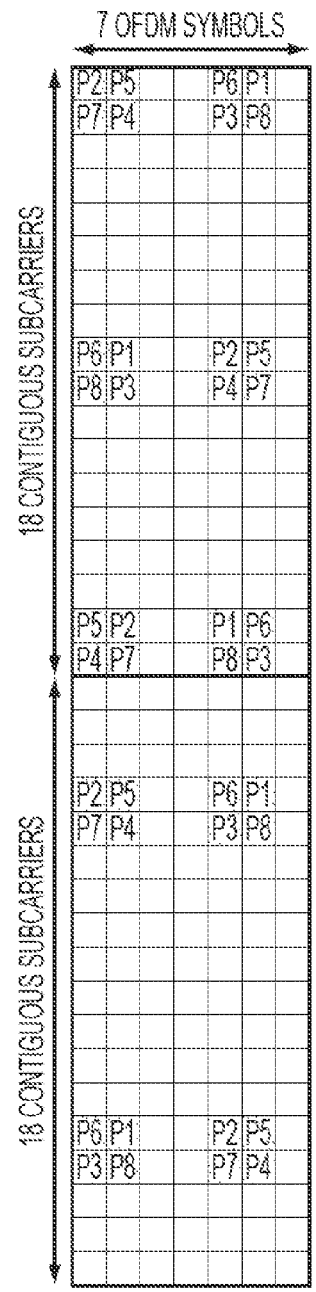

FIGS. 23A-23C illustrate pilot patterns in RBs of multiple consecutive RBs allocated for an MS according to exemplary embodiments of the present invention.

Referring to FIGS. 22A-22C, 8 dedicated pilot patterns for 8-layer transmission, when two consecutive RBs are scheduled for an MS, for the cases of 6 OFDM symbols, 5 OFDM symbols, and 7 OFDM symbols, are shown respectively.

Second Exemplary Embodiment

In another exemplary embodiment of the present invention interlaced pilot patterns may be employed. Examples of interlaced pilot patterns for single layer transmission are described below with reference to FIGS. 24A-24C.

Figure 24A:
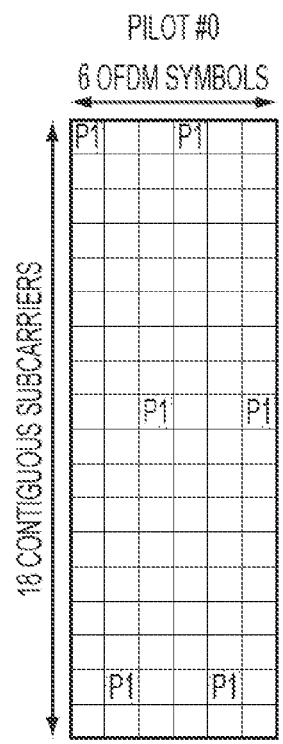
FIGS. 24A-24C illustrates interlaced pilot patterns for single layer transmission according to exemplary embodiments of the present invention.
Figure 24B:
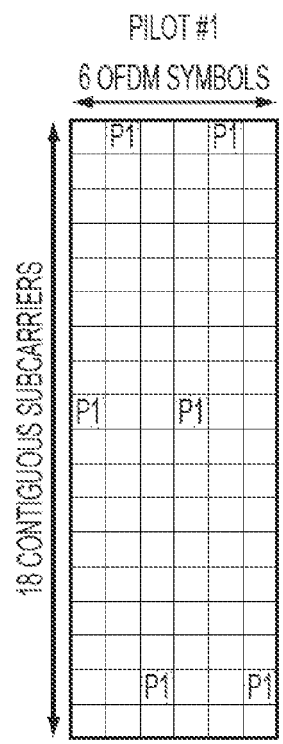
Figure 24C:
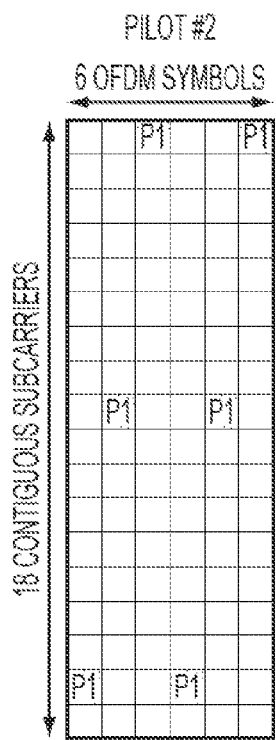

FIGS. 24A-24C illustrates interlaced pilot patterns for single layer transmission according to exemplary embodiments of the present invention.

Referring to FIGS. 24A-24C, 3 interlaced pilot patterns for single layer transmission in RBs of 18 subcarriers by 6 OFDM symbols are shown. The 6 pilot positions marked by 'P$_1$' in FIG. 24A constitute a pilot pattern, the 6 pilot positions marked by 'P$_1$' in FIG. 24B constitute another pilot pattern, and the 6 pilot positions marked by 'P$_1$' in FIG. 24C constitute yet another pilot pattern. The 3 pilot patterns do not overlap with each other. The 3 pilot patterns are cyclically shifted (along the time axis) versions of one another. To this end, these 3 pilot patterns are referred to as an interlaced pilot pattern since these 3 pilot patterns interlace with one another in the time axis. In FIGS. 24A-24C, P$_1$ is a dedicated pilot subcarrier for the single layer transmission. Here, the set of Interlaced_ID (IDentification)={0, 1, 2} is defined for the interlaced Pilot #0, Pilot #1, Pilot #2, as shown in FIGS. 24A-24C, respectively.

Examples of interlaced pilot patterns for dual layer transmission are described below with reference to FIGS. 25A-25C.

Figures 25A, 25B, 25C:
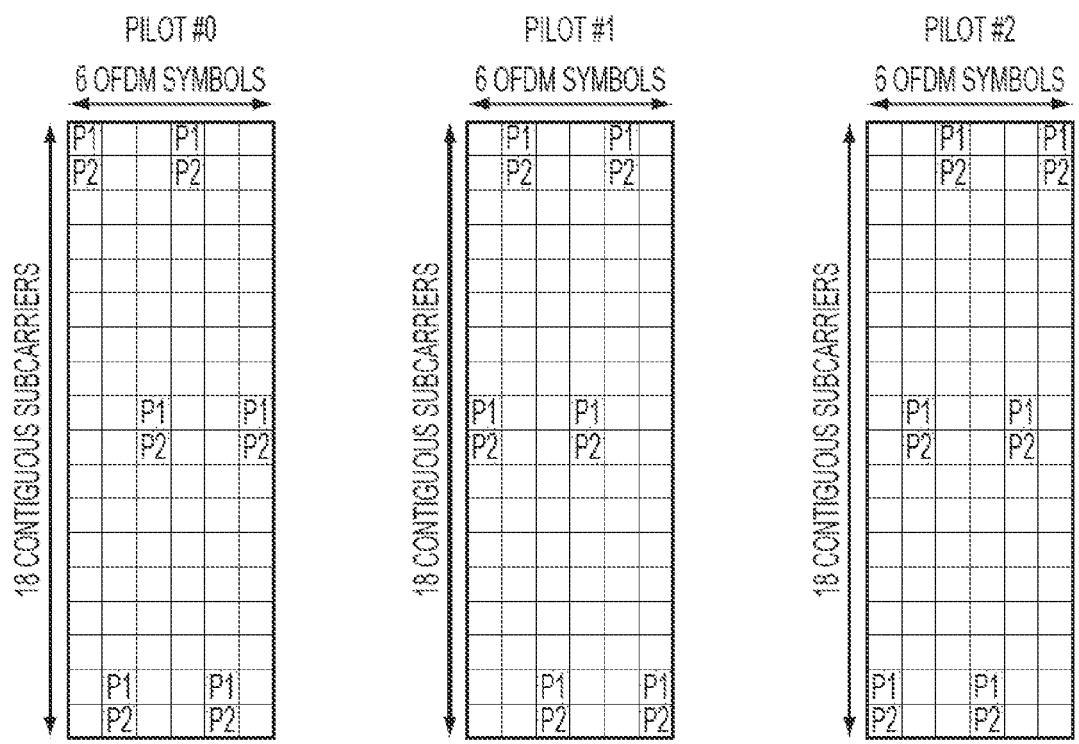
FIGS. 25A-25C illustrates interlaced pilot patterns for dual layer transmission according to exemplary embodiments of the present invention.

FIGS. 25A-25C illustrates interlaced pilot patterns for dual layer transmission according to exemplary embodiments of the present invention.

Referring to FIGS. 25A-25C, 3 interlaced pilot patterns for each layer of the dual layer transmission in RBs of 18 subcarriers by 6 OFDM symbols are shown. P1 and P2 are the dedicated pilot subcarriers for the first layer transmission and the second layer transmission, respectively. Here, the set of Stream_ID={0, 1} for P1 and P2 are the dedicated pilot subcarriers, respectively. The size of Stream_ID set is the maximum number of layers (streams) that the pilot patterns in FIGS. 25A-25C can support. Similar to FIGS. 24A-24C, here, the set of Interlaced_ID={0, 1, 2} is defined for the interlaced Pilot #0, Pilot #1, and Pilot #2, as shown in FIGS. 25A-25C, respectively.

As a result, there are 6 pilot patterns in total in FIGS. 25A-25C, 3 interlaced pilot patterns marked by 'P1', and the other 3 interlaced pilot patterns marked by 'P2'. These pilot patterns are marked by a certain pilot stream ID, i.e., 'P1' or 'P2', because the 3 interlaced pilot patterns marked by 'P1' are typically used for the first pilot stream and the other 3 interlaced pilot patterns marked by 'P2' are typically used for the second pilot stream.

In exemplary embodiments of the present invention, techniques to more efficiently utilize interlaced pilot patterns are described below. In certain cellular wireless communication systems, such as a 3GPP LTE or IEEE 802.16m wireless communication system, physical frequency resources are reused in neighboring cells. Thus, pilot patterns are likely to be reused in neighboring cells as well. An example of the reuse of pilot patterns among neighboring cells is described below with reference to FIG. 26.

Figure 26:
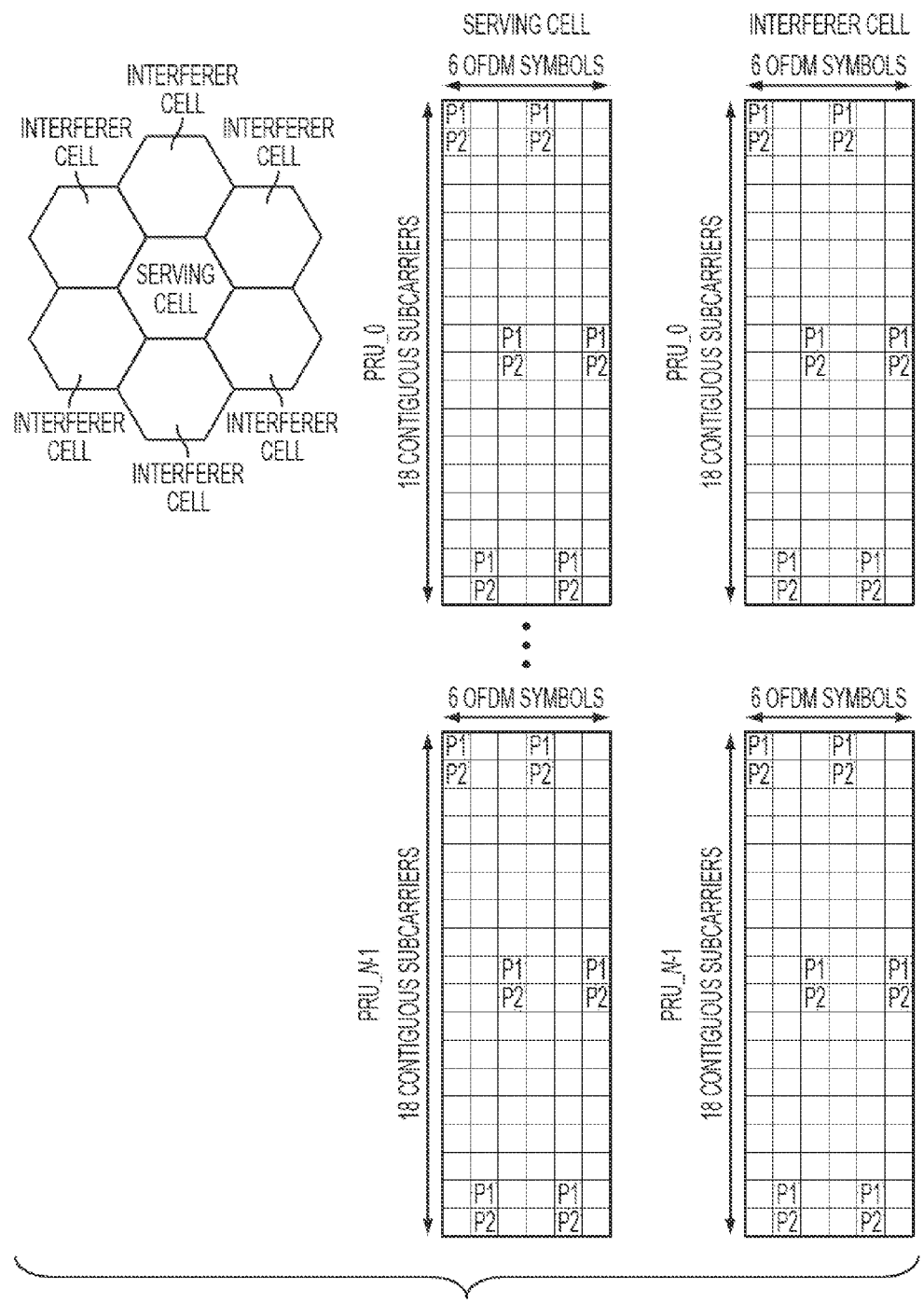
FIG. 26 illustrates pilot pattern reuse among neighboring cells in a wireless communication system according to exemplary embodiments of the present invention.

FIG. 26 illustrates pilot pattern reuse among neighboring cells in a wireless communication system according to exemplary embodiments of the present invention.

Referring to FIG. 26, a serving cell with six neighboring cells is shown in a typical 7-cell cellular wireless communication system. Herein, it is assumed that all of the cells may utilize the same frequency and pilot pattern resources. Thus, the six neighboring cells will be interferer cells to the serving cell. Each of the 7 cells has its own cell ID, also referred to as a Cell_ID. Here, N PRUs are employed and a PRU is an RB of 18 subcarriers by 6 OFDM symbols. PRU_N−1 denotes the N-th PRU. PRU_ID=N is defined for PRU_N−1. One drawback of the reused pilot pattern in FIG. 26 is that it may result in pilot collision if frequency reuse planning is not properly implemented. A pilot collision occurs when the frequency of a pilot subcarrier on a serving cell is reused on the interferer cell. However, even when frequency planning is properly implemented, pilot collision may still occur, for example, due to deployment constraints.

To mitigate the likelihood of pilot collision among cells, in one exemplary embodiment of the present invention, a reshuffling of pilot subcarrier positions of a pilot stream for different PRUs may be performed. In other words, instead of using the same pilot pattern for a pilot stream in different PRUs, the mapping from pilot stream to pilot patterns in different PRUs may be performed. Preferably, the way of changing the mapping is different in different cells such that a first pilot stream in a first cell does not always collide with a second pilot stream in a second cell in all PRUs these two pilot streams are transmitted in. The proposed technique of reshuffling pilot patterns reduces the probability of pilot collision with other cells at different PRUs. The reduced pilot collision due to a reshuffled pilot pattern improves channel estimation, thereby increasing link quality as well system throughput.

In addition, in certain cases, there may be a slight performance difference for the multiple pilot patterns, and cycling (or hopping) each pilot stream through multiple pilot patterns equalizes the performance for one pilot stream vs. another.

In an exemplary embodiment of the present invention, the mapping from a pilot stream to a pilot pattern is defined as a permutation (interleaving) pattern for each PRU. The permutation pattern may be different in different cells/BSs.

The permutation (interleaving) pattern may be determined based on at least one of a BS (or cell) ID (Cell_ID) index and a PRU ID (PRU_ID) index. For example, pilot stream k may be mapped to pilot pattern i as follows:

$$i = f(k, \text{Cell\_ID}, \text{PRU\_ID}, N) \qquad \text{Equation (2)}$$

or $$k = g(i, \text{Cell\_ID}, \text{PRU\_ID}, N) \qquad \text{Equation (3)}$$

where N indicates the pilot pattern sets. For example, N=2 denotes that the pilot stream may hop over the 2-tranmit antenna pilot pattern set, and N=4 denotes that the pilot stream may hop over the 4-tranmit antenna pilot pattern set, etc. In Equations (2) and (3), one of Cell_ID and PRU_ID may be omitted. Examples of determining permutation patterns based on Equations (2) and (3) are as follows:

$$i = (k + c(\text{Cell\_ID}) + m(\text{Cell\_ID}) \times \text{PRU\_ID}) \% N \quad \text{Equation (4)}$$

or $$k = (i + c(\text{Cell\_ID}) + m(\text{Cell\_ID}) \times \text{PRU\_ID}) \% N \quad \text{Equation (5)}$$

where % denotes a modulus operation, c(Cell_ID) denotes a constant depending on the Cell_ID, and m(Cell_ID) denotes a number co-prime to N.

In another exemplary embodiment of the present invention, examples of determining permutation patterns based on Equations (2) and (3) are as follows:

$$i = (k + \text{Cell\_ID} + \text{Cell\_ID} \times \text{PRU\_ID}) \% N \quad \text{Equation (6)}$$

or $$k = (i + \text{Cell\_ID} + \text{Cell\_ID} \times \text{PRU\_ID}) \% N. \quad \text{Equation (7)}$$

In another exemplary embodiment of the present invention, examples of determining permutations pattern based on Equations (2) and (3) with PRU_ID omitted are as follows:

$$i = (k + \text{Cell\_ID}) \% N \quad \text{Equation (8)}$$

or $$k = (i + \text{Cell\_ID}) \% N. \quad \text{Equation (9)}$$

Any number of additional parameters, such as frame indices (superframe number, frame number, subframe number, etc.), may in addition or alternatively be used in Equations (2) and (3) for deriving the mapping from a pilot stream to a pilot pattern. That is, the mapping pattern may vary with time. For example, a timing varying pilot mapping of pilot stream k may be mapped to pilot pattern i as follows:

$$i = f(k, \text{Cell\_ID}, \text{PRU\_ID}, N, \text{frame\_indices}) \quad \text{Equation (10)}$$

or $$k = g(i, \text{Cell\_ID}, \text{PRU\_ID}, N, \text{frame\_indices}). \quad \text{Equation (11)}$$

In Equations (12) and (13), any number of Cell_ID, PRU_ID, and frame_indices may be omitted. In another exemplary embodiment of the present invention, examples of determining permutations pattern based on Equations (10) and (11) are as follows:

$$i = (k + (\text{frame\_indices} \% F) + \text{Cell\_ID} + \text{Cell\_ID} \times \text{PRU\_ID}) \% N \quad \text{Equation (12)}$$

or $$k = (i + (\text{frame\_indices} \% F) + \text{Cell\_ID} + \text{Cell\_ID} \times \text{PRU\_ID}) \% N \quad \text{Equation (13)}$$

where F is the cycle (or period) of the mapping pattern changing, in terms of a number of frames, which may be semi-statically or dynamically configured by a BS.

In another exemplary embodiment of the present invention, examples of determining permutations pattern based on Equations (10) and (11) with PRU_ID omitted are as follows:

$$i = (k + (\text{frame\_indices} \% F) + \text{Cell\_ID}) \% N \quad \text{Equation (14)}$$

or $$k = (i + (\text{frame\_indices} \% F) + \text{Cell\_ID}) \% N \quad \text{Equation (15)}$$

In other exemplary embodiments of the present invention, the permutation (interleaving) pattern may also be determined based on STation ID (STID). STID denotes a user ID, and is also referred to as, an MS ID (or mobile ID).

Here, the permutation (interleaving) pattern may be determined based on at least one of Cell_ID, PRU_ID and STID. For example, pilot stream k may be mapped to pilot pattern i as follows:

$$i = f(k, \text{Cell\_ID}, \text{PRU\_ID}, N, \text{STID}) \quad \text{Equation (16)}$$

or $$k = g(i, \text{Cell\_ID}, \text{PRU\_ID}, N, \text{STID}) \quad \text{Equation (17)}$$

where N indicates the pilot pattern sets. For example, N=2 denotes that the pilot stream can hop over the 2Tx pilot pattern set, and N=4 denotes that the pilot stream can hop over the 4Tx pilot pattern set, etc. In an exemplary embodiment of the present invention, examples of determining permutations pattern based on Equations (16) and (17) are as follows:

$$i = (k + c(\text{Cell\_ID}) + c(\text{STID}) + m(\text{Cell\_ID}) \times \text{PRU\_ID}) \% N \quad \text{Equation (18)}$$

or $$k = (i + c(\text{Cell\_ID}) + c(\text{STID}) + m(\text{Cell\_ID}) \times \text{PRU\_ID}) \% N, \quad \text{Equation (19)}$$

where % is modulus operation, c(Cell_ID) is a constant depending on the Cell_ID, and m(Cell_ID) is a number co-prime to N.

In another exemplary embodiment of the present invention, examples of determining permutations pattern based on Equations (16) and (17) are as follows:

$$i = (k + \text{Cell\_ID} + \text{STID} + \text{Cell\_ID} \times \text{PRU\_ID}) \% N \quad \text{Equation (20)}$$

or $$k = (i + \text{Cell\_ID} + \text{STID} + \text{Cell\_ID} \times \text{PRU\_ID}) \% N. \quad \text{Equation (21)}$$

In another exemplary embodiment of the present invention, examples of determining permutations pattern based on Equations (16) and (17) with PRU_ID omitted are as follows:

$$i = (k + \text{Cell\_ID} + \text{STID}) \% N \quad \text{Equation (22)}$$

or $$k = (i + \text{Cell\_ID} + \text{STID}) \% N. \quad \text{Equation (23)}$$

In another exemplary embodiment of the present invention, examples of determining permutations pattern based on Equations (16) and (17) with Cell_ID omitted are as follows:

$$i = (k + \text{PRU\_ID} + \text{STID}) \% N \quad \text{Equation (24)}$$

or $$k = (i + \text{PRU\_ID} + \text{STID}) \% N. \quad \text{Equation (25)}$$

In another exemplary embodiment of the present invention, examples of determining permutations pattern based on Equations (16) and (17) with Cell_ID and PRU_ID omitted are as follows:

$$i = (k + \text{STID}) \% N \quad \text{Equation (26)}$$

or $$k = (i + \text{STID}) \% N. \quad \text{Equation (27)}$$

Any number of additional parameters, such as frame indices (superframe number, frame number, subframe number, etc.), may also or alternatively be used in Equations (16) and (17) when deriving the mapping from a pilot stream to a pilot pattern. That is, the mapping pattern may vary with time. For example, a timing varying pilot mapping of pilot stream k mapped to pilot pattern i as follows:

$$i = f(k, \text{Cell\_ID}, \text{PRU\_ID}, \text{STID}, N, \text{frame\_indices}) \quad \text{Equation (28)}$$

or $$k = g(i, \text{Cell\_ID}, \text{PRU\_ID}, \text{STID}, N, \text{frame\_indices}) \quad \text{Equation (29)}$$

In another exemplary embodiment of the present invention, examples of determining permutations pattern based on Equations (28) and (29) are as follows:

$$i = (k + (\text{frame\_indices} \% F) + \text{Cell\_ID} + \text{STID} + \text{Cell\_ID} \times \text{PRU\_ID}) \% N \quad \text{Equation (30)}$$

or $$k = (i + (\text{frame\_indices} \% F) + \text{Cell\_ID} + \text{STID} + \text{Cell\_ID} \times \text{PRU\_ID}) \% N \quad \text{Equation (31)}$$

where F is the cycle (or period) of mapping pattern change, in terms of a number of frames, which may be semi-statically or dynamically configured by a BS.

In another exemplary embodiment of the present invention, examples of determining permutations pattern based on Equations (28) and (29) with PRU_ID omitted are as follows:

$$i = (k + (\text{frame\_indices} \% F) + \text{Cell\_ID} + \text{STID}) \% N \quad \text{Equation (32)}$$

or $$k = (i + (\text{frame\_indices} \% F) + \text{Cell\_ID} + \text{STID}) \% N. \quad \text{Equation (33)}$$

In another exemplary embodiment of the present invention, examples of determining permutations pattern based on Equations (28) and (29) with Cell_ID and PRU_ID omitted are as follows:

$$i = (k + (\text{frame\_indices} \% F) + \text{STID}) \% N \quad \text{Equation (34)}$$

or $$k = (i + (\text{frame\_indices} \% F) + \text{STID}) \% N. \quad \text{Equation (35)}$$

The aforementioned rules and/or techniques of mapping streams to pilot patterns may also be applicable in the case of interlaced patterns. In another exemplary embodiment of the present invention, the mapping from a pilot stream to an interlaced pilot pattern is defined as a permutation (interleaving) pattern for each PRU. The permutation (interleaving) pattern may be determined by at least one or more of Cell_ID, frame_indices, F, N, PRU_ID, and STID.

In another exemplary embodiment of the present invention, a permutation pattern may be defined by a sequence of offset values, one value for each PRU. Here, the BS (or MS) may apply the offset value for a PRU in determining the mapping from a pilot stream to a pilot pattern for the said PRU. More than one sequence may be defined such that neighboring BSs may use different sequences for randomizing any pilot collision events. As indicated above, the aforementioned rules and/or techniques of mapping streams to pilot patterns may also be applicable in the case of interlaced patterns. In another embodiment of the invention, the mapping from a pilot stream to an interlaced pilot pattern is defined as a permutation (interleaving) pattern for each PRU. Here, the permutation (interleaving) pattern may be determined by the BS (or cell) index and the PRU_ID index.

For example, assuming a sequence $s_n = [s_{n,0}, s_{n,1}, \ldots, s_{n,(L-1)}]$ is used for a BS n to derive the mapping from pilot stream k to pilot pattern i, where L is the length of the sequence. The mapping may be established as follows:

$$i = (k + s_{n,\text{PRU\_ID}}) \% N \quad \text{Equation (36)}$$

or $$k = (i + s_{n,\text{PRU\_ID}}) \% N. \quad \text{Equation (37)}$$

As indicated above, the aforementioned rules and/or techniques of mapping streams to pilot patterns may also be applicable in the case of interlaced patterns. In another exemplary embodiment of the present invention, the mapping from a pilot stream to an interlaced pilot pattern is defined as a permutation (interleaving) pattern for each PRU. The permutation (interleaving) pattern may be determined by one or more of the BS (or cell) sequence $s_n$ index, N, and the PRU_ID index.

In another exemplary embodiment of the present invention, a permutation pattern for each PRU and for an MS may be defined based on STID and PRU_ID. The mapping of pilot stream k is mapped to pilot pattern i according to an MS as follows:

$$i = (k + \text{STID} + \text{PRU\_ID}) \% N \quad \text{Equation (38)}$$

or $$k = (i + \text{STID} + \text{PRU\_ID}) \% N. \quad \text{Equation (39)}$$

The above rules and techniques of mapping streams to pilot patterns may also be applicable in the case of interlaced patterns. In another exemplary embodiment of the present invention, the mapping from a pilot stream to an interlaced pilot pattern is defined as a permutation (interleaving) pattern for each PRU. The permutation (interleaving) pattern may be determined by one or more of the USER_ID, N, and PRU_ID.

In another exemplary embodiment of the present invention, a permutation pattern for each PRU and for an MS may be defined based on STID. Here, the mapping of pilot stream k may be mapped to pilot pattern i according to an MS as follows:

$$i = (k + \text{STID}) \% N \quad \text{Equation (40)}$$

or $$k = (i + \text{STID}) \% N. \quad \text{Equation (41)}$$

In another exemplary embodiment of the present invention, a permutation pattern for each PRU and for an MS may be defined based on STID and Cell_ID. The mapping of pilot stream k may be mapped to pilot pattern i according to an MS as follows:

$$i = (k + \text{STID} + \text{Cell\_ID}) \% N \quad \text{Equation (42)}$$

or $$k = (i + \text{STID} + \text{Cell\_ID}) \% N. \quad \text{Equation (43)}$$

The above rules and techniques of mapping streams to pilot patterns may also be applicable in the case of interlaced patterns. In another exemplary embodiment of the present invention, the mapping from a pilot stream to an interlaced pilot pattern is defined as a permutation (interleaving) pattern for each PRU. Here, the permutation (interleaving) pattern may be determined by one or more of the STID, Cell_ID, and N.

A permutation pattern may be defined by a sequence of offset values, with one value for each PRU. The BS (or MS) may apply the offset value for a PRU in determining the mapping from a pilot stream to an interlaced pilot pattern for the said PRU. More than one sequence may be defined such that neighboring BSs may use different sequences to randomize pilot collision events. The mapping from a pilot stream to an interlaced pilot pattern may be further decomposed into a first mapping from a pilot stream index to a pilot pattern index and a second mapping from a pilot stream index to an interlace index. The aforementioned techniques of establishing mapping patterns based on BS index and PRU index are also applicable to the said first mapping from a pilot stream index to a pilot pattern index, and to the said second mapping from a pilot stream index to an interlace index.

In another exemplary embodiment of the present invention, we propose a rank-1 (single stream or single layer) reshuffled pilot pattern for a given PRU at a given cell based on one or more of Interlaced_ID, Cell_ID, Stream_ID, and PRU_ID. That is, the rank-1 Reshuffled Pilot Pattern (RPP) may be generally expressed as a function of Cell_ID and PRU_ID. That is, $$RPP(Interlaced\_ID, Stream\_ID) = f(Cell\_ID \text{ and } PRU\_ID).\quad \text{Equation (44)}$$

Here, Interlaced_ID_k may be determined by:

$$Interlaced\_ID = Cell\_ID \% \text{ the size of Interlaced\_ID set}.\quad \text{Equation (45)}$$

Stream_ID may be determined by:

$$Stream\_ID = PRU\_ID \% \text{ the size of Stream\_ID set}.\quad \text{Equation (46)}$$

Exemplary embodiments of present invention are described below assuming a pilot pattern that can support up to a maximum 2 layer transmission with 3 various interlaced pilot patterns, such as the pilot pattern as shown in FIGS. 25A-C. In this case, the set of Stream_ID={0, 1} and the set of Interlaced_ID={0, 1, 2}. In this example, the reshuffled pilot pattern of rank-1 transmission, namely RPP(Interlaced_ID, Stream_ID), for a given PRU at given cell may be determined by its assigned Stream_ID and Interlaced_ID, where Interlaced_ID=Cell_ID % 3 and Stream_ID is determined by Stream_ID=PRU_ID % 2.

For illustration, it is further assumed that 3 sub-bands are used. For example, a system bandwidth may be 10 MHz, while a sub-band bandwidth may be only 3.33 MHz, if the 10 MHz system bandwidth is divided by 3 sub-bands. An example of the rank-1 transmission reshuffled pilot pattern is described below with reference to FIGS. 27A-27C.

Figure 27A:
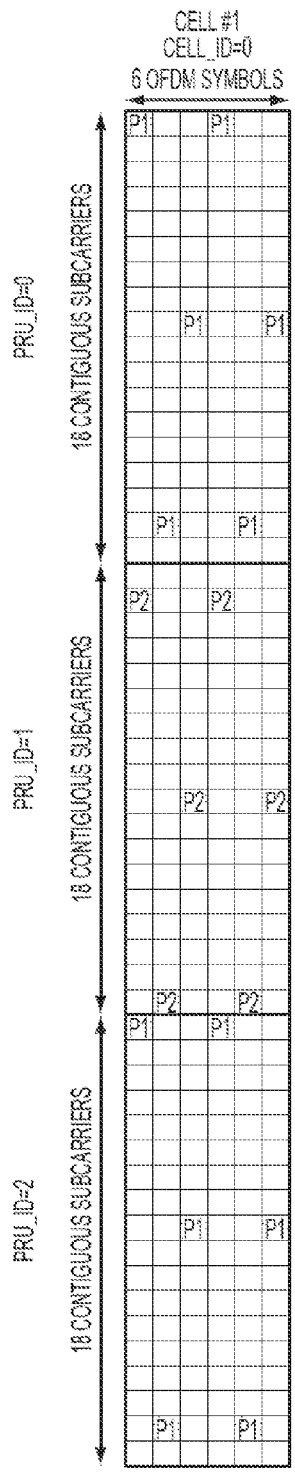
FIGS. 27A-27C illustrates reshuffled pilot patterns of a rank-1 transmission according to exemplary embodiments of the present invention.
Figure 27B:
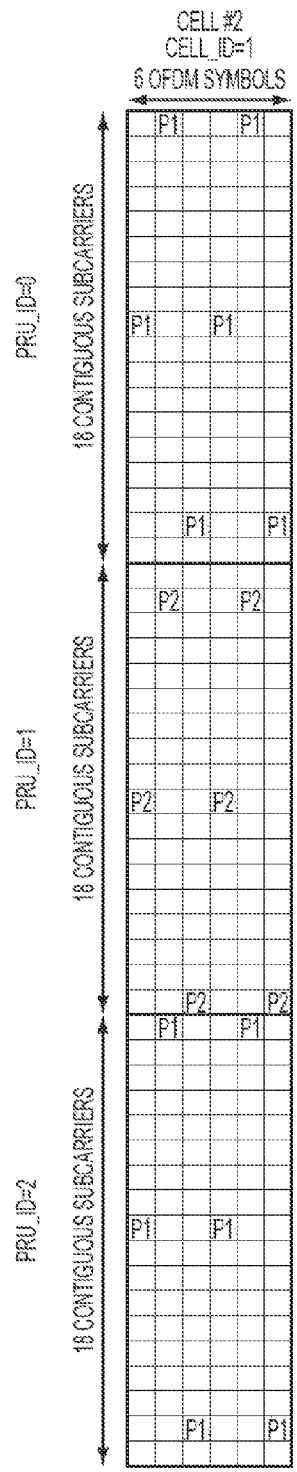
Figure 27C:
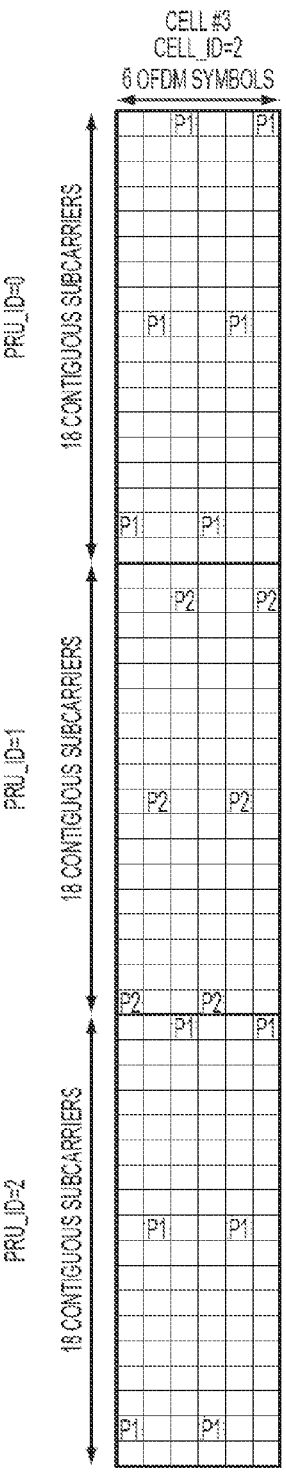

FIGS. 27A-27C illustrates reshuffled pilot patterns of a rank-1 transmission according to exemplary embodiments of the present invention.

Referring to FIGS. 27A-27C, reshuffled pilot patterns for rank-1 transmission in a 3-cell wireless communication system with 3-subbands is shown.

In another exemplary embodiment of the present invention, for a K-layer (or stream) transmission reshuffled pilot pattern, assuming the size of Stream_ID set is D and the size of Interlaced_ID set is J, where D>K or D=K, RPP for a given PRU at a given cell for the k-th layer (stream) transmission may be expressed as RPP(Interlaced_ID_k, Stream_ID_k), which is function of Cell_ID and PRU_ID. That is, $$RPP(Interlaced\_ID\_k, Stream\_ID\_k) = f(Cell\_ID \text{ and } PRU\_ID)\quad \text{Equation (47)}$$

In exemplary another embodiment of the present invention, an interlaced pilot pattern may be generated by shifts along the time and frequency axis of the PRU. The shifts in time and frequency may be cell ID and PRU ID dependent to avoid collision between pilots among neighboring cells. Herein, it is assumed that the pilot locations for stream 1 are indexed by the time and frequency location as $p_1(t,f)$ where t and f denote vectors indexing time and frequency locations for pilot stream 1. When a shift in time and frequency indexed by $t_{shift}$ and $f_{shift}$ are applied to t and f respectively, a new pilot pattern for stream 1 may be generated as, $$p_1(t + t_{shift} \% T_{PRU}, f + f_{shift} \% F_{PRU})\quad \text{Equation (48)}$$

Where $T_{PRU}$ and $F_{PRU}$ denote the number of time symbols in frequency subcarriers in a PRU. $t_{shift}$ and $f_{shift}$ denote functions of CELL_ID and PRU_ID. For example, $$t_{shift} = f(Cell\_ID \text{ and } PRU\_ID)\quad \text{Equation (49)}$$

and $$f_{shift} = f(Cell\_ID \text{ and } PRU\_ID).\quad \text{Equation (50)}$$

Figure 28A:
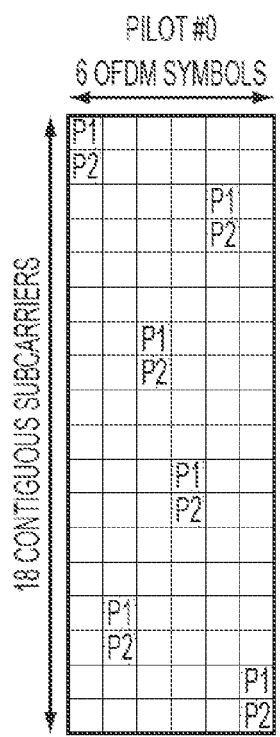
FIGS. 28A-28C illustrate the shifting of a pilot pattern in frequency and time according to exemplary embodiments of the present invention.
Figure 28B:
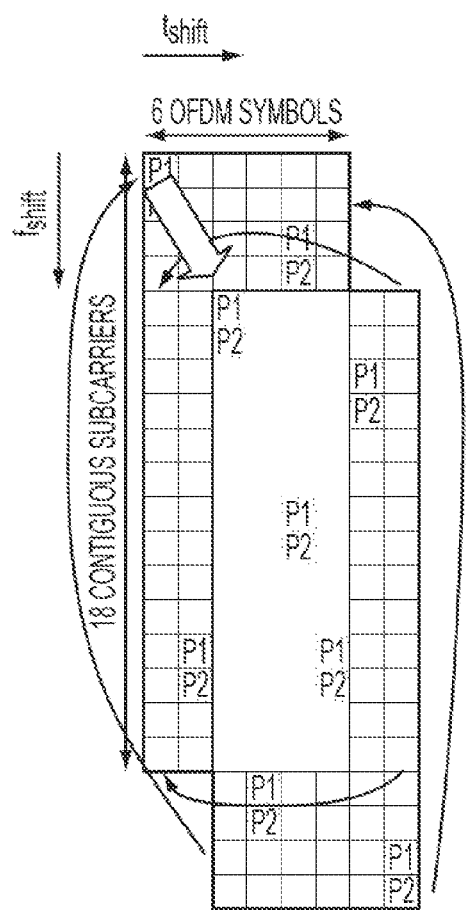
Figure 28C:
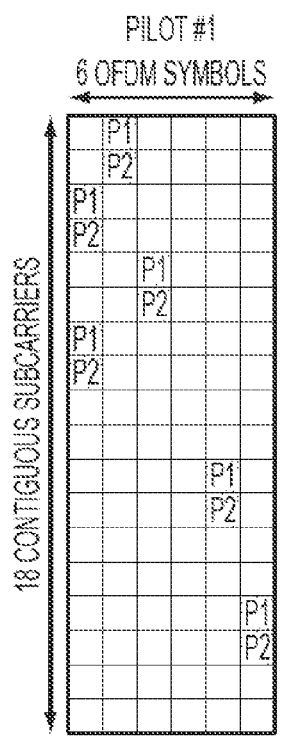

As an illustration, consider the two stream pilot pattern Pilot #0 shown in FIGS. 28A-28C.

FIGS. 28A-28C illustrate the shifting of a pilot pattern in frequency and time according to exemplary embodiments of the present invention.

Referring to FIGS. 28A-28C, when the pilot pattern Pilot #0 is shifted by 4 subcarriers in frequency and 2 symbols in time, the resulting pattern Pilot #1 is completely different and does not collide with Pilot #0.

In another exemplary embodiment of the present invention, the frequency shift $f_{shift}$ may be made a function of Cell_ID and time shift $t_{shift}$ may be made a function of PRU_ID. For example, $$t_{shift} = f(PRU\_ID) \text{ and } f_{shift} = f(Cell\_ID).\quad \text{Equation (51)}$$

In another exemplary embodiment of the present invention, only time shift $t_{shift}$ may be used to generate a new pattern. An example of pilot stream remapping when only time is shifted is described below with reference to FIGS. 29A and 29B.

Figure 29A:
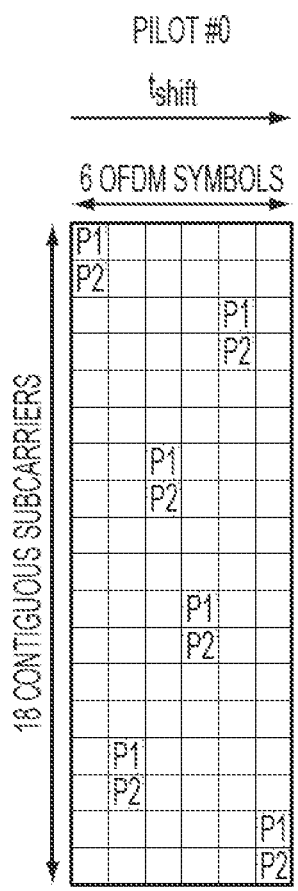
FIGS. 29A and 29B illustrate pilot stream remapping when only time is shifted according to exemplary embodiments of the present invention.
Figure 29B:
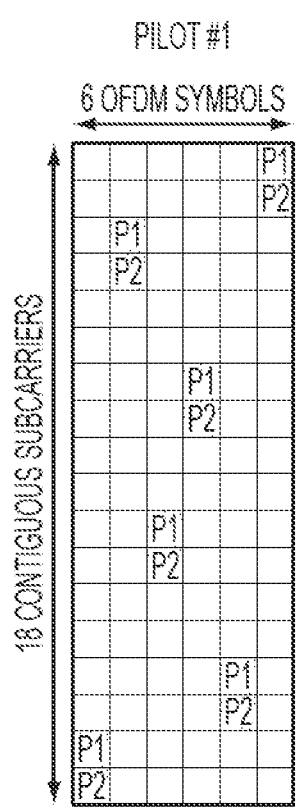

FIGS. 29A and 29B illustrate pilot stream remapping when only time is shifted according to exemplary embodiments of the present invention.

Referring to FIGS. 29A and 29B, when a time shift is set to 6 and applied to Pilot #0, a mirror symmetric pattern results as an interlace pattern in Pilot #1.

Described below are techniques for pilot stream remapping (or a pilot stream set selection method) for DownLink (DL) data transmission for wireless OFDM wireless communication systems according to exemplary embodiments of the present invention. More specifically, described below are pilot pattern remapping (or a pilot stream set selection) techniques for dedicated and common pilot scenarios when a rank-1 transmission or one data stream transmission is employed for DL communications according to exemplary embodiments of the present invention. The following techniques for pilot stream remapping are aimed to mitigate pilot collision, thereby reducing channel estimation error and enhancing system performance.

Other exemplary embodiments of the present invention include pilot stream sets used for a BS employing multiple transmit antennas for DL communications. A pilot stream set corresponds to one pilot pattern configuration of pilot locations within an RB. For rank-1 or one data stream transmission, one of a pair of pilot stream sets are selected and used for the transmission. Examples of pilot stream sets used for DL data transmission with one data stream or a single layer transmission in dedicated and/or common pilot scenarios are described below with reference to FIGS. 30A-31B. Herein an index of pilot stream sets may begin with '0' or '1'. Exemplary embodiments will be described below in the context of a pair of pilot stream sets, where the index of the pilot stream sets begins with '0' or '1'. However, the present invention is equally applicable when more than two pilot stream sets are available for use in a given RB.

Figure 30A:
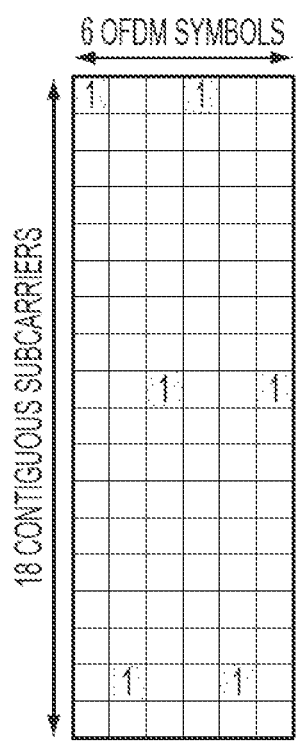
FIGS. 30A and 30B illustrate pilot locations within RBs for rank-1 or one data stream transmission based on pilot stream sets '1' and '2' according to exemplary embodiments of the present invention.
Figure 30B:
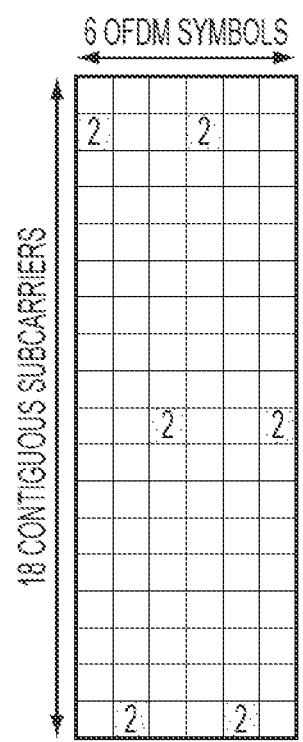

FIGS. 30A and 30B illustrate pilot locations within RBs for rank-1 or one data stream transmission based on pilot stream sets '1' and '2' according to exemplary embodiments of the present invention.

Referring to FIGS. 30A and 30B, pilot locations within RBs are shown based on pilot stream sets that includes pilot stream sets '1' and '2'. More specifically, FIG. 30A shows pilot locations within an RB based on pilot stream set '1' and FIG. 30B shows pilot locations within an RB based on pilot stream '2'. In each RB, the subcarrier index increases from top to bottom and the OFDM symbol index increases from left to right. Here, the pair of pilot stream sets shown in FIGS. 30A and 30B may be used for dedicated and common pilot scenarios when rank-1 or one data stream transmission is employed for DL communications. While the index of the pilot stream sets includes '1' and '2' in FIGS. 30A and 30B, the index of the pilot stream sets may alternatively include '0' and '1', an example of which is described below with reference to FIGS. 31A and 31B.

Figure 31A:
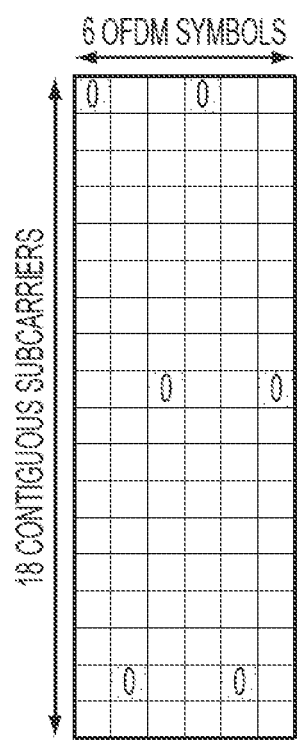
FIGS. 31A and 31B illustrate pilot locations within RBs for rank-1 or one data stream transmission based on pilot stream sets '0' and '1' according to exemplary embodiments of the present invention.
Figure 31B:
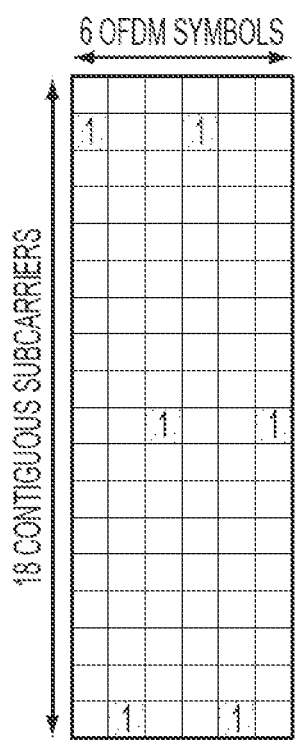

FIGS. 31A and 31B illustrate pilot locations within RBs for rank-1 or one data stream transmission based on pilot stream sets '0' and '1' according to exemplary embodiments of the present invention.

Referring to FIGS. 31A and 31B, pilot locations within RBs are shown based on pilot stream sets '0' and '1'. More specifically, FIG. 31A shows pilot locations within an RB based on pilot stream set '0' and FIG. 31B shows pilot locations within an RB based on pilot stream set '1'. In each RB, the subcarrier index increases from top to bottom and the OFDM symbol index increases from left to right. Here, the pair of pilot stream sets shown in FIGS. 31A and 31B may be used for dedicated and common pilot scenarios when rank-1 or one data stream transmission is employed for DL communications. As shown in FIGS. 30A-31B, the pilot locations of the pair of pilot stream sets shown in FIGS. 30A-30B are the same as the pilot locations of the pair of pilot stream sets shown in FIGS. 31A-31B, respectively, and differ only in the index numbering scheme. In FIGS. 30A-30B the index of the pilot stream sets includes '1' and '2', whereas in FIGS. 31A-31B the index of the pilot stream sets includes '0' and '1'.

In another exemplary embodiment of the present invention, the selection method of pilot stream set s for MSs shall be determined by a BS as functions of Cell_ID, STID, or PRU_ID, or any combination of the aforementioned parameters. That is, $$s = \text{function}(m,k,j) \qquad \text{Equation (52)}$$

where function(x,y,z) denotes the functional operation with the combination of the parameters x, y, and z, m denotes the STID of the targeted MS, k denotes the Cell_ID, and j denotes the scheduled PRU_ID by a BS for the MS with an STID of m. In another exemplary embodiment of the present invention, the selection method of pilot stream set s may be determined as follows:

$$s = \text{mod}(k,2)+1, \text{ where } s=\{1,2\} \qquad \text{Equation (53)}$$

or $$s = \text{mod}(k,2), \text{ where } s=\{0,1\}. \qquad \text{Equation (54)}$$

where mod denotes a modulus operation. The selection methods of pilot stream set s in Equations (53) and (54) are cell-specific. In other words, the selection methods of pilot stream set s are applied to all MSs served within the cell of the serving BS.

In a more general form, the pilot stream s may be selected as follows:

$$s = \text{mod}(\text{function}(k),2)+1, \text{ where } s=\{1,2\} \qquad \text{Equation (55)}$$

or $$s = \text{mod}(\text{function}(k),2), \text{ where } s=\{0,1\} \qquad \text{Equation (56)}$$

where function(k) may be any mathematical function of k (e.g., function(k)=⌊k/256⌋ where ⌊x⌋ is the largest integer that is smaller than or equal to x).

In another exemplary embodiment of the present invention, the selection method of pilot stream set s at the scheduled PRU_ID j, may be determined as follows:

$$s = \text{mod}(k+j,2)+1, \text{ where } s=\{1,2\} \qquad \text{Equation (57)}$$

or $$s = \text{mod}(k+j,2), \text{ where } s=\{0,1\}. \qquad \text{Equation (58)}$$

In another exemplary embodiment of the present invention, the selection method of pilot stream set $s_m$ for the MS with an STID of m shall be determined as a function of the parameters Cell_ID, STID, or PRU_ID, or any combination of the aforementioned parameters. That is, $$s_m = \text{function}(m,k,j). \qquad \text{Equation (59)}$$

Here, in exemplary embodiments of the present invention $s_m=\{1,2\}$ or $s_m=\{0,1\}$. In another exemplary embodiment of the present invention, the selection method of pilot stream set $s_m$ for the MS with an STID of m, may be determined as follows:

$$s_m = \text{mod}(m+k,2)+1, \text{ where } s_m=\{1,2\} \qquad \text{Equation (60)}$$

or $$s_m = \text{mod}(m+k,2), \text{ where } s_m=\{0,1\} \qquad \text{Equation (61)}$$

where mod denotes a modulus operation, m denotes the STID of the targeted MS, and k denotes the Cell_ID. In a more general form, the pilot stream set $s_m$ may be selected as follows:

$$s_m = \text{mod}(m+\text{function}(k),2)+1, \text{ where } s_m=\{1,2\} \qquad \text{Equation (62)}$$

or $$s_m = \text{mod}(m+\text{function}(k),2), \text{ where } s_m=\{0,1\} \qquad \text{Equation (63)}$$

where function(k) may be any mathematical function of k (e.g., function(k)=⌊k/256⌋ where ⌊x⌋ is the largest integer that is smaller than or equal to x).

In another exemplary embodiment of the present invention, the selection method of pilot stream set $s_m$ for the MS with an STID of m may be determined as follows:

$$s_m = \text{mod}(m,2)+1, \text{ where } s_m=\{1,2\} \qquad \text{Equation (64)}$$

or $$s_m = \text{mod}(m,2), \text{ where } s_m=\{1,2\}. \qquad \text{Equation (65)}$$

In another exemplary embodiment of the present invention, the selection method of pilot stream set $s_{m,j}$ for the MS with an STID of m at the scheduled PRU_ID j, may be determined as follows:

$$s_{m,j} = \text{mod}(m+k+j,2)+1, \text{ where } s_{m,j}=\{1,2\} \qquad \text{Equation (66)}$$

or $$s_{m,j} = \text{mod}(m+k+j,2), \text{ where } s_{m,j}=\{0,1\} \qquad \text{Equation (67)}$$

where j denotes the scheduled PRU_ID by a BS for the MS with an STID of m.

In another exemplary embodiment of the present invention, the selection method of pilot stream set $s_{m,j}$ for the MS with an STID of m at the scheduled PRU_ID j, may be determined as follows:

$s_{m,j}=\mod(m+j,2)+1$, where $s_{m,j}=\{1,2\}$  Equation (68)

or $s_{m,j}=\mod(m+j,2)$, where $s_{m,j}=\{0,1\}$.  Equation (69)

In a more general form, the selection method of pilot stream set $s_{m,j}$ for the MS with an STID of m at the scheduled PRU_ID j, may be determined as follows:

$s_{m,j}=\mod(m+\text{function}(j),2)+1$, where $s_{m,j}=\{1,2\}$  Equation (70)

or $s_{m,j}=\mod(m+\text{function}(j),2)$, where $s_{m,j}=\{0,1\}$  Equation (71)

where function(j) may be any mathematical function of k (e.g., function(j)=$p_j$ where $p_j$ is the j-th value of a predefined sequence or a pseudo-random sequence).

Where m is the STID of the targeted MS, any of Equations (52), (53), (55), (57), (59), (60), (62), (64), (66), (68), and (70) may be used for selecting the pilot stream for an MS with an STID of m in FIGS. 30A-30B. Similarly, where m is the STID of the targeted MS, any of Equations (52), (54), (56), (58), (59), (61), (63), (65), (67), (69), and (71) may be used for selecting the pilot stream for an MS with an STID of m in FIGS. 31A-31B.

In other exemplary embodiments of the present invention, the techniques described above may be used for interlaced pilot patterns. More specifically, for a given pilot pattern set among a plurality of pilot pattern sets (e.g., pilot pattern set 0, 1, and 2), the techniques described above may be utilized to determine a pilot stream set from among pilot stream sets of a given pilot pattern set, examples of which are described below with reference to FIGS. 32A-33C. FIGS. 32A-32C are an extension of FIGS. 30A-30B and FIGS. 33A-33C are an extension of FIGS. 31A-31B.

FIGS. 32A-32C illustrate pilot locations within RBs for rank-1 or one data stream transmission based on pilot stream sets '1' and '2' for each of pilot pattern sets '0', '1', and '2' according to exemplary embodiments of the present invention.

Referring to FIGS. 32A-32C, pilot locations within RBs are shown based on pilot stream sets that includes pilot stream set '1' and '2' for each of pilot pattern sets '0', '1', and '2'. More specifically, FIG. 32A shows pilot locations within RBs based on pilot stream sets that include pilot stream sets '1' and '2' for pilot pattern set '0', FIG. 32B shows pilot locations within RBs based on pilot stream sets that include pilot stream sets '1' and '2' for pilot pattern set '1', and FIG. 32C shows pilot locations within RBs based on pilot stream sets that include pilot stream sets '1' and '2' for pilot pattern set '2'. Here, the pair of pilot stream sets for each of the three pilot pattern sets shown in FIGS. 32A-32C may be used for dedicated and common pilot scenarios when rank-1 or one data stream transmission is employed for DL communications. Pilot stream sets '1' and '2' of pilot pattern set '0' in FIG. 32A correspond to pilot stream sets '1' and '2' of FIGS. 30A-30B. Further, while an index of the pilot pattern sets are described herein as beginning with '0', the index of the pilot pattern sets may alternatively begin with '1'. Similar to that discussed above with respect to FIGS. 30A-31B, while the index of the pilot stream sets includes '1' and '2' in FIGS. 32A-32C, the index of the pilot stream sets may alternatively include '0' and '1', an example of which is described below with reference to FIGS. 33A-33C.

In an exemplary implementation, for DL communication with one data stream transmission and for a given pilot pattern set (i.e., one of pilot pattern set 0, 1, and 2), the selection method of pilot stream set $s_m$ for an MS with an STID of m, may be determined as follows:

$s_m=\mod(m+k,2)+1$, where $s_m=\{1,2\}$  Equation (72)

where m is the STID of the targeted MS. In Equations (72) m may be set to 0 when an MS is scheduled with a Distributed Logic Resource Unit (DLRU).

In another exemplary embodiment of the present invention, for DL communication with one data stream transmission and for a given pilot pattern set (i.e., one of pilot pattern set 0, 1, and 2) as shown in FIGS. 32A-32C, the selection method of pilot stream set $s_m$ for an MS with an STID of m, may be determined according to any of the above Equations (52), (53), (55), (57), (59), (60), (62), (64), (66), (68), (70) and (72).

In another exemplary embodiment of the present invention, for DL communication with one data stream transmission, we proposed that for a given pilot pattern set (i.e., one of pilot pattern set 0, 1, and 2) as shown in FIGS. 32A-32C, the selection method of pilot stream set s for an MS, may be determined as follows:

$s=\mod(k,2)+1$, where $s=\{1,2\}$  Equation (73)

FIGS. 33A-33C illustrate pilot locations within RBs for rank-1 or one data stream transmission based on pilot stream sets '0' and '1' for each of pilot pattern sets '0', '1', and '2' according to exemplary embodiments of the present invention.

Referring to FIGS. 33A-33C, pilot locations within RBs are shown based on pilot stream sets that includes pilot stream set '0' and '1' for each of pilot pattern sets '0', '1', and '2'. More specifically, FIG. 33A shows pilot locations within RBs based on pilot stream sets that include pilot stream sets '0' and '1' for pilot pattern set '0', FIG. 33B shows pilot locations within RBs based on pilot stream sets that include pilot stream sets '0' and '1' for pilot pattern set '1', and FIG. 33C shows pilot locations within RBs based on pilot stream sets that include pilot stream sets '0' and '1' for pilot pattern set '2'. Here, the pair of pilot stream sets for each of the three pilot pattern sets shown in FIGS. 33A-33C may be used for dedicated and common pilot scenarios when rank-1 or one data stream transmission is employed for DL communications. Pilot stream sets '0' and '1' of pilot pattern set '0' in FIG. 33A correspond to pilot stream sets '0' and '1' of FIGS. 31A-31B. Further, while an index of the pilot pattern sets are described herein as beginning with '0', the index of the pilot pattern sets may alternatively begin with '1'.

In an exemplary implementation, for DL communication with one data stream transmission and for a given pilot pattern set (i.e., one of pilot pattern set 0, 1, and 2), the selection method of pilot stream set $s_m$ for an MS with an STID of m, may be determined as follows:

$s_m=\mod(m+k,2)$, where $s_m=\{0,1\}$  Equation (74)

where m is the STID of the targeted MS. In Equations (74) m may be set to 0 when an MS is scheduled with a DLRU.

In another exemplary embodiment of the present invention, for DL communication with one data stream transmission and for a given pilot pattern set (i.e., one of pilot pattern set 0, 1, and 2) as shown in FIGS. 33A-33C, the selection method of pilot stream set $s_m$ for an MS with an STID of m, may be determined according to any of the above Equations (52), (54), (56), (58), (59), (61), (63), (65), (67), (69), (71) and (74).

In another exemplary embodiment of the present invention, for DL communication with one data stream transmission, we proposed that for a given pilot pattern set (i.e., one of pilot pattern set 0, 1, and 2) as shown in FIGS. 33A-33C, the selection method of pilot stream set s for an MS, may be determined as follows:

$s=\mod(k,2)$, where $s=\{0,1\}$  Equation (75)

Third Exemplary Embodiment

In another exemplary embodiment of the present invention interlaced midamble pilot patterns may be employed. Examples of interlaced midamble pilot patterns for 2-transmit antenna midamble transmission with 6 symbol subframes are described below with reference to FIGS. 34A-34C.

Figure 34A:
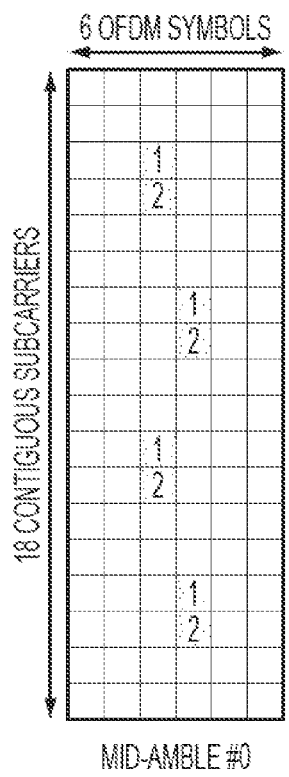
FIGS. 34A-34C illustrate interlaced midamble pilot patterns for 2-transmit antenna midamble transmission with 6-symbol subframes according to exemplary embodiments of the present invention.
Figure 34B:
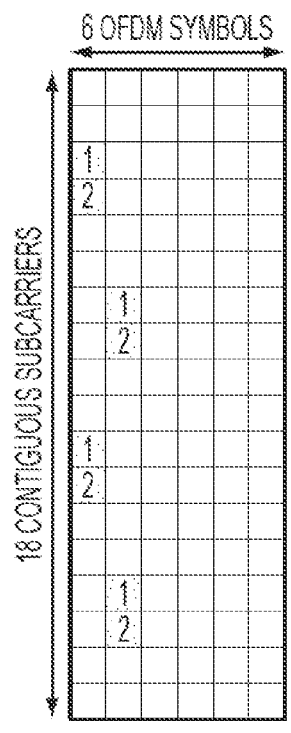
Figure 34C:
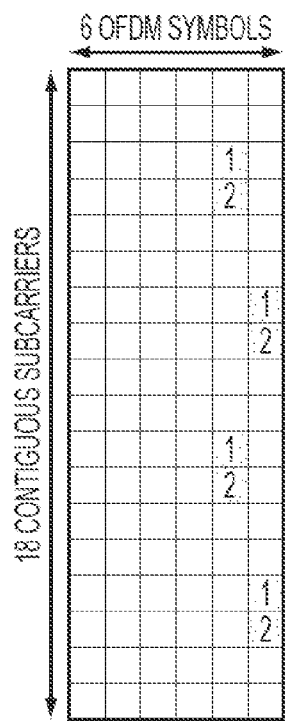

FIGS. 34A-34C illustrate interlaced midamble pilot patterns for 2-transmit antenna midamble transmission with 6-symbol subframes according to exemplary embodiments of the present invention.

Referring to FIGS. 34A-34C, 3 interlaced midamble pilot patterns for 2-transmit antenna midamble transmission in a single RB of 18 subcarriers by 6 OFDM symbols are shown. The 4 midamble pilot positions marked by '1' and '2' in FIG. 34A constitute a pilot pattern. Likewise, the 4 midamble pilot positions marked by '1' and '2' in FIG. 34B constitute another pilot pattern. Also, the 4 midamble pilot positions marked by '1' and '2' in FIG. 34C constitute yet another pilot pattern. The pilot patterns do not overlap with each other. Note that '1' and '2' are the common pilot subcarriers for the first transmit antenna and the second transmit antenna in FIGS. 34A-34C, respectively. In this example, the set of Interlaced_ID_2={0, 1, 2} is defined for the interlaced midamble #0, midamble #1, midamble #2, as shown in FIGS. 34A-34C, respectively.

In an exemplary embodiment of the present invention, the 3 interlaced midamble pilot patterns, as shown in FIGS. 34A-34C, may be used as a base set of midamble pilot patterns, namely the set of Interlaced_ID_2, for 2-transmit antenna midamble transmission.

Here, the offset between one interlace of midamble pilot patterns with the closest another interlace is 2 OFDM symbols. In a straightforward extension of this exemplary embodiment, more than 3 interlaced midamble pilot patterns may be defined by reducing the offset between one interlace of midamble pilot patterns with the closest another interlace to 1 OFDM symbol.

While the midamble pilot patterns are shown in FIGS. 34A-34B with subframes of 6 OFDM symbols, these midamble pilot patterns may be easily extended to apply in 5-symbol and 7-symbol subframes, examples of which are described below with reference to FIGS. 35A-35C.

Figure 35A:
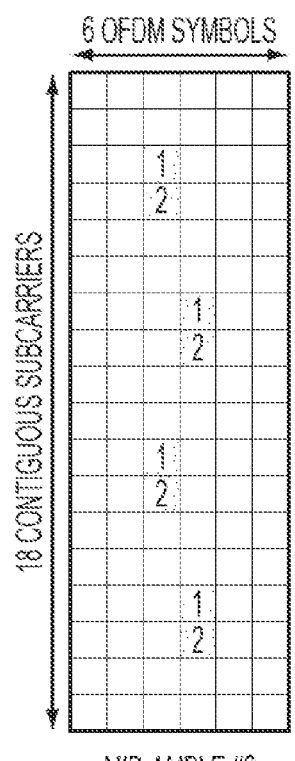
FIGS. 35A-35C illustrate midamble pilot patterns for 2-transmit antenna midamble transmission for interlaced midamble #0 with 6-symbol, 5-symbol and 7-symbol subframes according to exemplary embodiments of the present invention.
Figure 35B:
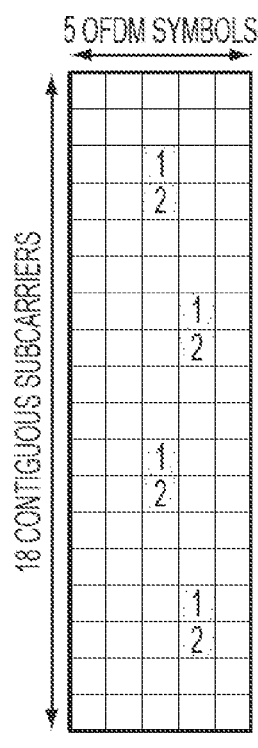
Figure 35C:
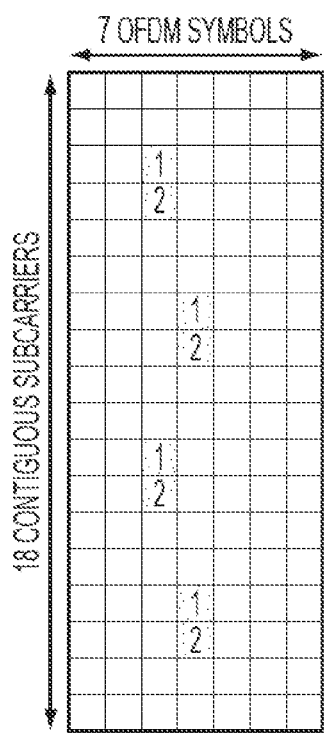

FIGS. 35A-35C illustrate midamble pilot patterns for 2-transmit antenna midamble transmission for interlaced midamble #0 with 6-symbol, 5-symbol and 7-symbol subframes according to exemplary embodiments of the present invention.

Referring to FIGS. 35A-35C, midamble pilot patterns for 2-transmit antenna midamble transmission for interlaced midamble #0 with RBs of 18 subcarriers by 6 OFDM symbols, by 5 OFDM symbols, and by 7 OFDM symbols are shown, respectively.

Examples of interlaced midamble pilot patterns for two-layer (or two-stream) midamble transmission with 6-symbol subframes are described below with reference to FIGS. 36A-36C.

Figure 36A:
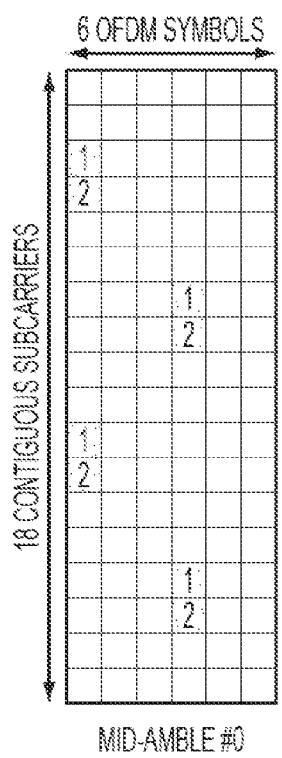
FIGS. 36A-36C illustrate interlaced midamble pilot patterns for two-layer (or two-stream) midamble transmission with 6-symbol subframes according to exemplary embodiments of the present invention.
Figure 36B:
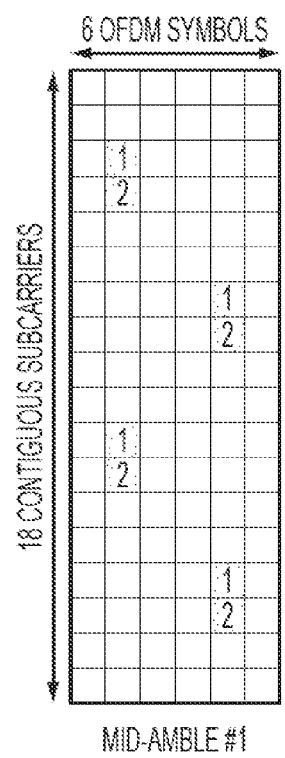
Figure 36C:
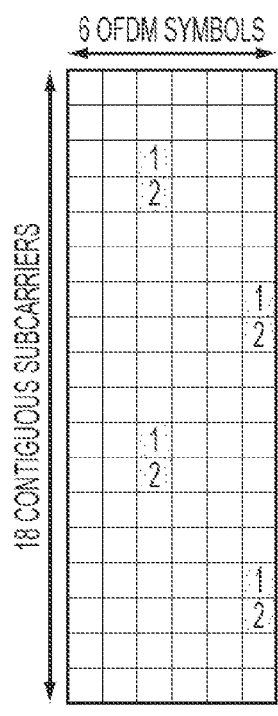

FIGS. 36A-36C illustrate interlaced midamble pilot patterns for two-layer (or two-stream) midamble transmission with 6-symbol subframes according to exemplary embodiments of the present invention.

Figure 3:
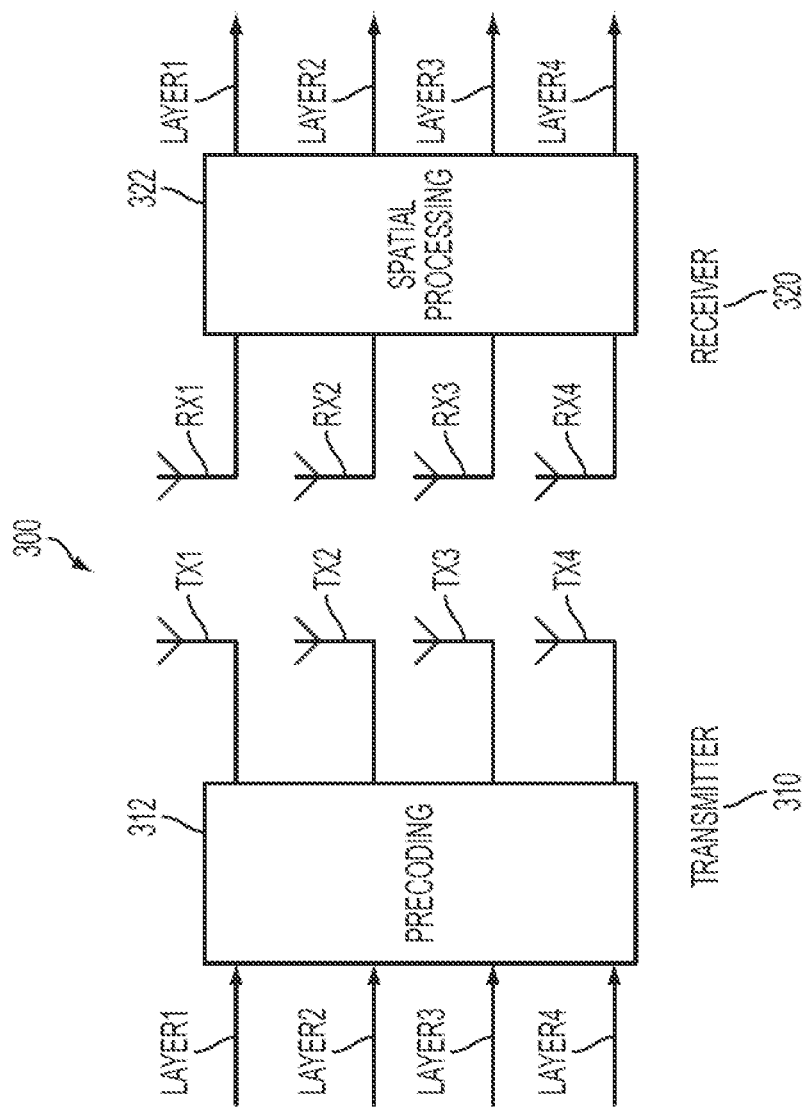
FIG. 3 illustrates an example of a 4×4 Multiple Input Multiple Output (MIMO) wireless communication system according to the related art.
Figure 4:
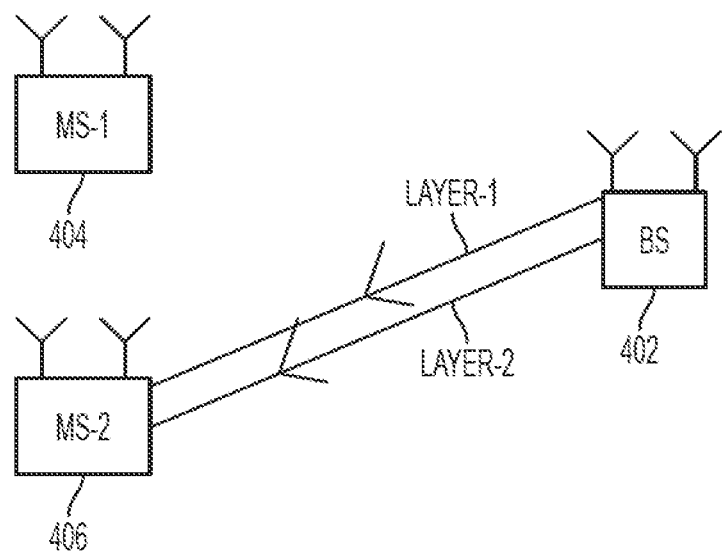
FIG. 4 illustrates a single-user MIMO wireless communication system according to the related art.
Figure 5:
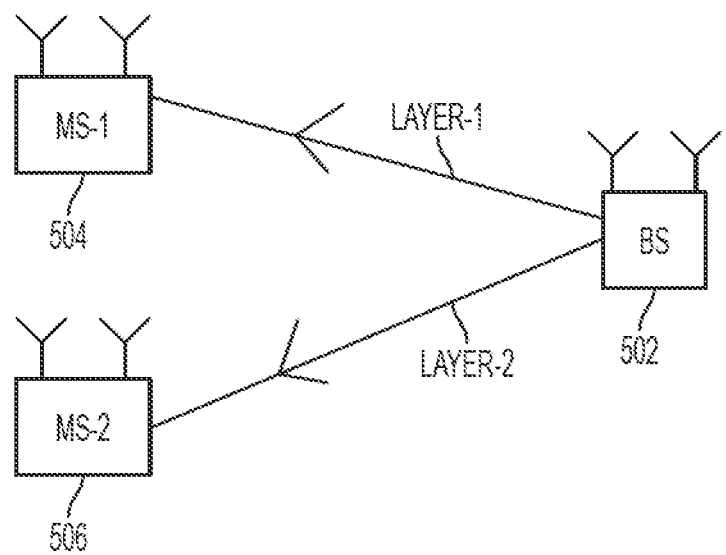
FIG. 5 illustrates a multi-user MIMO wireless communication system according to the related art.
Figure 6:
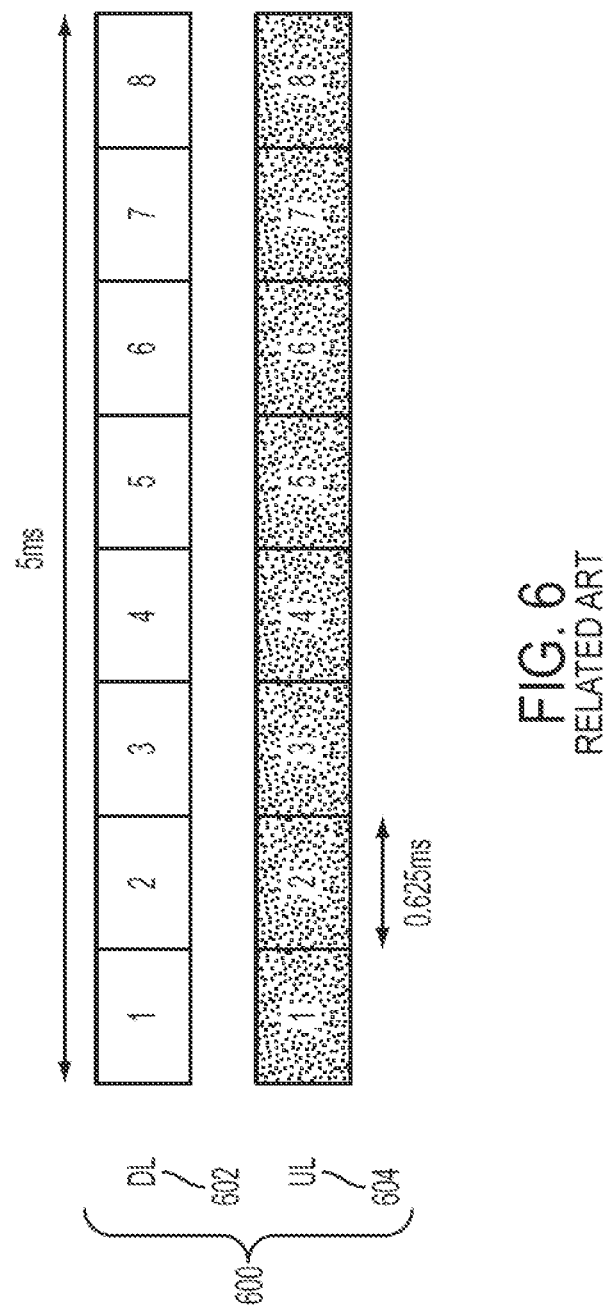
FIG. 6 illustrates a Frequency Division Duplex (FDD) frame according to the related art.
Figure 7:
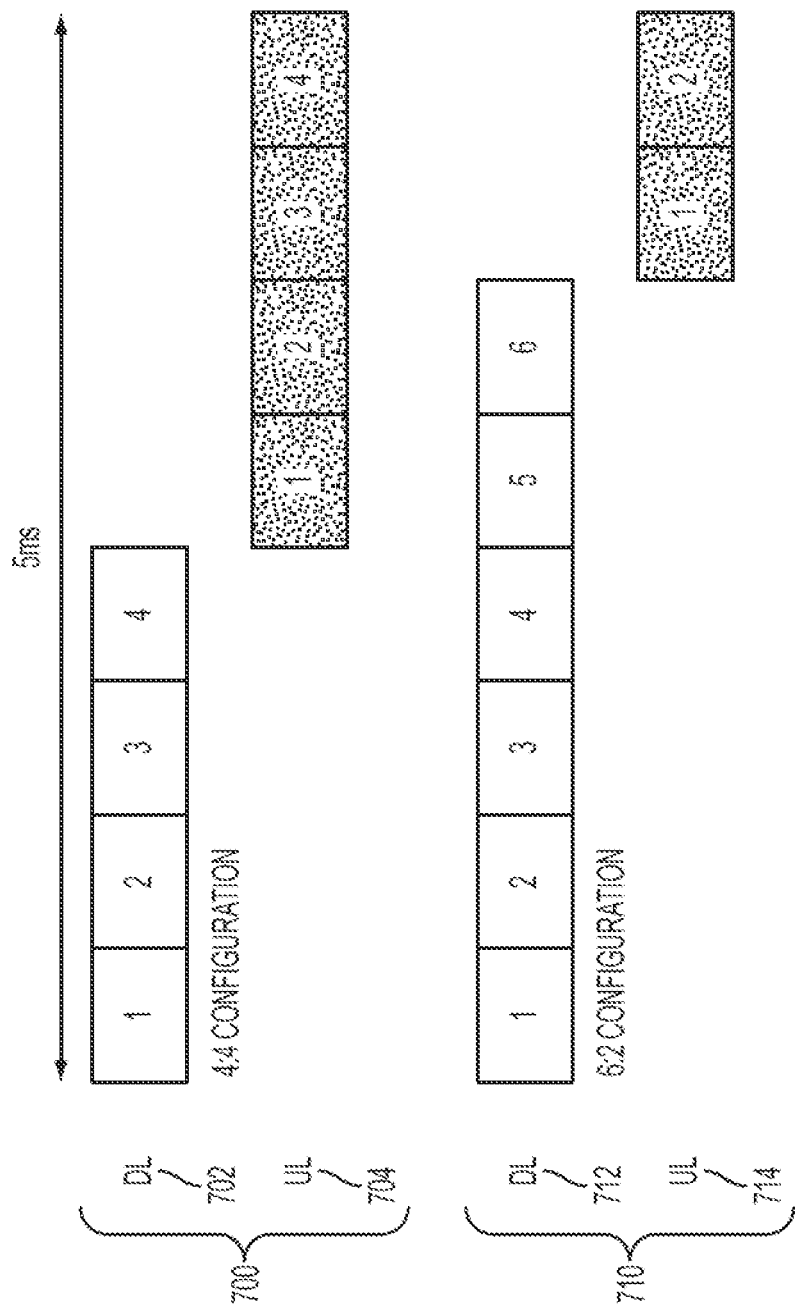
FIG. 7 illustrates Time Division Duplex (TDD) frames according to the related art.

Referring to FIGS. 36A-36B, 3 interlaced midamble pilot patterns for two-layer (or two-stream) midamble transmission are as shown and are denoted as midamble #0, midamble #1, midamble #2, respectively. In another exemplary embodiment of the present invention, these 3 interlaced midamble pilot patterns may be used as the base set of midamble pilot patterns, namely the set of Interlaced_ID_2={0, 1, 2}, for two-layer (or two-stream) midamble transmission. Here, the midamble pilot patterns are shown in subframes with 6 OFDM symbols. These patterns may be easily extended to apply in 5-symbol and 7-symbol subframes, examples of which are described below with reference to FIGS. 37A-37C.

Figure 37A:
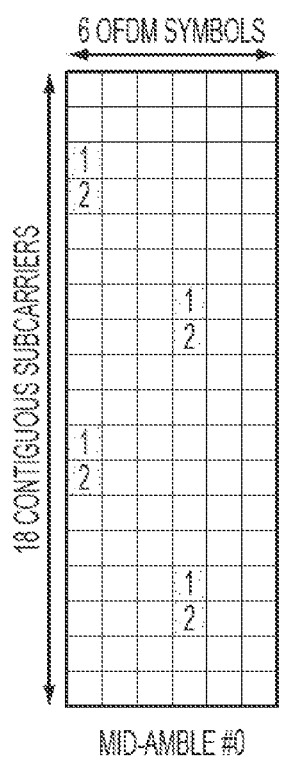
FIGS. 37A-37C illustrate interlaced midamble pilot patterns for two-layer (or two-stream) midamble transmission for interlaced midamble #0 with 6-symbol, 5-symbol and 7-symbol subframes according to exemplary embodiments of the present invention.
Figure 37B:
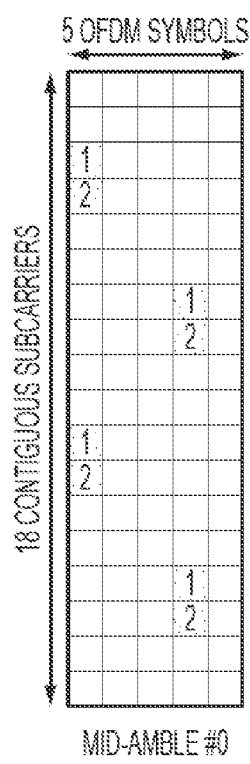
Figure 37C:
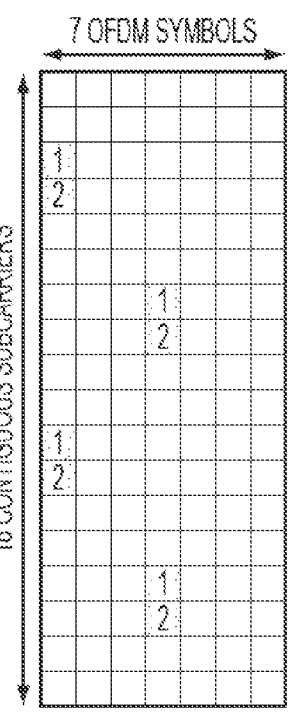

FIGS. 37A-37C illustrate interlaced midamble pilot patterns for two-layer (or two-stream) midamble transmission for interlaced midamble #0 with 6-symbol, 5-symbol and 7-symbol subframes according to exemplary embodiments of the present invention.

Referring to FIGS. 37A-37C, interlaced midamble pilot patterns for two-layer (or two-stream) midamble transmission for interlaced midamble #0 with RBs of 18 subcarriers by 6 OFDM symbols, by 5 OFDM symbols, and by 7 OFDM symbols are shown, respectively.

Examples of interlaced midamble pilot patterns for 4-transmit antenna midamble transmission with 6-symbol subframes are described below with reference to FIGS. 38A-38C.

Figure 38A:
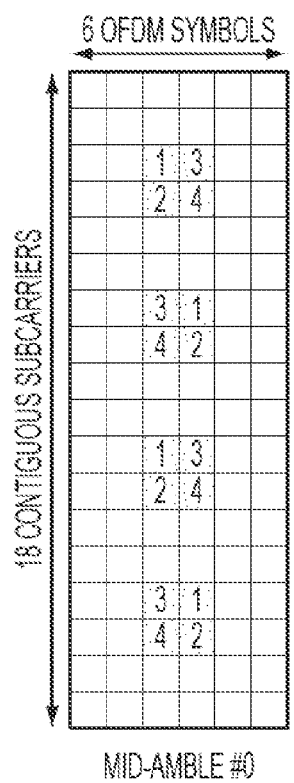
FIGS. 38A-38C illustrate interlaced midamble pilot patterns for 4-transmit antenna midamble transmission with 6-symbol subframes according to exemplary embodiments of the present invention.
Figure 38B:
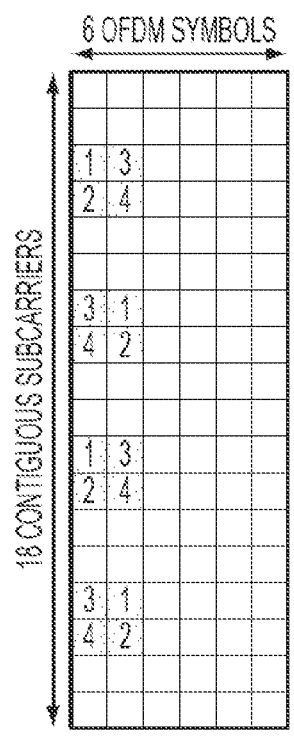
Figure 38C:
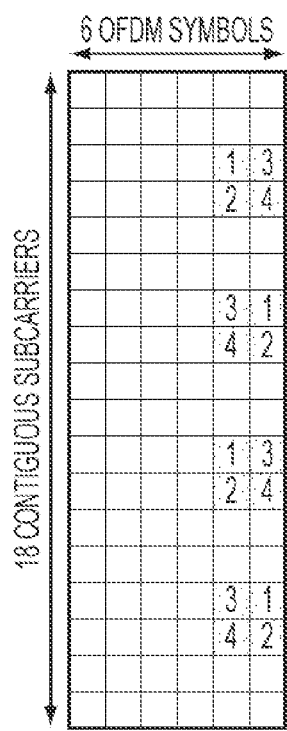

FIGS. 38A-38C illustrate interlaced midamble pilot patterns for 4-transmit antenna midamble transmission with 6-symbol subframes according to exemplary embodiments of the present invention.

Referring to FIGS. 38A-38C, 3 interlaced midamble pilot patterns for 4-transmit antenna midamble transmission are as shown and are denoted as midamble #0, midamble #1, midamble #2, respectively. Here, the 3 interlaced midamble pilot patterns may be used as the base set of midamble pilot patterns, namely the set of Interlaced_ID_4={0, 1, 2}, for 4-transmit antenna midamble transmission. The midamble pilot patterns are shown in subframes with 6 OFDM symbols. Herein, '1', '2', '3', and '4' denote the common pilot subcarriers for the first, the second, the third, and the fourth transmit antenna in FIGS. 38A-38C, respectively. These patterns may be easily extended to apply in 5-symbol and 7-symbol subframes, examples of which are described below with reference to FIGS. 39A-39C.

Figure 39A:
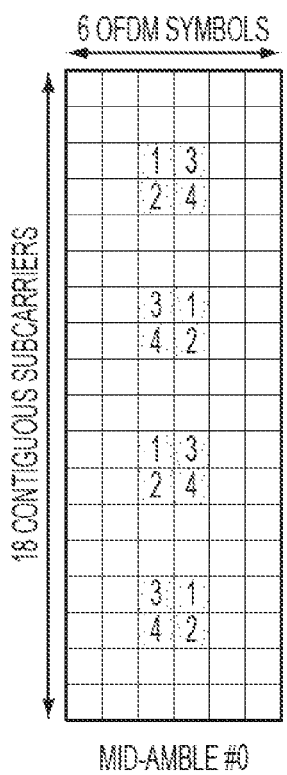
FIGS. 39A-39C illustrate interlaced midamble pilot patterns for 4-transmit antenna midamble transmission for interlaced midamble #0 with 6-symbol, 5-symbol and 7-symbol subframes according to exemplary embodiments of the present invention.
Figure 39B:
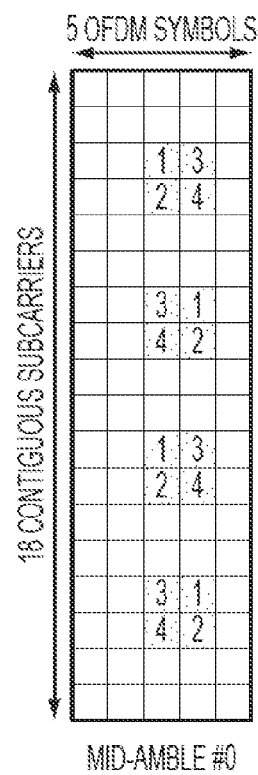
Figure 39C:
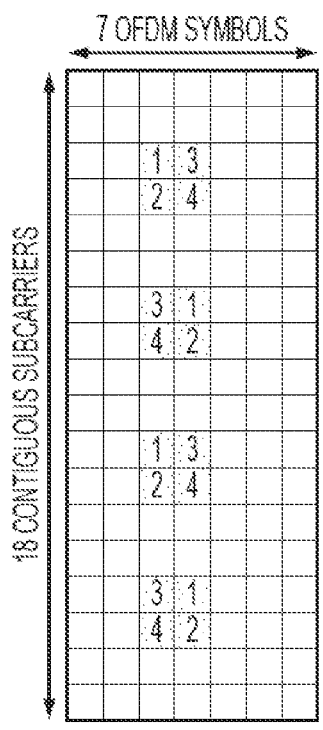

FIGS. 39A-39C illustrate interlaced midamble pilot patterns for 4-transmit antenna midamble transmission for interlaced midamble #0 with 6-symbol, 5-symbol and 7-symbol subframes according to exemplary embodiments of the present invention.

Referring to FIGS. 39A-39C, interlaced midamble pilot patterns for 4-transmit antenna midamble transmission for interlaced midamble #0 with RBs of 18 subcarriers by 6 OFDM symbols, by 5 OFDM symbols, and by 7 OFDM symbols are shown, respectively.

Examples of interlaced midamble pilot patterns for four-layer (or four-stream) midamble transmission with 6-symbol subframes are described below with reference to FIGS. 40A-40C.

Figure 40A:
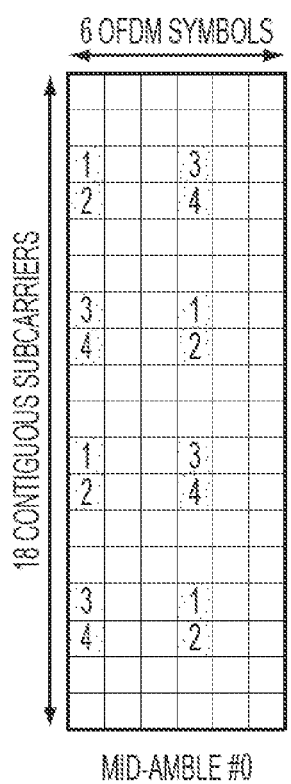
FIGS. 40A-40C illustrate midamble pilot patterns for four-layer (or four-stream) midamble transmission with 6-symbol subframes according to exemplary embodiments of the present invention.
Figure 40B:
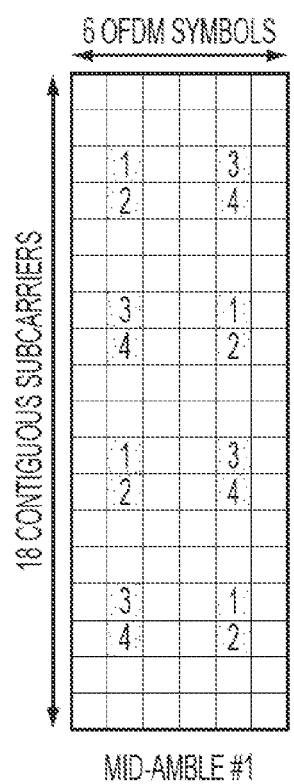
Figure 40C:
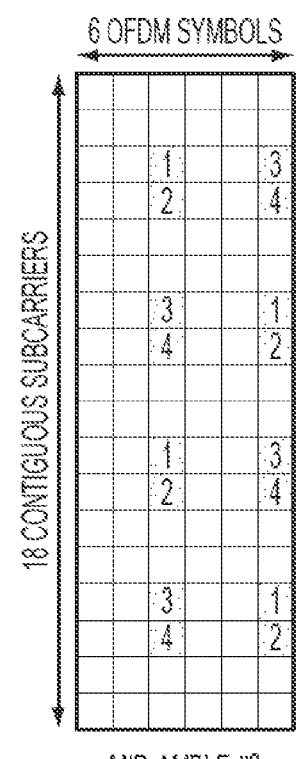

FIGS. 40A-40C illustrate midamble pilot patterns for four-layer (or four-stream) midamble transmission with 6-symbol subframes according to exemplary embodiments of the present invention.

Referring to FIGS. 40A-40C, 3 interlaced midamble pilot patterns for four-layer (or four-stream) midamble transmission are shown and are denoted as midamble #0, midamble #1, midamble #2, respectively. In another exemplary embodiment of the present invention, the 3 interlaced midamble pilot patterns, as shown in FIGS. 38A-38C, may be used as the base set of midamble pilot patterns, namely the set of Interlaced_ID_4={0, 1, 2}, for four-layer (or four-stream) midamble transmission. The midamble pilot patterns are shown in subframes with 6 OFDM symbols. These patterns may be easily extended to apply in 5-symbol and 7-symbol subframes, examples of which are described below with reference to FIGS. 41A-41C.

Figure 41A:
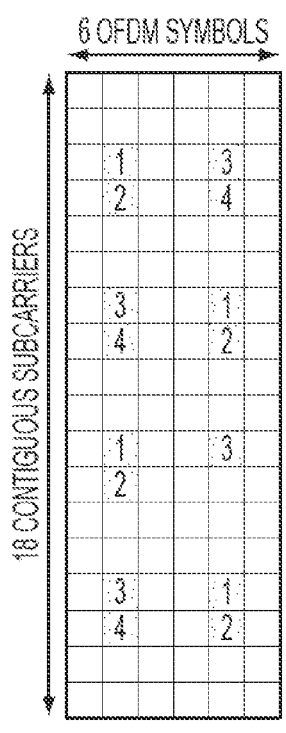
FIGS. 41A-41C illustrate interlaced midamble pilot patterns for four-layer (or four-stream) midamble transmission for interlaced midamble #0 with 6-symbol, 5-symbol and 7-symbol subframes according to exemplary embodiments of the present invention.
Figure 41B:
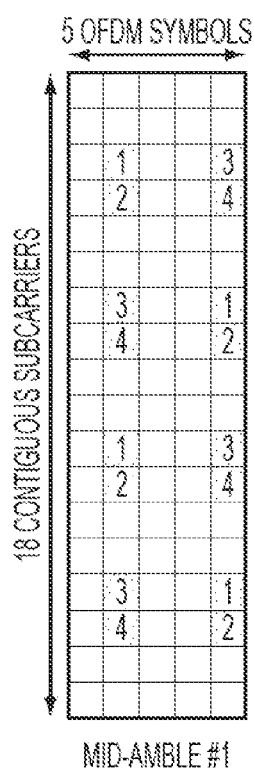
Figure 41C:
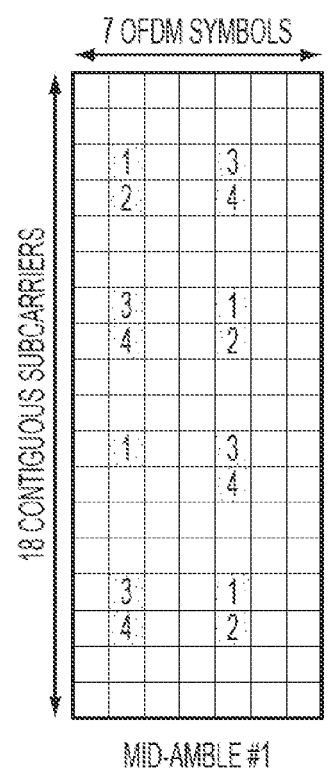

FIGS. 41A-41C illustrate interlaced midamble pilot patterns for four-layer (or four-stream) midamble transmission for interlaced midamble #0 with 6-symbol, 5-symbol and 7-symbol subframes according to exemplary embodiments of the present invention.

Referring to FIGS. 41A-41C, interlaced midamble pilot patterns for four-layer (or four-stream) midamble transmission for interlaced midamble #0 with RBs of 18 subcarriers by 6 OFDM symbols, by 5 OFDM symbols, and by 7 OFDM symbols are shown, respectively.

Examples of interlaced midamble pilot patterns for 8-transmit antenna midamble transmission with 6-symbol subframes are described below with reference to FIGS. 42A-42C.

Figure 42A:
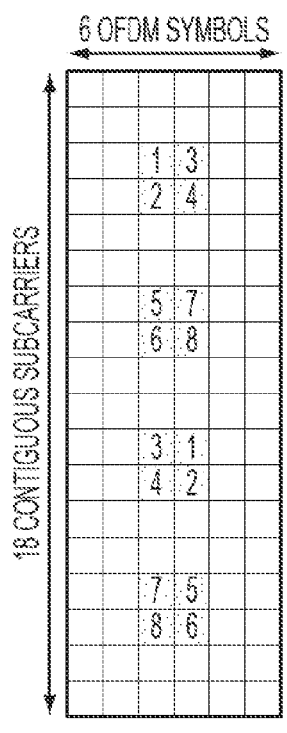
FIGS. 42A-42C illustrate interlaced midamble pilot patterns for 8-transmit antenna midamble transmission with 6-symbol subframes according to exemplary embodiments of the present invention.
Figure 42B:
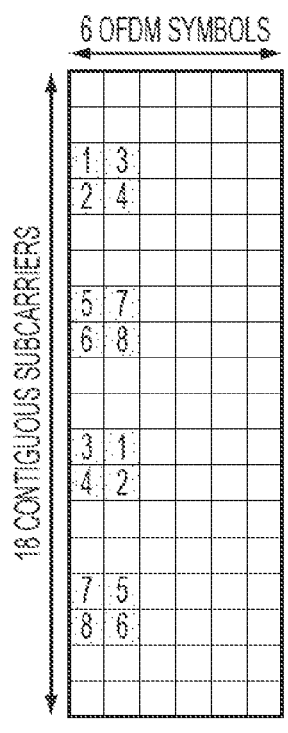
Figure 42C:
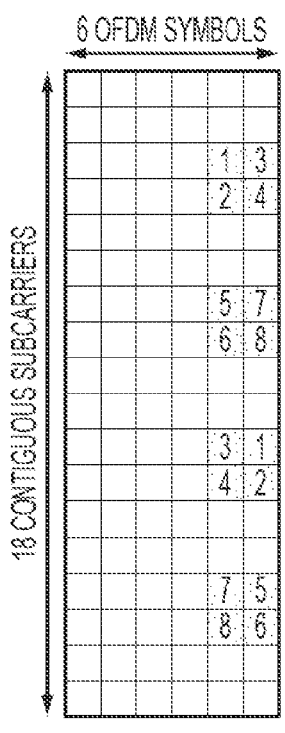

FIGS. 42A-42C illustrate interlaced midamble pilot patterns for 8-transmit antenna midamble transmission with 6-symbol subframes according to exemplary embodiments of the present invention.

Referring to FIGS. 42A-42C, 3 interlaced midamble pilot patterns for 8-transmit antenna midamble transmission are shown and are denoted as midamble #0, midamble #1, midamble #2, respectively. Here, the 3 interlaced midamble pilot patterns may be used as the base set of midamble pilot patterns, namely the set of Interlaced_ID_8={0, 1, 2}, for 8-transmit antenna midamble transmission. The midamble pilot patterns are shown in subframes with 6 OFDM symbols. These patterns may be easily extended to apply in 5-symbol and 7-symbol subframes, examples of which are shown in FIGS. 43A-43B.

Figure 43A:
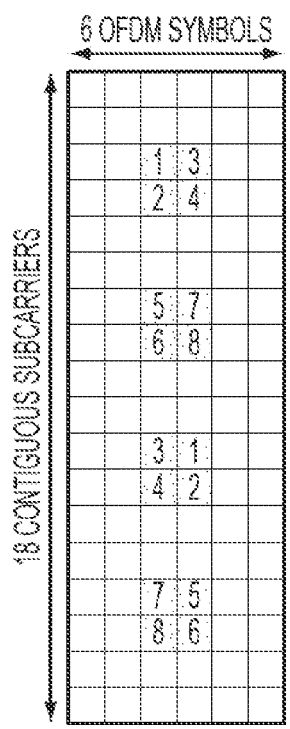
FIGS. 43A-43C illustrate interlaced midamble pilot patterns for 8-transmit antenna midamble transmission for interlaced midamble #0 with 6-symbol, 5-symbol and 7-symbol subframes according to exemplary embodiments of the present invention.
Figure 43B:
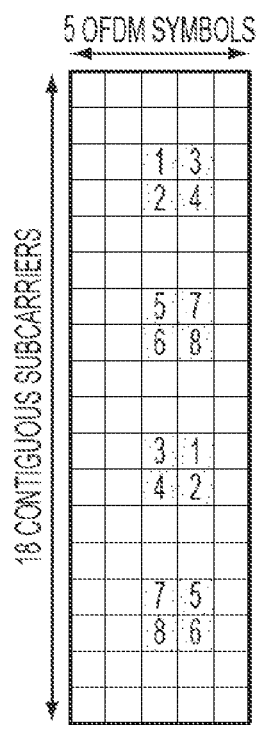
Figure 43C:
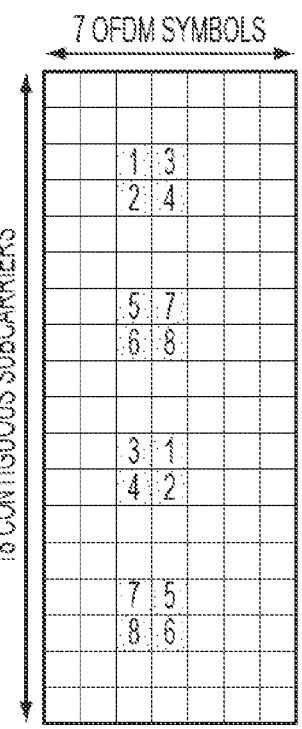

FIGS. 43A-43C illustrate interlaced midamble pilot patterns for 8-transmit antenna midamble transmission for interlaced midamble #0 with 6-symbol, 5-symbol and 7-symbol subframes according to exemplary embodiments of the present invention.

Referring to FIGS. 43A-43C, 3 interlaced midamble pilot patterns for 8-transmit antenna midamble transmission for interlaced midamble #0 with RBs of 18 subcarriers by 6 OFDM symbols, by 5 OFDM symbols, and by 7 OFDM symbols are shown, respectively.

Examples of interlaced midamble pilot patterns for eight-layer (or eight-stream) midamble transmission with 6-symbol subframes are described below with reference to FIGS. 44A-44C.

Figure 44A:
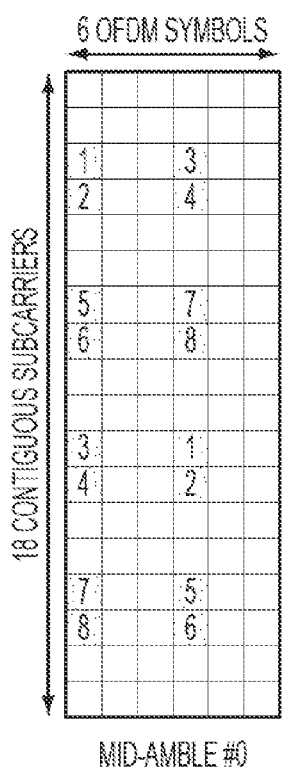
FIGS. 44A-44C illustrate interlaced midamble pilot patterns for eight-layer (or eight-stream) midamble transmission with 6-symbol subframes according to exemplary embodiments of the present invention.
Figure 44B:
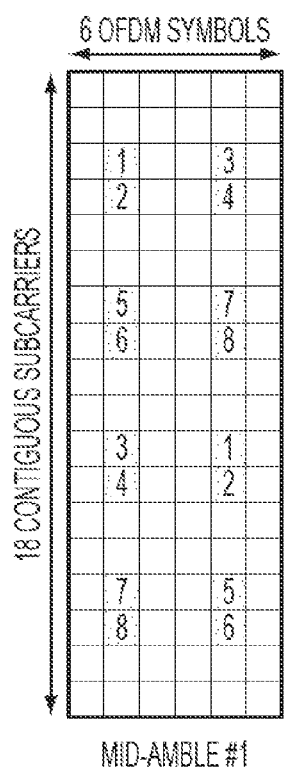
Figure 44C:
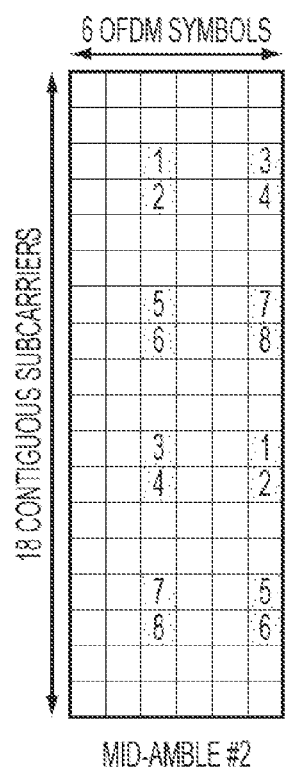

FIGS. 44A-44C illustrate interlaced midamble pilot patterns for eight-layer (or eight-stream) midamble transmission with 6-symbol subframes according to exemplary embodiments of the present invention.

Referring to FIGS. 44A-44C, 3 interlaced midamble pilot patterns for eight-layer (or eight-stream) midamble transmission are shown and are denoted as midamble #0, midamble #1, midamble #2, respectively. In another exemplary embodiment of the present invention, the 3 interlaced midamble pilot patterns, as shown in FIGS. 42A-42C, may be used as the base set of midamble pilot patterns, namely the set of Interlaced_ID_8={0, 1, 2}, for eight-layer (or eight-stream) midamble transmission. The midamble pilot patterns are shown in subframes with 6 OFDM symbols. These patterns may be easily extended to apply in 5-symbol and 7-symbol subframes, examples of which are described below with reference to FIGS. 45A-45C.

Figure 45A:
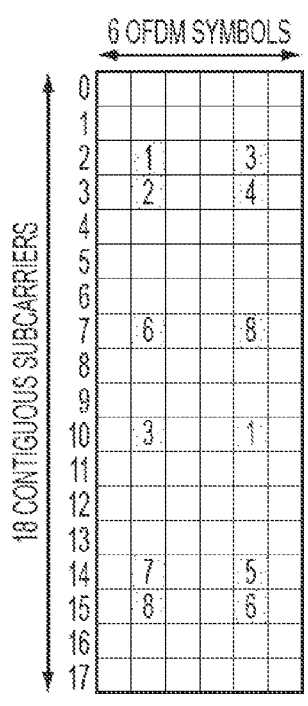
FIGS. 45A-45C illustrate interlaced midamble pilot patterns for eight-layer (or eight-stream) midamble transmission for interlaced midamble #0 with 6-symbol, 5-symbol and 7-symbol subframes according to exemplary embodiments of the present invention.
Figure 45B:
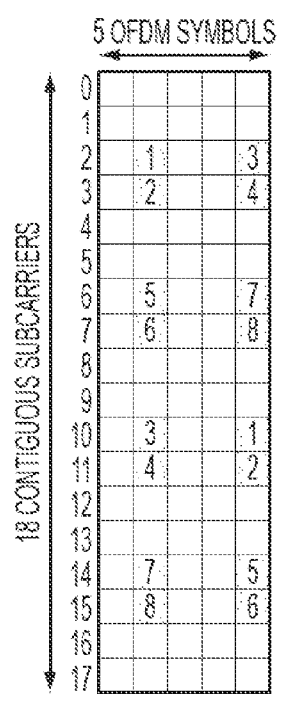
Figure 45C:
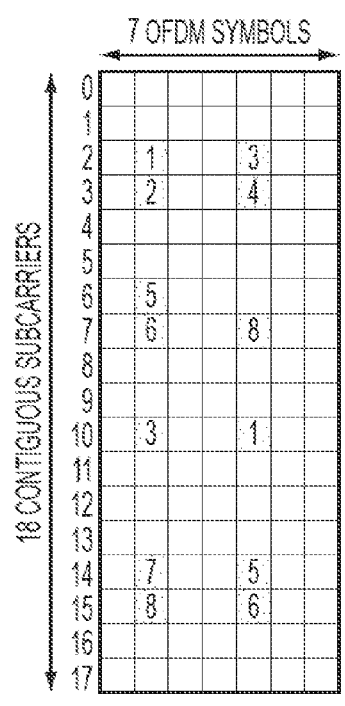

FIGS. 45A-45C illustrate interlaced midamble pilot patterns for eight-layer (or eight-stream) midamble transmission for interlaced midamble #0 with 6-symbol, 5-symbol and 7-symbol subframes according to exemplary embodiments of the present invention.

Referring to FIGS. 45A-45C, 3 interlaced midamble pilot patterns for eight-layer (or eight-stream) midamble transmission for interlaced midamble #0 with RBs of 18 subcarriers by 6 OFDM symbols, by 5 OFDM symbols, and by 7 OFDM symbols are shown, respectively.

In cellular wireless communication system, such as a 3GPP LTE or IEEE 802.16m wireless communication systems, physical frequency resources are reused among cells. Thus, the midamble pilot pattern may be reused in a cell and its neighboring cells as well. An example of midamble pilot pattern reuse is described below with reference to FIG. 46.

Figure 46:
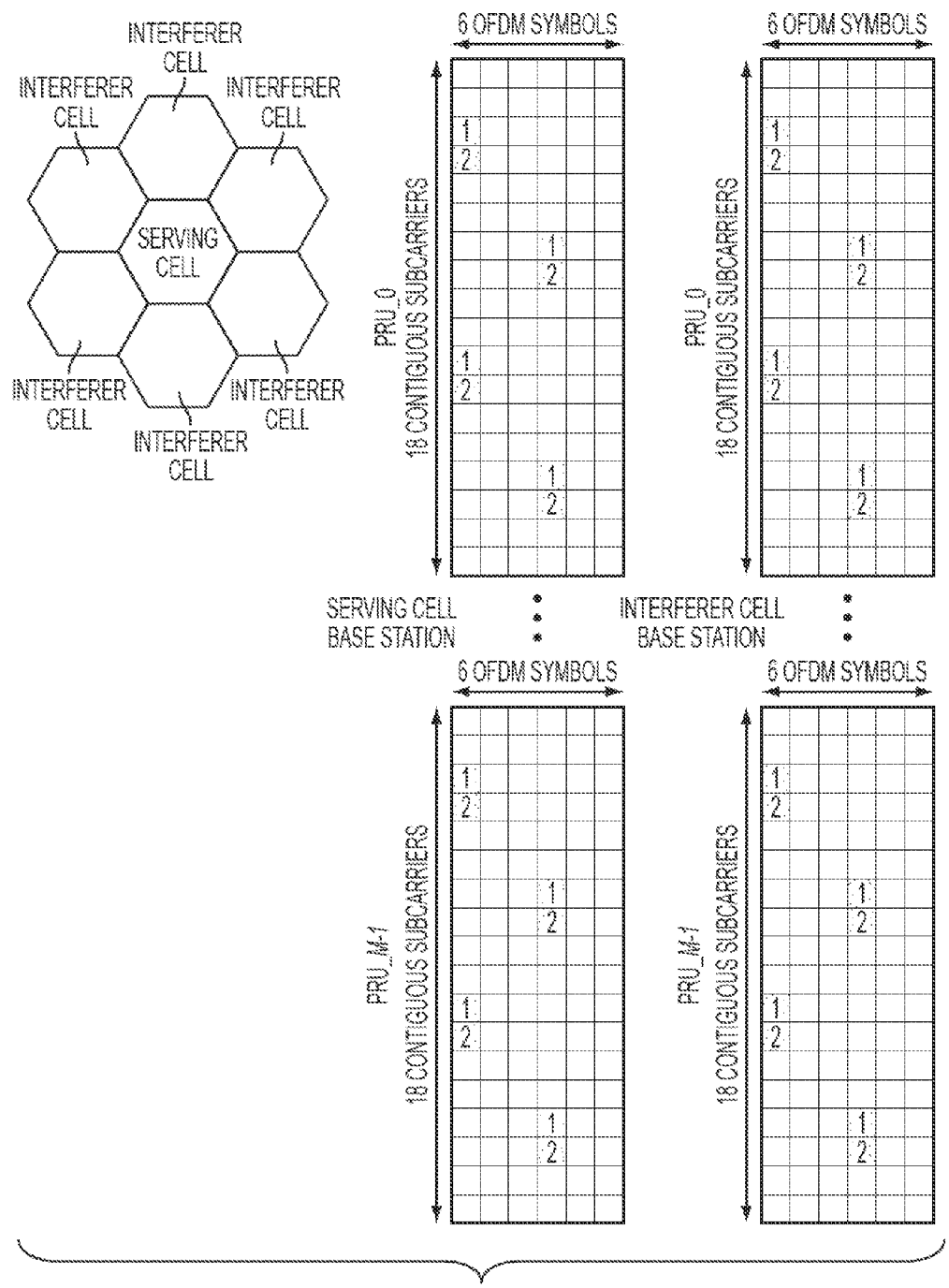
FIG. 46 illustrates midamble pilot pattern reuse among neighboring cells in a wireless communication system according to an exemplary embodiment of the present invention

FIG. 46 illustrates midamble pilot pattern reuse among neighboring cells in a wireless communication system according to an exemplary embodiment of the present invention.

Referring to FIG. 46, a serving cell with six neighboring cells is shown in a typical 7-cell cellular wireless communication system. Herein, it is assumed that all of the cells may utilize the same frequency and 2-transmit antenna midamble pilot pattern resources. Thus, the six neighboring cells will be interferer cells to the serving cell. Each of the 7 cells has its own Cell_ID. Here, M PRUs are employed and a PRU is an RB of 18 subcarriers by 6 OFDM symbols. It is noted that PRU_M−1 is the M-th PRU. Also, PRU_ID=M for PRU_M−1. A drawback of the reused midamble pilot pattern in FIG. 44 is that it may result in pilot collision if frequency planning is not properly implemented. Also, the reuse of midamble pilot patterns may result in pilot collision if midamble pilot pattern reuse planning is not done properly, as shown in FIG. 46. A pilot collision occurs when the time-frequency resources of midamble pilot subcarriers in a serving cell are reused by midamble pilot subcarriers in an interfering cell.

To mitigate midamble pilot collision, in an exemplary embodiment of the present invention, a BS transmits its midamble pilots using one of the Transmission Time Intervals (TTI, e.g., a subframe) that is different from one used by another BS. Preferably, a BS and its neighboring BSs should all transmit midamble pilots in different TTIs. In addition, a BS may transmit its midamble pilots using one of the midamble interlaces in a TTI.

The selection of the subframe and/or the interlace may be explicitly signaled, or derived from some system parameters. One example of determining the interlaced midamble pilot pattern i for a BS may be a function of its Cell_ID. That is, $$i = f(\text{Cell\_ID}).\quad\quad\text{Equation (76)}$$

An example of determining the permutation pattern based on Equation (76) is:

$$i = \text{Cell\_ID} \% 3 \quad\quad\text{Equation (77)}$$

where % denotes a modulus operation. The interlaced midamble pilot pattern i for a BS may transmit at the subframe index s, which is also function of Cell_ID. That is, $$s = g(\text{Cell\_ID}).\quad\quad\text{Equation (78)}$$

An example of determining the permutation pattern based on Equation (78) is:

$$s = \lfloor \text{Cell\_ID}/3 \rfloor \% (N_{DL\text{-}Subframe}),\quad\quad\text{Equation (79)}$$

where $\lfloor x \rfloor$ is the largest integer that is smaller than or equal to x. Namely, $\lfloor x \rfloor$ denotes a floor operation. $N_{DL\text{-}Subframe}$ denotes the number of DL subframes within the time period of a midamble transmission. For example, if the midamble pilots are transmitted once every 5 ms in an IEEE 802.16m FDD wireless communication system, $N_{DL\text{-}Subframe}=8$, as shown in FIG. 47.

Figure 47:
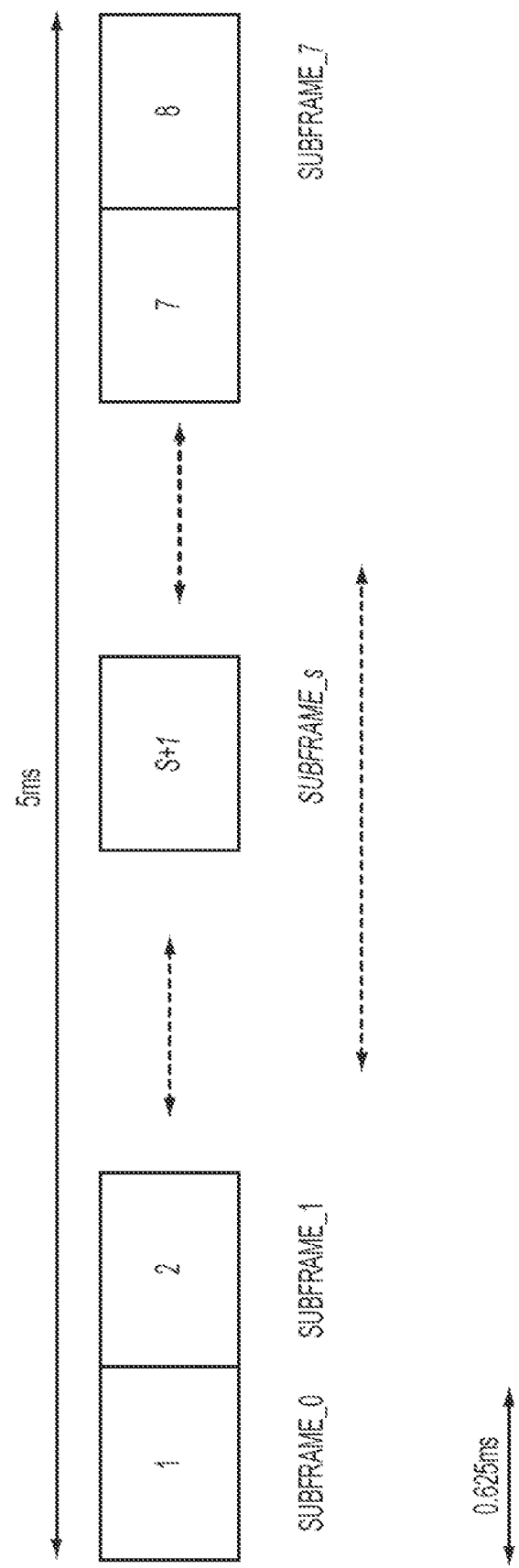
FIG. 47 illustrates midamble pilots transmitted once every 5 ms in an Institute of Electrical and Electronics Engineers (IEEE) 802.16m FDD wireless communication system according to an exemplary embodiment of the present invention.

FIG. 47 illustrates midamble pilots transmitted once every 5 ms in an IEEE 802.16m FDD wireless communication system according to an exemplary embodiment of the present invention.

As another example, if the midamble pilots are transmitted once every 5 ms in an IEEE 802.16m TDD wireless communication system with DL:UL=5:3, $N_{DL\text{-}Subframe}=5$. Here, the probability of pilot collision with other cells or BSs may be reduced. The reduced pilot collisions will improve channel estimation, thereby increasing link quality as well system throughput.

To evenly spread the midamble pilots across all OFDM symbols within a subframe, in another exemplary embodiment of the present invention, the interlace across RBs in a cell are changed. One example of determining the interlaced midamble pilot pattern i for a BS for a certain RB may be a function of the Cell_ID and RB_ID. That is, $$i=f(\text{Cell\_ID},\text{RB\_ID}) \quad \text{Equation (80)}$$

where % is modulus operation. An example of determining the permutation pattern based on Equation (80) is:

$$i=(\text{Cell\_ID}+\text{RB\_ID}) \% \ 3. \quad \text{Equation (81)}$$

To mitigate the likelihood of pilot collision among cells, in another exemplary embodiment of the present invention, the interlaces used by midamble pilots of a BS may be randomized across RBs. Preferably, the way of changing the interlaces is different in different cells such that the midamble pilots of a first cell does not always collide with the midamble pilots in a second cell in all PRUs, even if these two cells transmit midamble pilots in the same subframe. This technique further reduces the collision probability, and has the added benefit of balancing the midamble pilots across different OFDM symbols in a subframe.

In one exemplary embodiment of the present invention, the determination of an interlace for midamble pilots is defined as a permutation (interleaving) pattern across RBs. Preferably, the permutation pattern is different in different cells/BSs.

The permutation (interleaving) pattern may be determined by the BS (or cell) index and the RB index. For example, midamble pilot interlace i may be used in an RB in a cell, determined as follows:

$$i=f(\text{Cell\_ID},\text{PRU\_ID},N) \quad \text{Equation (82)}$$

where N indicates the number of midamble interlaces. One example of determining the permutation pattern based on Equation (82) is as follows:

$$i=(c(\text{Cell\_ID})+m(\text{Cell\_ID})\times\text{PRU\_ID}) \% \ N \quad \text{Equation (83)}$$

where % is modulus operation, c(Cell_ID) is a constant depending on the Cell_ID, and m(Cell_ID) is a number co-prime to N.

Another example of determining the permutation pattern based on Equation (82) is as follows:

$$i=(\text{Cell\_ID}+\text{Cell\_ID}\times\text{PRU\_ID}) \% \ N. \quad \text{Equation (84)}$$

Note that additional parameters, such as frame indices (superframe number, frame number, subframe number, etc.), may also be used in deriving the interlaces of midamble pilots. That is, the randomization of interlaces may vary with time. For example, the timing varying determination of midamble pilot interlace i may be:

$$i=f(\text{Cell\_ID},\text{PRU\_ID},N,\text{frame\_indices}). \quad \text{Equation (85)}$$

An example of determining the permutation pattern based on Equation (85) is:

$$i=((\text{frame\_indices} \% \ F)+\text{Cell\_ID}+\text{Cell\_ID}\times\text{PRU\_ID}) \% \ N \quad \text{Equation (86)}$$

where F is the cycle (or period) of the interlace randomization, which may be semi-statically or dynamically configured by a BS.

In another exemplary embodiment of the present invention, a permutation pattern may be defined by a sequence of offset values, one value for each RB. The BS (or MS) may apply the offset value for a RB in determining the interlace used for midamble pilot in the said RB. More than one sequence may be defined such that neighboring BSs may use different sequences to randomize pilot collision events. For example, assuming a sequence $s_n=[s_{n,0}, s_{n,1}, \ldots, s_{n,(L-1)}]$ is used for a BS n to derive the midamble pilot interlace i, where L is the length of the sequence. The interlace index i may be established as follows:

$$i=s_{n,PRU\_ID} \% \ N. \quad \text{Equation (87)}$$

In an exemplary embodiment of the present invention, the interlace index i may be established in the following fashion to mitigate the collision in the event two neighbor cells choose the same sequence.

$$i=(\text{CELL\_ID}+s_{n,PRU\_ID}) \% \ N. \quad \text{Equation (88)}$$

Figure 48:
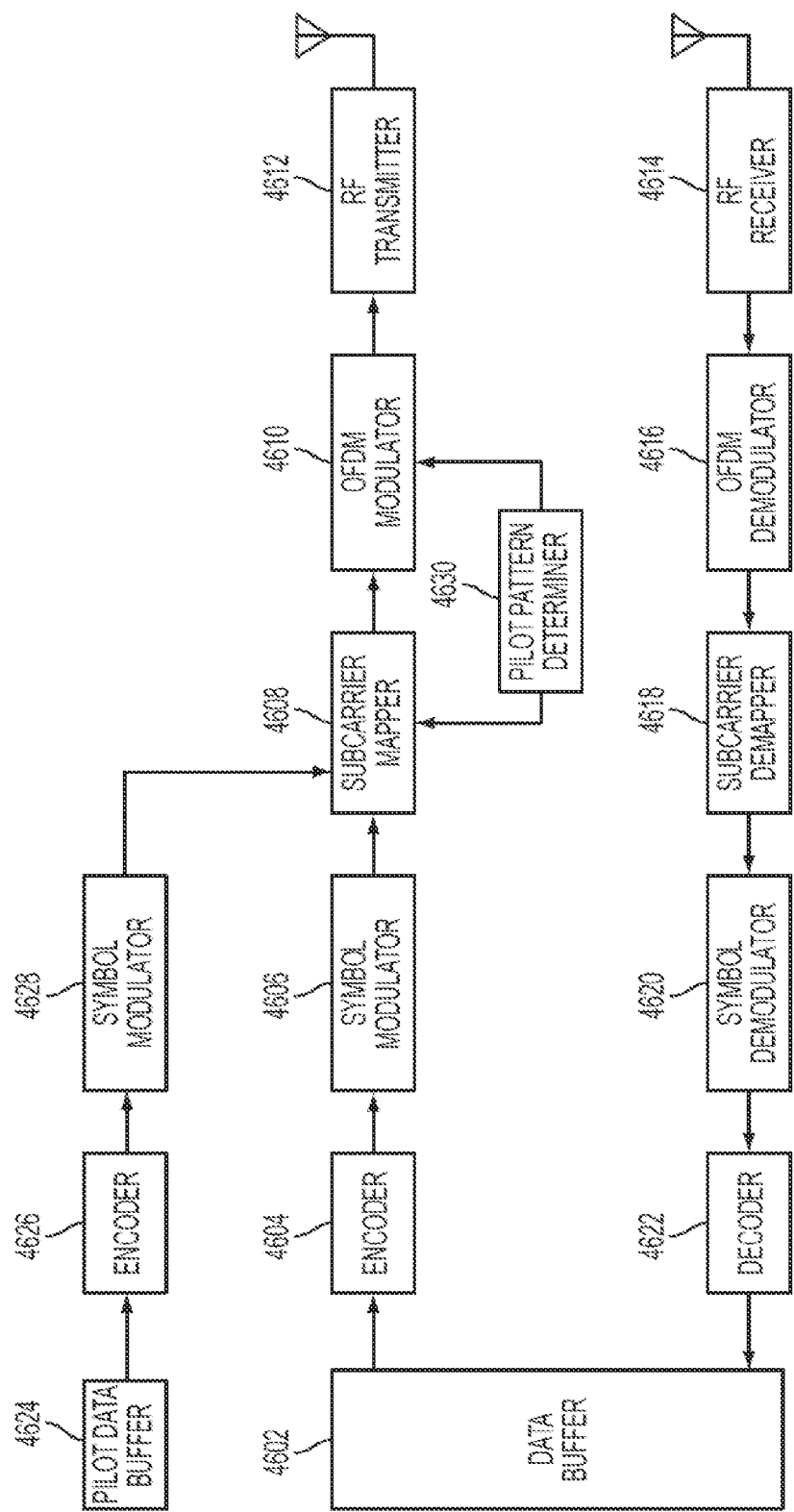
FIG. 48 is a block diagram illustrating a construction of a BS in a wireless communication system according to an exemplary embodiment of the present invention.

FIG. 48 is a block diagram illustrating a construction of a BS in a wireless communication system according to an exemplary embodiment of the present invention.

Referring to FIG. 48, the BS includes a data buffer 4602, an encoder 4604, a symbol modulator 4606, a subcarrier mapper 4608, an OFDM modulator 4610, a Radio Frequency (RF) transmitter 4612, an RF receiver 4614, an OFDM demodulator 4616, a subcarrier demapper 4618, a symbol demodulator 4620, a decoder 4622, a pilot data buffer 4624, an encoder 4626, a symbol modulator 4628, and a pilot pattern determiner 4630. While not shown in FIG. 48, the BS may include a controller. The controller may control one or more of the components described herein as being included in the BS. Further, the functions of any number of the components described herein as being included in the BS may be performed by the controller.

The data buffer 4602 stores data exchanged with MSs, and outputs the stored data to encoder 4604. The encoder 4604 channel-codes an information bit stream provided from the data buffer 4602. The symbol modulator 4606 converts the channel-coded information bit stream into complex symbols through modulation.

The pilot data buffer 4624 stores pilot data to be sent to MSs, and outputs the stored pilot data to encoder 4626. The encoder 4626 channel-codes a pilot bit stream provided from the pilot data buffer 4624. The symbol modulator 4628 converts the channel-coded pilot bit stream from the encoder 4626 into complex symbols through modulation.

The subcarrier mapper 4608 maps the complex symbols from the symbol modulator 4606 and the symbol modulator 4628 in the frequency domain based on pilot pattern information received from the pilot pattern determiner 4630.

The pilot pattern determiner 4630 determines a pilot pattern based on any of the techniques described herein and provides pilot pattern information to the subcarrier mapper 4608 and OFDM modulator 4610 so that pilot streams may be mapped based on the determined pilot pattern in the resulting PRU. For example, the pilot pattern determiner 4630 may determines a pilot pattern based on one of Equation (53) in which pilot stream s=mod(k, 2)+1, where s={1,2}, and Equation (54) in which pilot stream s=mod(k, 2), where s={0,1}. Here, k denotes Cell_ID and mod denotes a modulus operation.

The OFDM modulator 4610 converts complex symbols mapped to a frequency domain into a time domain signal through IFFT operation, and constructs an OFDM symbol by inserting a CP, based on pilot pattern information received from pilot pattern determiner 4630. A PRU is formed though the combined actions of the subcarrier mapper 4608 and OFDM modulator 4610. The RF transmitter 4612 up-converts a baseband signal into a DL band signal, and transmits the DL band signal through an antenna. The RF receiver 4614 down-converts a UL band signal received through the antenna into a baseband signal. After dividing a signal provided from the RF receiver 4614 in an OFDM symbol unit, the OFDM demodulator 4616 eliminates a CP, and restores complex symbols mapped to a frequency domain through FFT operation. The subcarrier demapper 4618 classifies complex symbols mapped to a frequency domain in a processing unit. The symbol demodulator 4620 converts complex symbols into a bit stream through demodulation. By channel-decoding the bit stream, the decoder 4622 restores an information bit stream.

Figure 49:
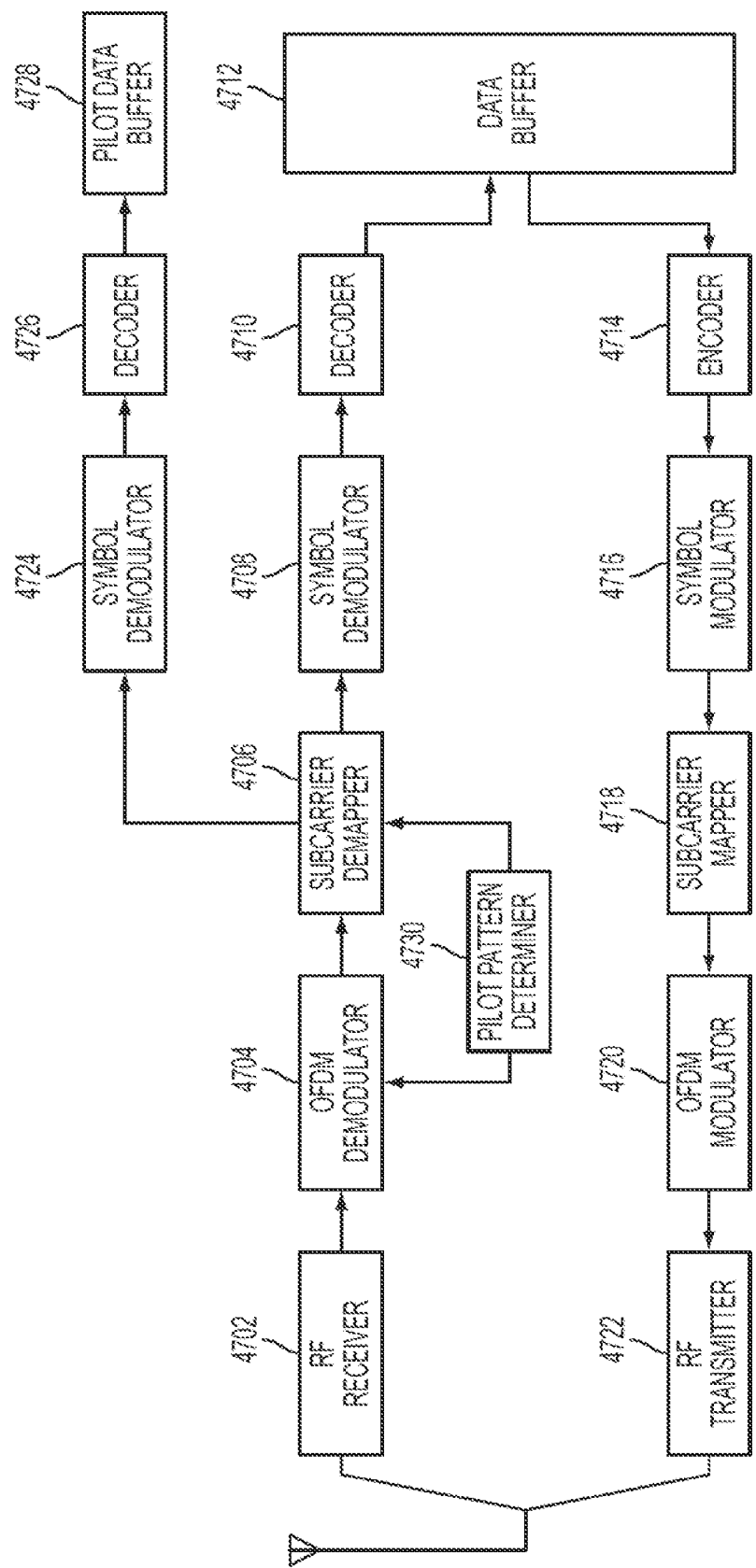
FIG. 49 is a block diagram illustrating a construction of an MS in a wireless communication system according to an exemplary embodiment of the present invention.

FIG. 49 is a block diagram illustrating a construction of an MS in a wireless communication system according to an exemplary embodiment of the present invention.

Referring to FIG. 49, the MS includes an RF receiver 4702, an OFDM demodulator 4704, a subcarrier demapper 4706, a symbol demodulator 4708, a decoder 4710, a data buffer 4712, an encoder 4714, a symbol modulator 4716, a subcarrier mapper 4718, an OFDM modulator 4720, and an RF transmitter 4722, a symbol modulator 4724, a decoder 4726, a pilot data buffer 4728, and a pilot pattern determiner 4730. While not shown in FIG. 49, the MS may include a controller. The controller may control one or more of the components described herein as being included in the MS. Further, the functions of any number of the components described herein as being included in the MS may be performed by the controller.

The RF receiver 4702 down-converts a DL band signal received through an antenna into a baseband signal. After dividing a signal provided from the RF receiver 4702 in an OFDM symbol unit, the OFDM demodulator 4704 eliminates a CP, and restores complex symbols mapped to a frequency domain through FFT operation, based on pilot pattern information received from pilot pattern determiner 4730. The subcarrier demapper 4706 classifies complex symbols mapped to a frequency domain in a processing unit. That is, the subcarrier demapper 4706 extracts a DL data signal and provides the extracted data signal to the symbol demodulator 4708, and extracts a pilot stream signal and provides the extracted pilot stream signal to the symbol demodulator 4724, based on pilot pattern information received from pilot pattern determiner 4730. A PRU is processed though the actions of the subcarrier mapper 4608 and OFDM modulator 4610.

The pilot pattern determiner 4730 determines a pilot pattern based on any of the techniques described herein and provides pilot pattern information to the OFDM demodulator 4704 and subcarrier demapper 4706 so that pilot streams may be extracted based on the determined pilot pattern in the received PRU. For example, the pilot pattern determiner 4630 may determines a pilot pattern based on one of Equation (53) in which pilot stream s=mod(k, 2)+1, where s={1,2}, and Equation (54) in which pilot stream s=mod(k, 2), where s={0, 1}. Here, k denotes Cell_ID and mod denotes a modulus operation.

The symbol demodulator 4708 converts complex symbols into an encoded information bit stream through demodulation. By channel-decoding the encoded information bit stream, the decoder 4710 restores an information bit stream. The data buffer 4712 stores data exchanged with a BS. The symbol demodulator 4724 converts complex symbols into an encoded pilot bit stream through demodulation. By channel-decoding the encoded pilot bit stream, the decoder 4726 restores a pilot bit stream. The pilot data buffer 4712 stores the pilot stream received from the BS. The encoder 4714 channel-codes an information bit stream provided from the data buffer 4712. The symbol modulator 4716 converts the channel-coded bit stream into complex symbols through demodulation. The subcarrier mapper 4718 maps the complex symbols into a frequency domain. The OFDM modulator 4720 converts complex symbols mapped to a frequency domain into a time domain signal through IFFT operation, and constructs an OFDM symbol by inserting a CP. The RF transmitter 4722 up-converts the baseband signal into a UL band signal, and transmits the UL band signal through the antenna.

Certain aspects of the present invention may also be embodied as computer readable code on a computer readable recording medium. A computer readable recording medium is any data storage device that can store data, which may be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting pilot data in a wireless communication system, the method comprising:
    determining a pilot pattern in at least one resource block for each of one or more pilot streams; and
    transmitting the one or more pilot streams based on the determined respective pilot pattern in the at least one resource block,
    wherein the at least one resource block comprises a plurality of subcarriers and a plurality of Orthogonal Frequency Division Multiplexing (OFDM) symbols,
    wherein, based on the determined respective pilot pattern, the one or more pilot streams are included in two resource blocks such that they are symmetric in at least one of time and frequency, and
    wherein the determining of the pilot pattern in the at least one resource block for each of the one or more pilot streams comprises mapping pilot stream k to pilot pattern i based on one of the equations:

$i=f(k,N,$ and at least two of Cell ID,PRU ID,STID and frame indices)

and $k=g(i,N,$ and at least two of Cell ID,PRU ID,STID and frame indices)

where f and g each denote a functional operation with the combination of parameters within ( ), N denotes the pilot pattern sets, Cell ID denotes a base station identifier, PRU ID denotes a scheduled resource block identifier for a targeted mobile station, and STID denotes a station identifier of the targeted mobile station.

2. The method of claim 1, wherein the one or more pilot streams comprise one of two pilot streams for two-transmit antenna or two-layer transmission, four pilot streams for four-transmit antenna or four-layer transmission, and eight pilot streams for eight-transmit antenna or eight-layer transmission, wherein the at least one resource block comprises eighteen subcarriers and one of five, six and seven OFDM symbols, and wherein the one or more pilot streams are one of dedicated and common.

3. The method of claim 1, wherein the one or more pilot streams are comprised by one or more pilot patterns in one of two and three subcarriers of the at least one resource block.

4. The method of claim 1, wherein, based on the determined respective pilot pattern, the one or more pilot streams are included in a greater number of subcarriers of a resource block used for a first transmission and a number of subcarriers of a resource block used for Hybrid Automatic Repeat Request (HARQ) retransmission.

5. A method for receiving pilot data in a wireless communication system, the method comprising:

determining a pilot pattern in at least one resource block for a pilot stream; and receiving the pilot stream based on the determined pilot pattern in the at least one resource block, wherein the at least one resource block comprises a plurality of subcarriers and a plurality of Orthogonal Frequency Division Multiplexing (OFDM) symbols, wherein the pilot stream, when received in two resource blocks, is symmetric in at least one of time and frequency, and wherein the determining of the pilot pattern in the at least one resource block for the pilot stream comprises mapping pilot stream k to pilot pattern i based on one of the equations:

$i=f(k,N,$ and at least two of Cell ID,PRU ID,STID and frame indices)

and $k=g(i,N,$ and at least two of Cell ID,PRU ID,STID and frame indices)

where f and g each denote a functional operation with the combination of parameters within ( ), N denotes the pilot pattern sets, Cell ID denotes a base station identifier, PRU ID denotes a scheduled resource block identifier for a targeted mobile station, and STID denotes a station identifier of the targeted mobile station.

6. The method of claim 5, wherein pilot stream is one of two pilot streams for two-transmit antenna or two-layer transmission included in the at least one resource block, one of four pilot streams for four-transmit antenna or four-layer transmission included in the at least one resource block, and one of eight pilot streams for eight-transmit antenna or eight-layer transmission included in the at least one resource block, wherein the at least one resource block comprises eighteen subcarriers and one of five, six and seven OFDM symbols, and wherein the pilot stream is one of dedicated and common.

7. The method of claim 5, wherein the pilot stream is received in one of two and three subcarriers of the at least one resource block.

8. The method of claim 5, wherein the one or more pilot streams are received in a greater number of subcarriers of a resource block used for a first transmission and a number of subcarriers of a resource block used for Hybrid Automatic Repeat Request (HARQ) retransmission.

9. A base station apparatus for transmitting pilot data in a wireless communication system, the apparatus comprising:

a pilot pattern determiner for determining a pilot pattern in at least one resource block for each of one or more pilot streams;

a subcarrier mapper and an Orthogonal Frequency Division Multiplexing (OFDM) modulator for including the one or more pilot streams in the at least one resource block based on the determined respective pilot pattern; and a transmitter for transmitting the at least one resource block, wherein the at least one resource block comprises a plurality of subcarriers and a plurality of OFDM symbols, wherein, based on the determined respective pilot pattern, the one or more pilot streams are included in two resource blocks such that they are symmetric in at least one of time and frequency, and wherein the pilot pattern determiner determines the pilot pattern in the at least one resource block for each of the one or more pilot streams by mapping pilot stream k to pilot pattern i based on one of the equations:

$i=f(k,N,$ and at least two of Cell ID,PRU ID,STID and frame indices)

and $k=g(i,N,$ and at least two of Cell ID,PRU ID,STID and frame indices)

where f and g each denote a functional operation with the combination of parameters within ( ), N denotes the pilot pattern sets, Cell ID denotes a base station identifier, PRU ID denotes a scheduled resource block identifier for a targeted mobile station, and STID denotes a station identifier of the targeted mobile station.

10. The apparatus of claim 9, wherein the one or more pilot streams comprise one of two pilot streams for two-transmit antenna or two-layer transmission, four pilot streams for four-transmit antenna or four-layer transmission, and eight pilot streams for eight-transmit antenna or eight-layer transmission, wherein the at least one resource block comprises eighteen subcarriers and one of five, six and seven OFDM symbols, and wherein the one or more pilot streams are one of dedicated and common.

11. The apparatus of claim 9, wherein, based on the determined respective pilot pattern, the one or more pilot streams are included in one of two and three subcarriers of the at least one resource block.

12. The apparatus of claim 9, wherein, based on the determined respective pilot pattern, the one or more pilot streams are included in a greater number of subcarriers of a resource block used for a first transmission and a number of subcarriers of a resource block used for Hybrid Automatic Repeat Request (HARQ) retransmission.

13. A mobile station apparatus for receiving pilot data in a wireless communication system, the apparatus comprising:

a receiver for receiving a signal including pilot stream in at least one resource block;

a pilot pattern determiner for determining a pilot pattern in at least one resource block for the pilot stream; and an Orthogonal Frequency Division Multiplexing (OFDM) demodulator and a subcarrier demapper for extracting the pilot stream from the at least one resource block based on the determined pilot pattern, wherein the at least one resource block comprises a plurality of subcarriers and a plurality of OFDM symbols, wherein the pilot stream, when received in two resource blocks, is symmetric in at least one of time and frequency, and wherein the pilot pattern determiner determines the pilot pattern in the at least one resource block for the pilot stream by mapping pilot stream k to pilot pattern i based on one of the equations:

$i=f(k,N,$ and at least two of Cell ID, PRU ID, STID and frame indices)

and $k=g(i,N,$ and at least two of Cell ID, PRU ID, STID and frame indices)

where f and g each denote a functional operation with the combination of parameters within ( ), N denotes the pilot pattern sets, Cell ID denotes a base station identifier, PRU ID denotes a scheduled resource block identifier for a targeted mobile station, and STID denotes a station identifier of the targeted mobile station.

14. The apparatus of claim 13, wherein pilot stream is one of two pilot streams for two-transmit antenna or two-layer transmission included in the at least one resource block, one of four pilot streams for four-transmit antenna or four-layer transmission included in the at least one resource block, and one of eight pilot streams for eight-transmit antenna or eight-layer transmission included in the at least one resource block, wherein the at least one resource block comprises eighteen subcarriers and one of five, six and seven OFDM symbols, and wherein the pilot stream is one of dedicated and common.

15. The apparatus of claim 13, wherein the pilot stream is received in one of two and three subcarriers of the at least one resource block.

16. The apparatus of claim 13, wherein the pilot stream is received in a greater number of subcarriers of a resource block used for a first transmission and a number of subcarriers of a resource block used for Hybrid Automatic Repeat Request (HARQ) retransmission.

* * * * *